(12) United States Patent
Lee et al.

(10) Patent No.: US 12,399,551 B2
(45) Date of Patent: Aug. 26, 2025

(54) WEARABLE DEVICE FOR EXECUTING APPLICATION BASED ON INFORMATION OBTAINED BY TRACKING EXTERNAL OBJECT AND METHOD THEREOF

(71) Applicant: Samsung Electronics Co., Ltd., Suwon-si (KR)

(72) Inventors: Eunkyung Lee, Suwon-si (KR); Harin Moon, Suwon-si (KR); Wanje Park, Suwon-si (KR); Jiyoung Kang, Suwon-si (KR); Jaehan Lee, Suwon-si (KR); Chaekyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/455,218

(22) Filed: Aug. 24, 2023

(65) Prior Publication Data
US 2024/0143067 A1    May 2, 2024

Related U.S. Application Data

(63) Continuation of application No. PCT/KR2023/011313, filed on Aug. 2, 2023.

(30) Foreign Application Priority Data

Nov. 1, 2022  (KR) .................. 10-2022-0144088
Dec. 7, 2022  (KR) .................. 10-2022-0170126

(51) Int. Cl.
*G06F 3/01*    (2006.01)
*G06F 3/00*    (2006.01)
(Continued)

(52) U.S. Cl.
CPC ........... *G06F 3/011* (2013.01); *G06Q 10/109* (2013.01); *G06T 7/20* (2013.01); *G06T 11/60* (2013.01); *G06T 19/006* (2013.01); *G06F 3/005* (2013.01)

(58) Field of Classification Search
None
See application file for complete search history.

(56) References Cited

U.S. PATENT DOCUMENTS 8,633,946 B2 *  1/2014  Cohen .................. A63F 13/323
                                                     345/631
10,120,437 B2 * 11/2018  Lin .................. H04N 21/41407
(Continued)

FOREIGN PATENT DOCUMENTS

KR    10-0360477 B1    3/2003
KR    10-1343609 B1    2/2014
(Continued)

OTHER PUBLICATIONS https://www.youtube.com/watch?v=04v_v1gnyO8, Nov. 2005.
(Continued)

*Primary Examiner* — Dorothy Harris
(74) *Attorney, Agent, or Firm* — Jefferson IP Law, LLP

(57) ABSTRACT

A processor of a wearable device is provided. The processor may identify an external object included in a displaying area of a display by using a camera. The processor may display a first visual object representing an application corresponding to the external object based on the location of the external object in the displaying area. The processor may obtain at least one of first information associated with a path of the external object moved on the plane, or second information including at least one stroke drawn by the external object, while the first visual object is displayed. The processor may display a second visual object for executing the application by using information, selected among the
(Continued)

first information or the second information, based on the location, according to the attribute assigned to the external object.

19 Claims, 29 Drawing Sheets

(51) Int. Cl.
*G06Q 10/109* (2023.01)
*G06T 7/20* (2017.01)
*G06T 11/60* (2006.01)
*G06T 19/00* (2011.01)

(56) References Cited

U.S. PATENT DOCUMENTS

| | | | |
|---|---|---|---|
| 10,409,443 B2 | 9/2019 | Wright et al. | |
| 10,848,745 B2 | 11/2020 | Linde et al. | |
| 11,460,988 B2 | 10/2022 | Lee et al. | |
| 11,501,504 B2* | 11/2022 | Rohan | G06F 3/011 |
| 11,635,805 B2 | 4/2023 | Lee et al. | |
| 11,681,409 B2* | 6/2023 | Edwards | G06F 3/011 |
| | | | 715/852 |
| 2001/0024193 A1 | 9/2001 | Fahraeus | G06F 3/0321 |
| | | | 345/173 |
| 2007/0273644 A1* | 11/2007 | Mondine Natucci | |
| | | | G06T 19/006 |
| | | | 345/156 |
| 2010/0306649 A1* | 12/2010 | Russ | G06F 3/04883 |
| | | | 715/810 |
| 2013/0051615 A1 | 2/2013 | Lim et al. | |
| 2013/0222381 A1* | 8/2013 | Di Censo | G06T 19/006 |
| | | | 345/419 |
| 2014/0089855 A1 | 3/2014 | Kim et al. | |
| 2014/0267011 A1* | 9/2014 | Devries | G06F 3/017 |
| | | | 345/156 |
| 2014/0267770 A1* | 9/2014 | Gervautz | H04N 23/69 |
| | | | 709/219 |
| 2015/0022444 A1* | 1/2015 | Ooi | G06V 20/20 |
| | | | 345/156 |
| 2015/0185825 A1* | 7/2015 | Mullins | G06F 3/0304 |
| | | | 345/633 |
| 2015/0205351 A1* | 7/2015 | Osterhout | G06F 3/03545 |
| | | | 345/156 |
| 2016/0034027 A1* | 2/2016 | Sheng | G06F 3/04886 |
| | | | 345/173 |
| 2016/0085422 A1* | 3/2016 | Lee | G06T 11/60 |
| | | | 715/810 |
| 2016/0139691 A1* | 5/2016 | Li | G06F 40/171 |
| | | | 345/179 |
| 2016/0224657 A1* | 8/2016 | Mullins | G06F 16/951 |
| 2018/0261011 A1* | 9/2018 | Kollencheri Puthenveettil | |
| | | | G06F 16/435 |
| 2019/0318545 A1 | 10/2019 | Sholudko et al. | |
| 2019/0324528 A1* | 10/2019 | Williams | G06F 18/40 |
| 2019/0339840 A1* | 11/2019 | Park | G10L 15/00 |
| 2021/0382605 A1* | 12/2021 | Edwards | G06F 3/04815 |

FOREIGN PATENT DOCUMENTS

| | | |
|---|---|---|
| KR | 10-2014-0043961 A | 4/2014 |
| KR | 10-2015-0063699 A | 6/2015 |
| KR | 10-2019-0134975 A | 12/2019 |
| KR | 10-2020-0055010 A | 5/2020 |
| KR | 10-2020-0070551 A | 6/2020 |
| KR | 10-2020-0076325 A | 6/2020 |
| KR | 10-2248474 B1 | 5/2021 |
| KR | 10-2021-0123156 A | 10/2021 |
| KR | 10-2022-0037837 A | 3/2022 |
| KR | 10-2393295 B1 | 5/2022 |
| KR | 10-2412307 B1 | 6/2022 |

OTHER PUBLICATIONS

Peter Vandoren et al., FluidPaint: an Interactive Digital Painting System using Real Wet Brushes, Hasselt University—tUL—IBBT, Expertise Centre for Digital Media, 3590 Diepenbeek—Belgium, Nov. 2009.

International Search Report with English translation and Written Opinion dated Nov. 15, 2023; International Appln. No. PCT/KR2023/011313.

* cited by examiner

WEARABLE DEVICE FOR EXECUTING APPLICATION BASED ON INFORMATION OBTAINED BY TRACKING EXTERNAL OBJECT AND METHOD THEREOF

CROSS-REFERENCE TO RELATED APPLICATION(S)

This application is a continuation application, claiming priority under § 365(c), of an International application No. PCT/KR2023/011313, filed on Aug. 2, 2023, which is based on and claims the benefit of a Korean patent application number 10-2022-0144088, filed on Nov. 1, 2022, in the Korean Intellectual Property Office, and of a Korean patent application number 10-2022-0170126, filed on Dec. 7, 2022, in the Korean Intellectual Property Office, the disclosure of each of which is incorporated by reference herein in its entirety.

BACKGROUND

Technical Field

The disclosure relates to a wearable device for executing an application based on information obtained by tracking an external object and method thereof.

Description of Related Art

In order to provide an enhanced user experience, an electronic device providing an augmented reality (AR) service displaying information generated by a computer in association with an external object in the real-world is being developed. The electronic device may be a wearable device that may be worn by a user. For example, the electronic device may be an AR glasses and/or a head-mounted device (HMD).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a wearable device for executing an application based on information obtained by tracking an external object and method thereof.

Additional aspects will be set forth in part in the description which follows and, in part, will be apparent from the description, or may be learned by practice of the presented embodiments.

In accordance with an aspect of the disclosure, a wearable device may be provided. The wearable device includes a display, a camera, and a processor. The processor may be configured to identify, by using the camera, an external object included in a displaying area of the display. The processor may be configured to display a first visual object representing an application corresponding to the external object based on a location of the external object in the displaying area. The processor may be configured to obtain, while displaying the first visual object, at least one of first information associated with a path of the external object moved on a plane, or second information including at least one stroke drawn by the external object. The processor may be configured to display, based on the location, a second visual object for executing the application by using information that is identified among the first information or the second information according to an attribute assigned to the external object.

A method of a wearable device according to an embodiment may comprise identifying, by using a camera of the wearable device, an external object included in a displaying area of a display of the wearable device. The method may comprise displaying a first visual object representing an application corresponding to the external object based on a location of the external object in the displaying area. The method may comprise obtaining, while displaying the first visual object, at least one of first information associated with a path of the external object moved on a plane, or second information including at least one stroke drawn by the external object. The method may comprise displaying, based on the location, a second visual object for executing the application by using information that is identified among the first information or the second information according to an attribute assigned to the external object.

According to an embodiment, a wearable device may comprise a display, a memory, and a processor. The processor may be configured to display, in a display of the wearable device, list of a plurality of applications stored in a memory of the wearable device. The processor may be configured to obtain, based on an input indicating overlapping a visual object representing a first application included in the list on an external object included in a displaying area of the display, an attribute for executing the first application by using the external object. The processor may be configured to obtain, after obtaining the attribute, at least one of first information associated with a path of the external object moved on a plane, or second information including at least one stroke drawn by the external object. The processor may be configured to execute, the first application by using information identified by the attribute among the first information or the second information.

A method of a wearable device according to an embodiment may comprise displaying, in a display of the wearable device, list of a plurality of applications stored in a memory of the wearable device. The method may comprise obtaining, based on an input indicating overlapping a visual object representing a first application included in the list on an external object included in a displaying area of the display, an attribute for executing the first application by using the external object. The method may comprise obtaining, after obtaining the attribute, at least one of first information associated with a path of the external object moved on a plane, or second information including at least one stroke drawn by the external object. The method may comprise executing, the first application by using information identified by the attribute among the first information or the second information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
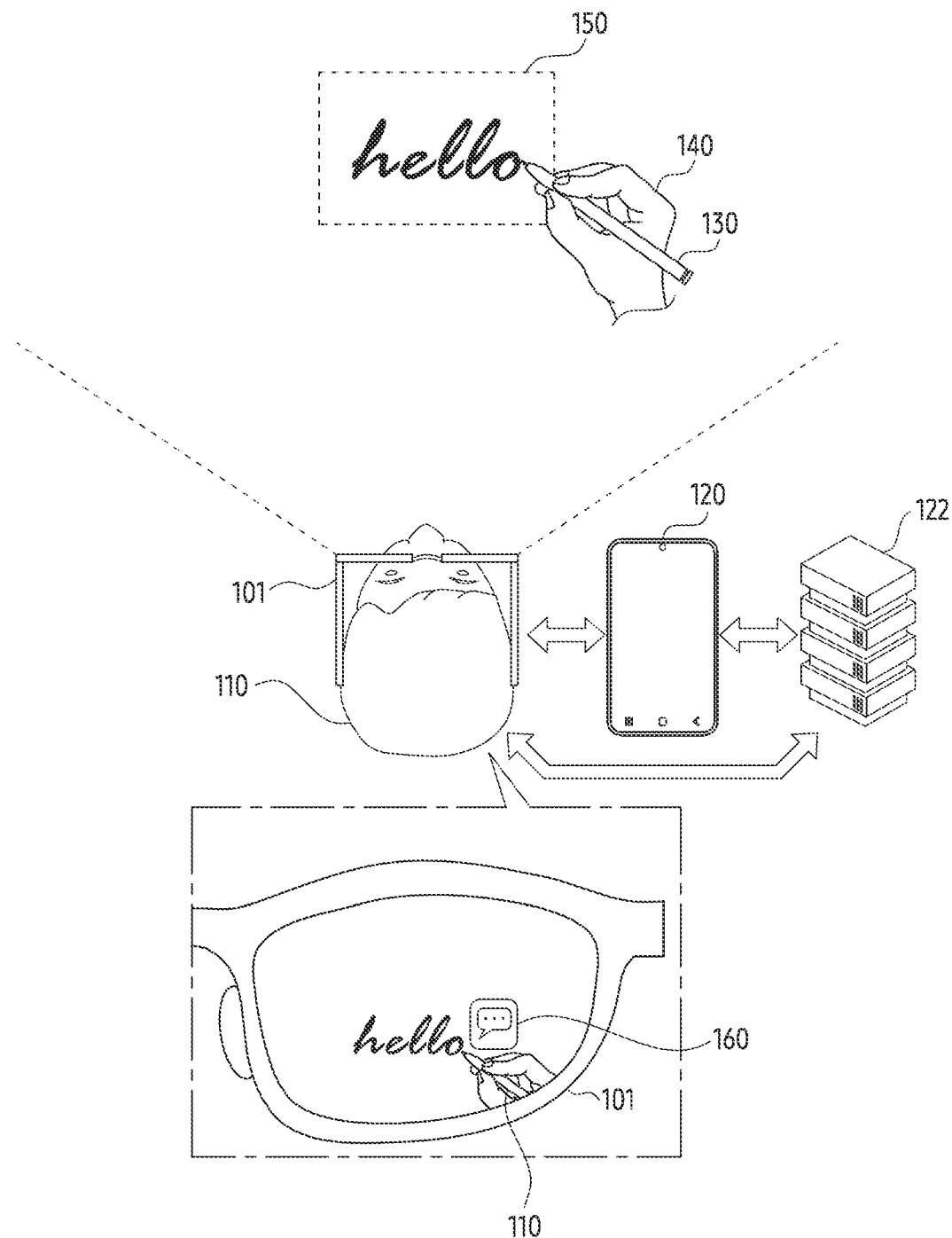
FIG. 1 illustrates an operation in which a wearable device obtains information associated with an external object, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

FIG. 1 illustrates an operation in which a wearable device obtains information associated with an external object according to an embodiment of the disclosure.

Referring to FIG. 1, a wearable device 101 according to an embodiment of the disclosure may include head-mounted display (HMD) that may be wearable on a head of a user 110. Although an appearance of the wearable device 101 having the form of glasses is illustrated, the embodiment is not limited thereto. An example of the structure of the wearable device 101 wearable on the head of the user 110 will be described with reference to FIGS. 3A and 3B and/or 4A and 4B. One or more pieces of hardware included in the wearable device 101 are illustratively described with reference to FIG. 5.

According to an embodiment of the disclosure, the wearable device 101 may execute a function associated with augmented reality (AR) and/or mixed reality (MR). Referring to FIG. 1, in a state in which the user 110 is wearing the wearable device 101, the wearable device 101 may include at least one lens disposed adjacent to the eyes of the user 110. The wearable device 101 may combine light emitted from the display of the wearable device 101 to ambient light passing through the lens. The displaying area of the display may be formed in a lens through which the ambient light passes. Since the wearable device 101 combines the ambient light and the light emitted from the display, the user 110 may see a mixed image of a real object recognized by the ambient light and a virtual object formed by the light emitted from the display.

According to an embodiment of the disclosure, the wearable device 101 may execute a function associated with video see-through (VST) and/or virtual reality (VR). Referring to FIG. 1, in the state in which the user 110 is wearing the wearable device 101, the wearable device 101 may include a housing covering the eyes of the user 110. The wearable device 101 may include the display disposed on a first surface facing the eyes in the state. The wearable device 101 may include a camera disposed on a second surface opposite to the first surface. By using the camera, the wearable device 101 may obtain frames including the ambient light. The wearable device 101 may make the user 110 recognize the ambient light through the display, by outputting the frames in the display disposed on the first surface. The displaying area of the display disposed on the first surface may be formed by one or more pixels included in the display. The wearable device 101 may make the user 110 recognize the virtual object together with the real object recognized by ambient light, by synthesizing the virtual object in frames outputted through the display.

Referring to FIG. 1, an example in which the wearable device 101 identifies the external object 130, according to an embodiment of the disclosure, in the state worn by a user 110 is illustrated. In an example of FIG. 1, the wearable device 101 may make the user 110 recognize an external space based on the AR, the MR, or the VST. In the external space, the wearable device 101 may identify the external object 130. Although the external object 130 having the shape of a pen is exemplarily illustrated, the embodiment is not limited thereto. The external object 130 may include an object registerable in the wearable device 101. For example, the external object 130 may have a shape extended along a length direction, such as the pen and/or a stick, such as a tree branch. The embodiment is not limited thereto, and the external object 130 may have a shape of a polyhedron or may have a shape of a curved surface body. According to an embodiment of the disclosure, an example of an operation performed by the wearable device 101 to register the external object 130 will be described with reference to FIGS. 6A to 6D and/or 7.

Referring to FIG. 1, an image shown by the user 110 wearing the wearable device 101 is illustrated. According to an embodiment of the disclosure, the wearable device 101 may identify the external object 130 mapped to the function of the application. The wearable device 101 may display the visual object 160 based on the location of the external object 130 in the displaying area of the display. The visual object 160 may have a shape of an icon of the application mapped to the external object 130. The shape, size, and/or location of the visual object 160 displayed by the wearable device 101 is not limited to an embodiment of FIG. 1.

According to an embodiment of the disclosure, the wearable device 101 may obtain information associated with the motion of the external object 130. Referring to FIG. 1, a state in which the external object 130 is moved by a hand 140 is illustrated. For example, by using a camera (and/or a depth sensor) of the wearable device 101 disposed toward the external object 130, the wearable device 101 may obtain first information associated with the path of the external object 130. The first information may include a path of the external object 130 contacted on a plane 150 (e.g., a paper and/or a table). In case that the external object 130 is an object capable of generating a trace (e.g., at least one stroke) on the plane 150, such as the pen and/or a pencil, the wearable device 101 may obtain second information including at least one stroke drawn by the external object 130 by using the camera. The wearable device 101 may obtain content (e.g., a handwriting and/or an image) generated by the motion of the external object 130 by performing optical character recognition (OCR) for the at least one stroke.

According to an embodiment of the disclosure, the wearable device 101 may execute the application corresponding to the external object 130 based on the first information associated with the path of the external object 130 and/or the second information including at least one stroke drawn by the external object 130. For example, the wearable device 101 may execute a function associated with the first information and/or the second information by executing the application registered in the external object 130. The wearable device 101 may execute the application in response to an input indicating to select the visual object 160 including an icon representing the application. An operation in which the wearable device 101 executes the application registered to the external object 130 will be described with reference to FIGS. 8A, 8B, 9A to 9C, 10, 11, 12A, 12B, 13, 14, 15A, 15B, and 16. According to the application registered to the external object 130, the wearable device 101 may execute various functions based on the stroke drawn by the external object 130 and/or the path of the external object 130.

Referring to FIG. 1, according to an embodiment of the disclosure, the wearable device 101 may be connected to an external electronic device, such as a terminal 120 and/or a server 122. The terminal 120 may include, for example, a personal computer (PC), such as a laptop or a desktop, a smartphone, a smartpad, and/or a tablet PC. The server 122 may support a function (e.g., the OCR) for analyzing the path of the external object 130 and/or the stroke drawn by the external object 130. The wearable device 101, the terminal 120 and/or the server 122 may be connected to each other through a wired network and/or a wireless network. The wired network may include a network, such as the Internet, a local area network (LAN), a wide area network (WAN), Ethernet, or a combination thereof. The wireless network may include a network, such as long term evolution (LTE), new radio (fifth generation (5G) NR), wireless fidelity (Wi-Fi), Zigbee, near field communication (NFC), Bluetooth, Bluetooth low-energy (BLE), or a combination thereof. Although the wearable device 101, the terminal 120, and the server 122 are directly connected, the wearable device 101, the wearable device 101, the terminal 120, and the server 122 are illustrated as directly connected, the wearable device 101, the terminal 120, and the server 122 may be indirectly connected through an intermediate node (e.g., one or more routers and/or access points (APs)).

As described above, according to an embodiment of the disclosure, the wearable device 101 may track the path of the external object 130 and/or the at least one stroke drawn by the external object 130. Based on the tracked path and/or stroke, the wearable device 101 may execute at least one application corresponding to the external object 130. At least one application matched to the external object 130 may be set by an attribute assigned to the external object 130. The wearable device 101 may execute the at least one application based on any one of the path or the stroke selected by the attribute. As the at least one application is executed, the wearable device 101 may support the user 110 to control the wearable device 101 by using the external object 130. Although the external object 130 does not include circuitry for communicating with the wearable device 101, such as the pen and/or the pencil, the wearable device 101 may visualize information indicated by the external object 130.

Hereinafter, an example of an operation of the wearable device 101 according to an embodiment will be described with reference to FIG. 2.

Figure 2:
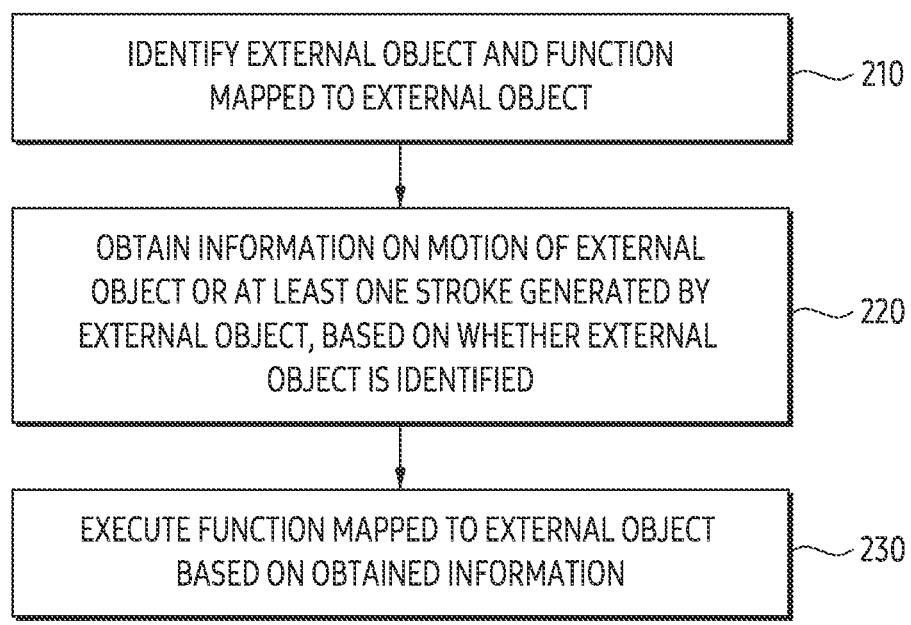
FIG. 2 illustrates a flowchart for a wearable device according to an embodiment of the disclosure.

FIG. 2 illustrates a flowchart for a wearable device according to an embodiment of the disclosure. The wearable device of FIG. 2 may include the wearable device 101 of FIG. 1.

Referring to FIG. 2, in operation 210, according to an embodiment of the disclosure, the wearable device may identify an external object and a function mapped to the external object. For example, a wearable device may identify the external object shown by a user (e.g., a user 110 of FIG. 1) wearing the wearable device, such as the external object 130 of FIG. 1. In order to identify the external object shown by the user wearing the wearable device, the wearable device may include at least one camera disposed toward a designated direction. The wearable device may identify the external object by using the camera. In case that the external object is an external object registered in the wearable device, the wearable device may identify the function mapped to the external object. That the external object is registered in the wearable device may mean that the attribute assigned to the external object is stored in the wearable device. Based on the attribute, the wearable device may identify the function.

Referring to FIG. 2, in operation 220, according to an embodiment of the disclosure, the wearable device may obtain information on a motion of the external object or at least one stroke generated by the external object, based on whether the external object is identified. The motion of the external object may include the motion of the external object contacted on a plane (e.g., a plane 150 of FIG. 1) of an external space including the external object. The at least one stroke may be generated as a material (e.g., ink and/or graphite) included in the external object is adhered on the plane. The wearable device may selectively track one of the motion or the at least one stroke based on the attribute assigned to the external object. In order to obtain the information, the wearable device may communicate with an external electronic device (e.g., a terminal 120 and/or a server 122 of FIG. 1).

In an embodiment of the disclosure, in order to obtain information on the motion of the external object, the wearable device may track a path of a portion (e.g., an end of the external object, and/or a surface) of the external object. Based on whether the portion of the external object is in contact with the plane, the wearable device may obtain first information associated with the path of the external object contacted on the plane. In the state of obtaining the first information, the wearable device may display one or more lines having a shape of the path on the display of the wearable device. The portion of the external object tracked by the wearable device may be set by an attribute assigned to the external object.

In an embodiment of the disclosure, in order to obtain information on at least one stroke drawn by the external object, the wearable device may control a camera disposed toward the external object, among different cameras. The wearable device may identify at least one stroke drawn by the external object by using the camera. The wearable device may identify handwriting drawn by an external object based on the letter indicated by the at least one stroke. The embodiment is not limited thereto, and the wearable device may identify at least one figure indicated by the at least one stroke. The wearable device may communicate with the external electronic device to obtain text data (e.g., data encoded by a binary code, such as Unicode) corresponding to the handwriting.

Referring to FIG. 2, in operation 230, according to an embodiment of the disclosure, the wearable device may execute a function mapped to the external object based on the obtained information. The function may be identified by an attribute assigned by the external object. The function may be supported by at least one application installed in the wearable device. According to an embodiment of the disclosure, the wearable device may visualize the result of executing the function to the user. The wearable device may execute the function based on an input indicating to select a visual object (e.g., a visual object 160 of FIG. 1) displayed in the display. The visual object may be identified by the attribute. The wearable device may display the visual object based on a location of the external object in the display.

As described above, according to an embodiment of the disclosure, the wearable device may register an object that does not support the function of communicating with the wearable device and may support the control of the wearable device based on the registered object. The wearable device may obtain electrical information (e.g., digital content) from non-electrical information on the external object by recognizing the motion of the external object, such as a pen or by recognizing at least one stroke drawn by the external object. Based on the electrical information, the wearable device may recognize an external object that cannot be directly connected to the wearable device and may obtain digital content from the recognized external object.

Hereinafter, a structure of the wearable device for recognizing the external object according to an embodiment will be described with reference to FIGS. 3A and 3B and/or 4A and 4B.

Figure 3A:
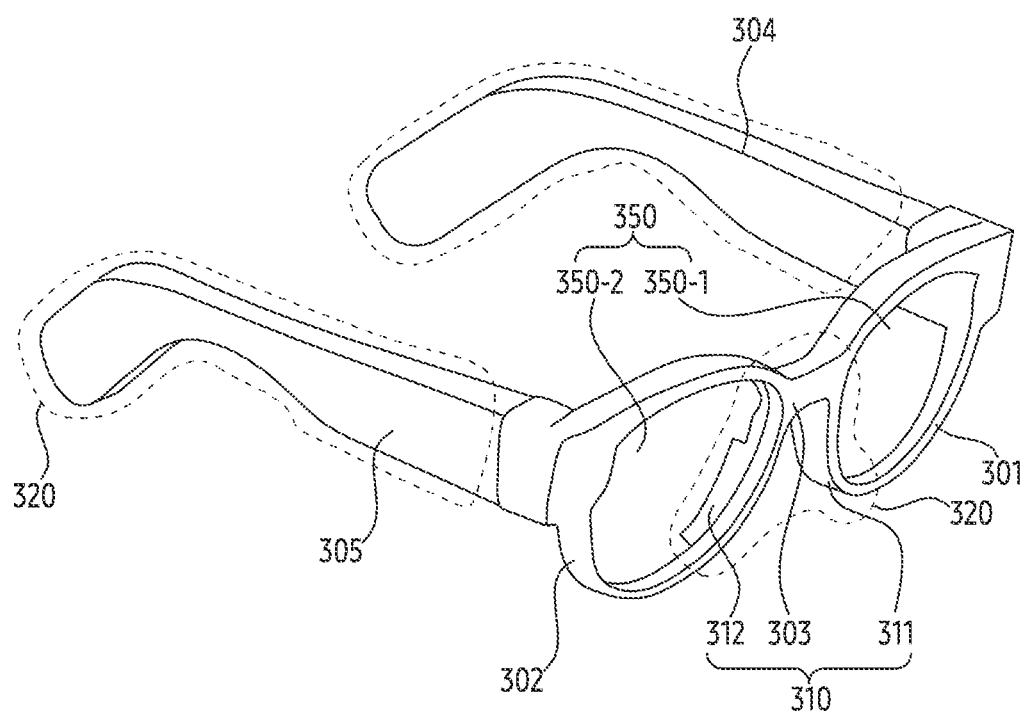
FIG. 3A illustrates a perspective view of a wearable device according to an embodiment of the disclosure.

FIG. 3A illustrates a perspective view of a wearable device according to an embodiment of the disclosure. A wearable device 300 of FIGS. 3A and 3B may be an example of the wearable device 101 of FIG. 1 and/or the wearable device of FIG. 2.

Referring to FIG. 3A, according to an embodiment of the disclosure, the wearable device 300 may include at least one display 350 and a frame supporting the at least one display 350.

According to an embodiment of the disclosure, the wearable device 300 may be worn on a portion of a body of a user. The wearable device 300 may provide augmented reality (AR), virtual reality (VR), or mixed reality (MR) that mixes augmented reality and virtual reality to the user wearing the wearable device 300. For example, the wearable device 300 may output a virtual reality image to the user through the at least one display 350 in response to the designated gesture of the user obtained through a motion recognition camera 340-2 of FIG. 3B.

According to an embodiment of the disclosure, the at least one display 350 in the wearable device 300 may provide visual information to the user. For example, the at least one display 350 may include a transparent or translucent lens. The at least one display 350 may include a first display 350-1 and/or a second display 350-2 spaced apart from the first display 350-1. For example, the first display 350-1 and the second display 350-2 may be disposed at locations corresponding to the user's left and right eyes, respectively.

Figure 3B:
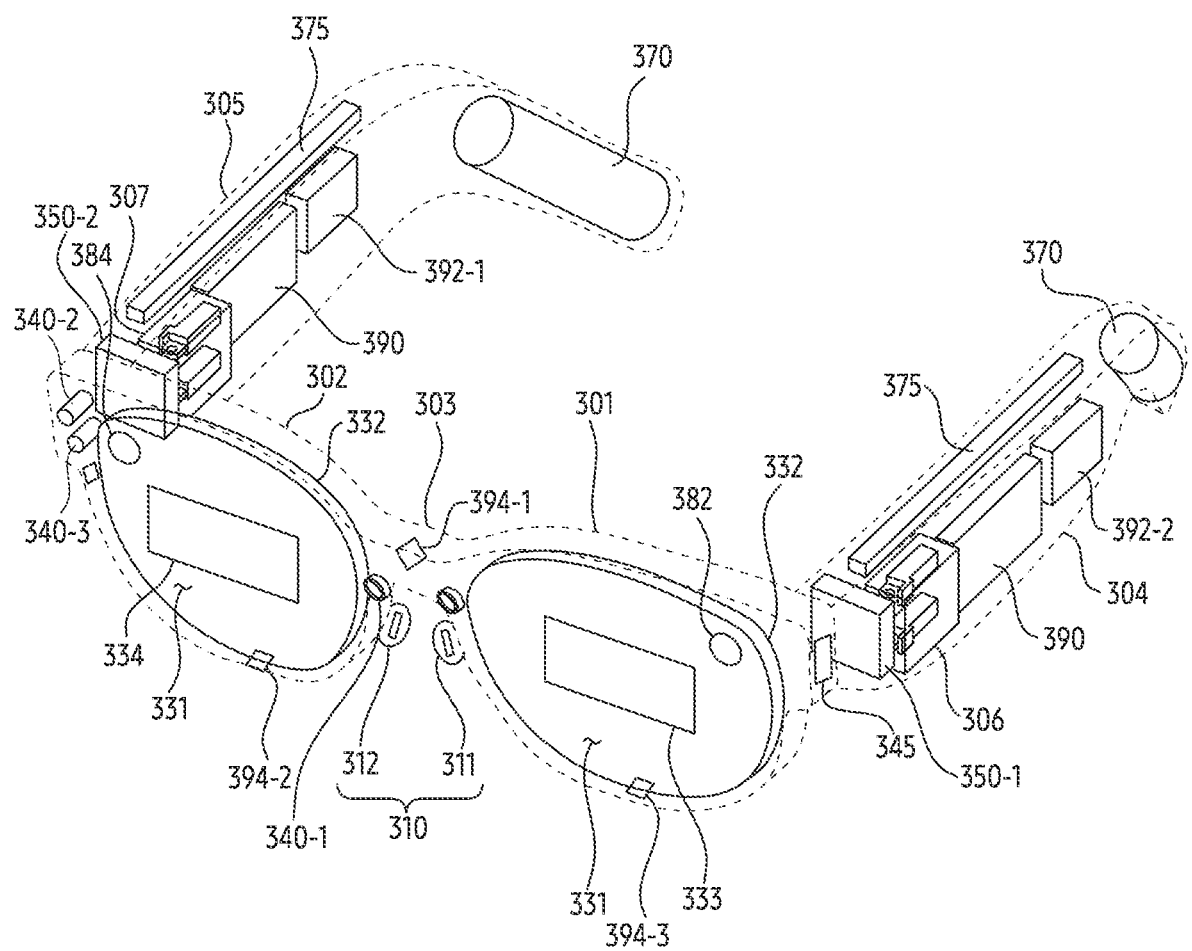
FIG. 3B illustrates one or more hardware disposed in a wearable device according to an embodiment of the disclosure.

FIG. 3B illustrates one or more hardware disposed in a wearable device according to an embodiment of the disclosure.

Referring to FIG. 3B, the at least one display 350 may provide a user wearing the wearable device 300, with visual information included in ambient light passing through the lens along with other visual information that is distinct from the visual information, by forming a displaying area on the lens. The lens may be formed based on at least one of a Fresnel lens, a pancake lens, or a multi-channel lens. The displaying area formed by the at least one display 350 may be formed on the second surface 332 among the first surface 331 and the second surface 332 of the lens. When the user wears the wearable device 300, the ambient light may be transmitted to the user by being incident to the first surface 331 and passing through the second surface 332. For another example, the at least one display 350 may display a virtual reality image to be combined with a real screen transmitted through the ambient light. The virtual reality image outputted from the at least one display 350 may be transmitted to the eyes of the user through one or more hardware included in the wearable device 300 (e.g., optical devices 382 and 384), and/or at least one waveguides 333 and 334.

According to an embodiment of the disclosure, the wearable device 300 may include the waveguides 333 and 334 that are transmitted from the at least one display 350, diffract light relayed by the optical devices 382 and 384, and transmit it to the user. The waveguides 333 and 334 may be formed based on at least one of glass, plastic, or polymer. A nano pattern may be formed on at least a portion of the outside or inside of the waveguides 333 and 334. The nano pattern may be formed based on a grating structure having a polygonal or curved shape. Light incident on one end of the waveguides 333 and 334 may be propagated to the other end of the waveguides 333 and 334 by the nano pattern. The waveguides 333 and 334 may include at least one of at least one diffraction element (e.g., a diffractive optical element (DOE), a holographic optical element (HOE)), and a reflection element (e.g., a reflective mirror). For example, the waveguides 333 and 334 may be disposed in the wearable device 300 to guide a screen displayed by the at least one display 350 to the eyes of the user. For example, the screen may be transmitted to the eyes of the user based on total internal reflection (TIR) generated in waveguides 333 and 334.

According to an embodiment of the disclosure, the wearable device 300 may analyze an object included in a real image collected through a photographing camera 340-1, combine a virtual object corresponding to objects subject to augmented reality provision among the analyzed object and display it on the at least one display 350. The virtual object may include at least one of text and images for various information associated with the object included in the real image. The wearable device 300 may analyze the object based on a multi-camera, such as a stereo camera. For the object analysis, the wearable device 300 may execute time-of-flight (ToF) and/or simultaneous localization and mapping (SLAM) supported by the multi-camera. The user wearing the wearable device 300 may view an image displayed on the at least one display 350.

According to an embodiment of the disclosure, the frame may have a physical structure in which the wearable device 300 may be worn on the body of the user. According to an embodiment of the disclosure, the frame may be configured so that when the user wears the wearable device 300, the first display 350-1 and the second display 350-2 may be located in location corresponding to the user's left and right eyes. The frame may support the at least one display 350. For example, the frame may support the first display 350-1 and the second display 350-2 to be located in location corresponding to the user's left and right eyes.

According to an embodiment of the disclosure, referring to FIG. 3A, in case that the user wears the wearable device 300, at least a portion of the frame may include an area 320 in contact with a portion of the body of the user. For example, the area 320 in contact with a portion of the body of the user of the frame may include an area in contact with a portion of the nose of the user, a portion of the ear of the user, and a portion of the side of the face of the user, in which the wearable device 300 contacts. According to an embodiment of the disclosure, the frame may include a nose pad 310 which is contacted on the portion of the body of the user. When the wearable device 300 is worn by the user, the nose pad 310 may be contacted on the portion of the nose of the user. The frame may include a first temple 304 and a second temple 305 which are contacted on another portion of the body of the user, which is distinct from a portion of the body of the user.

In an embodiment of the disclosure, the frame may include a first rim 301 surrounding at least a portion of the first display 350-1, a second rim 302 surrounding at least a portion of the second display 350-2, a bridge 303 disposed between the first rim 301 and the second rim 302, a first pad 311 disposed along a portion of the edge of the first rim 301 from one end of the bridge 303, a second pad 312 disposed along a portion of the edge of the second rim 302 from the other end of the bridge 303, the first temple 304 extending from the first rim 301 and fixed to a portion of the ear of the wearer, and the second temple 305 extending from the second rim 302 and fixed to a portion of the ear opposite to the ear. The first pad 311 and the second pad 312 may be in contact with a portion of the nose of the user, and the first temple 304 and the second temple 305 may be in contact with a portion of the face of the user and a portion of the ear of the user. The temples 304 and 305 may be rotatably connected to the rim through the hinge units 306 and 307 of FIG. 3B. The first temple 304 may be rotatably connected with respect to the first rim 301 through a first hinge unit 306 disposed between the first rim 301 and the first temple 304. The second temple 305 may be rotatably connected with respect to the second rim 302 through a second hinge unit 307 disposed between the second rim 302 and the second temple 305. According to an embodiment of the disclosure, the wearable device 300 may identify an external object (e.g., a fingertip of the user) touching the frame and/or a gesture performed by the external object by using a touch sensor, a grip sensor, and/or a proximity sensor formed on at least a portion of the surface of the frame.

According to an embodiment of the disclosure, the wearable device 300 may include hardware (e.g., hardware described above based on the block diagram of FIGS. 6A and 6B) that performs various functions. For example, the hardware includes a battery module 370, an antenna module 375, optical devices 382 and 384, speakers 392-1 and 392-2, and microphones 394-1, 394-2 and 394-3), a light emitting module (not illustrated), and/or a printed circuit board 390. Various hardware may be disposed in the frame.

According to an embodiment of the disclosure, the microphones 394-1, 394-2, and 394-3 of the wearable device 300 may obtain a sound signal, by being disposed on at least a portion of the frame. The first microphone 394-1 disposed on the nose pad 310, the second microphone 394-2 disposed on the second rim 302, and the third microphone 394-3 disposed on the first rim 301 are illustrated in FIG. 3B, but the number and disposition of microphones 394 are not limited to the embodiment of FIG. 3B. In case that the number of microphones 394 included in the wearable device 300 is two or more, the wearable device 300 may identify the direction of the sound signal by using a plurality of microphones disposed on different portions of the frame.

According to an embodiment of the disclosure, the optical devices 382 and 384 may transmit the virtual object transmitted from the at least one display 350 to the waveguides 333 and 334. For example, the optical devices 382 and 384 may be projectors. The optical devices 382 and 384 may be disposed adjacent to the at least one display 350 or included in the at least one display 350 as a portion of the at least one display 350. The first optical device 382 may correspond to the first display 350-1, and the second optical device 384 may correspond to the second display 350-2. The first optical device 382 may transmit light outputted from the first display 350-1 to the first waveguide 333, and the second optical device 384 may transmit light outputted from the second display 350-2 to the second waveguide 334.

In an embodiment of the disclosure, the camera 340 may include an eye tracking camera (ET CAM) 340-1, the motion recognition camera 340-2, and/or a photographing camera 340-3. The photographing camera 340-3, the eye tracking camera 340-1, and the motion recognition camera 340-2 may be disposed at different locations on the frame and may perform different functions. The eye tracking camera 340-1 may output data representing the gaze of the user wearing the wearable device 300. For example, the wearable device 300 may detect the gaze from an image including the pupils of the user obtain through the eye tracking camera 340-1. An example of eye tracking camera 340-1 being disposed toward the right eye of the user is illustrated in FIG. 3B, but the embodiment is not limited thereto, and the eye tracking camera 340-1 may be disposed alone toward the left eye of the user or may be disposed toward both eyes.

In an embodiment of the disclosure, the photographing camera 340-3 may photograph a real image or background to be matched with a virtual image in order to implement augmented reality or mixed reality content. The photographing camera may photograph an image of a specific object existing at a location viewed by the user and provide the image to the at least one display 350. The at least one display 350 may display one image in which a virtual image provided through the optical devices 382 and 384 is overlapped with information on a real image or background including an image of the specific object obtained by using the photographing camera. In an embodiment of the disclosure, the photographing camera may be disposed on the bridge 303 disposed between the first rim 301 and the second rim 302.

In an embodiment of the disclosure, the eye tracking camera 340-1 may realize a more realistic augmented reality by matching the gaze of the user with the visual information provided on the at least one display 350 by tracking the gaze of the user wearing the wearable device 300. For example, when the user looks at the front, the wearable device 300 may naturally display environment information associated with the front of the user on the at least one display 350 at the location where the user is located. The eye tracking camera 340-1 may be configured to capture an image of the pupil of the user in order to determine the gaze of the user. For example, the eye tracking camera 340-1 may receive gaze detection light reflected from the pupil of the user and may track the gaze of the user based on the location and movement of the received gaze detection light. In an embodiment of the disclosure, the eye tracking camera 340-1 may be disposed at a location corresponding to the left and right eyes of the user. For example, the eye tracking camera 340-1 may be located in the first rim 301 and/or the second rim 302 to face the direction in which the user wearing the wearable device 300 is located.

In an embodiment of the disclosure, the motion recognition camera 340-2 may provide a specific event to the screen provided on the at least one display 350 by recognizing the movement of the entire or portion of the body of the user, such as the torso of the user, the hand of the user, or the face of the user, and the like. The motion recognition camera 340-2 may obtain a signal corresponding to the gesture by recognize the gesture of the user, and may provide a display corresponding to the signal on the at least one display 350. The processor may perform a designated function based on identifying the signal corresponding to the operation. In an embodiment of the disclosure, the motion recognition camera 340-2 may be disposed on the first rim 301 and/or the second rim 302.

In an embodiment of the disclosure, the camera 340 included in the wearable device 300 is not limited to the above-described eye tracking camera 340-1 and the motion recognition camera 340-2. For example, the wearable device 300 may identify an external object included in the field-of-view (FoV) by using a photographing camera 340-3 located toward the FoV of the user. That the wearable device 300 identifies the external object may be performed based on a sensor for identifying a distance between the wearable device 300 and the external object, such as a depth sensor and/or a time of flight (ToF) sensor. The camera 340 disposed toward the FoV may support an autofocus function and/or an optical image stabilization (OIS) function. For example, the wearable device 300 may include the camera 340 (e.g., a face tracking (FT) camera) disposed toward the face in order to obtain an image including the face of the user wearing the wearable device 300.

Although not illustrated, the wearable device 300 according to an embodiment may further include a light source (e.g., light-emitting diode (LED)) that emits light toward a subject (e.g., user's eye, face, and/or an external object in the FoV) photographed by using the camera 340. The light source may include an LED having an infrared wavelength. The light source may be disposed on at least one of the frame and the hinge units 306 and 307.

According to an embodiment of the disclosure, the battery module 370 may supply power to electronic components of the wearable device 300. In an embodiment of the disclosure, the battery module 370 may be disposed in the first temple 304 and/or the second temple 305. For example, the battery module 370 may be a plurality of battery modules 370. A plurality of battery modules 370 may be disposed on each of the first temple 304 and the second temple 305. In an embodiment of the disclosure, the battery module 370 may be disposed at an end of the first temple 304 and/or the second temple 305.

In an embodiment of the disclosure, the antenna module 375 may transmit the signal or power to the outside of the wearable device 300 or may receive the signal or power from the outside. The antenna module 375 may be electrically and/or operatively connected to a communication circuit (e.g., a communication circuit 650 described later with reference to FIG. 6B) in the wearable device 300. In an embodiment of the disclosure, the antenna module 375 may be disposed in the first temple 304 and/or the second temple 305. For example, the antenna module 375 may be disposed close to one surface of the first temple 304 and/or the second temple 305.

In an embodiment of the disclosure, the speakers 392-1 and 392-2 may output sound signals to the outside of the wearable device 300. A sound output module may be referred to as a speaker. In an embodiment of the disclosure, the speakers 392-1 and 392-2 may be disposed in the first temple 304 and/or the second temple 305 in order to be disposed adjacent to the ear of the user wearing the wearable device 300. For example, the wearable device 300 may include the second speaker 392-2 disposed adjacent to the left ear of the user by being disposed in the first temple 304, and the first speaker 392-1 disposed adjacent to the right ear of the user by being disposed in the second temple 305.

In an embodiment of the disclosure, the light emitting module (not illustrated) may include at least one light emitting element. The light emitting module may emit light of a color corresponding to a specific state or may emit light through an operation corresponding to the specific state in order to visually provide information on a specific state of the wearable device 300 to the user. For example, in case that the wearable device 300 needs charging, it may repeatedly emit red light at a designated timing. In an embodiment of the disclosure, the light emitting module may be disposed on the first rim 301 and/or the second rim 302.

Referring to FIG. 3B, according to an embodiment of the disclosure, the wearable device 300 may include the printed circuit board (PCB) 390. The PCB 390 may be included in at least one of the first temple 304 and the second temple 305. The PCB 390 may include an interposer disposed between at least two sub PCBs. On the PCB 390, one or more hardware (e.g., hardware illustrated by blocks described later with reference to FIG. 5) included in the wearable device 300 may be disposed. The wearable device 300 may include a flexible PCB (FPCB) for interconnecting the hardware.

According to an embodiment of the disclosure, the wearable device 300 may include at least one of a gyro sensor, a gravity sensor, and/or an acceleration sensor for detecting the posture of the wearable device 300 and/or the posture of a body part (e.g., a head) of the user wearing the wearable device 300. The wearable device 300 may measure gravity acceleration and acceleration based on designated three-dimensional axes (e.g., x-axis, y-axis, and z-axis) perpendicular to each other by using the gravity sensor and the acceleration sensor, respectively. The gyro sensor may measure angular velocity of each of designated three-dimensional axes (e.g., x-axis, y-axis, and z-axis). At least one of the gravity sensor, the acceleration sensor, and the gyro sensor may be referred to as an inertial measurement unit (IMU). According to an embodiment of the disclosure, the wearable device 300 may identify the motion and/or gesture of the user performed to execute or stop a specific function of the wearable device 300 based on the IMU.

Figure 4A:
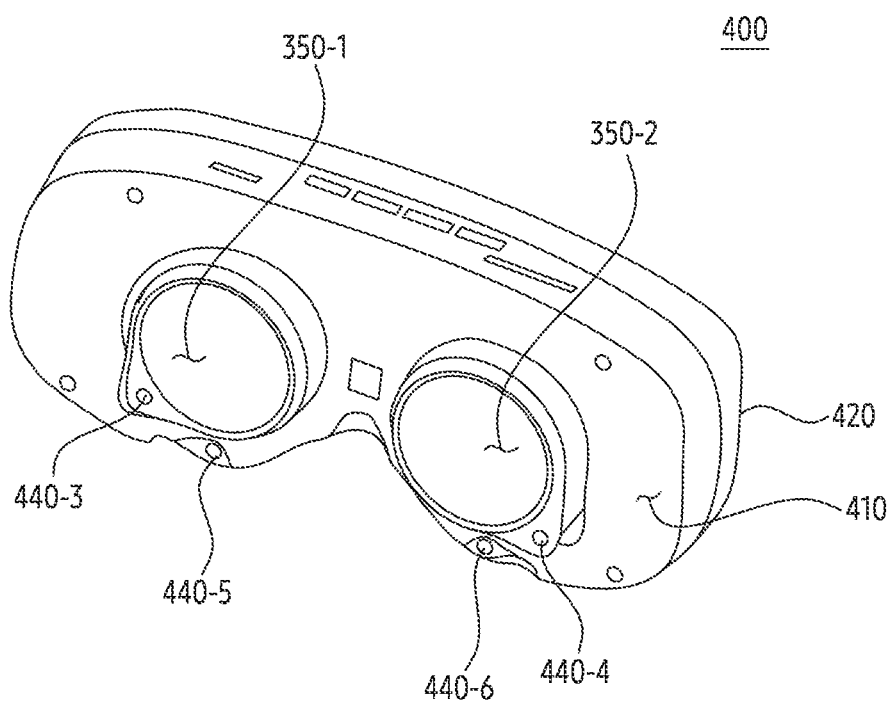
FIGS. 4A and 4B illustrate an exterior of a wearable device according to an embodiment of the disclosure.
Figure 4B:
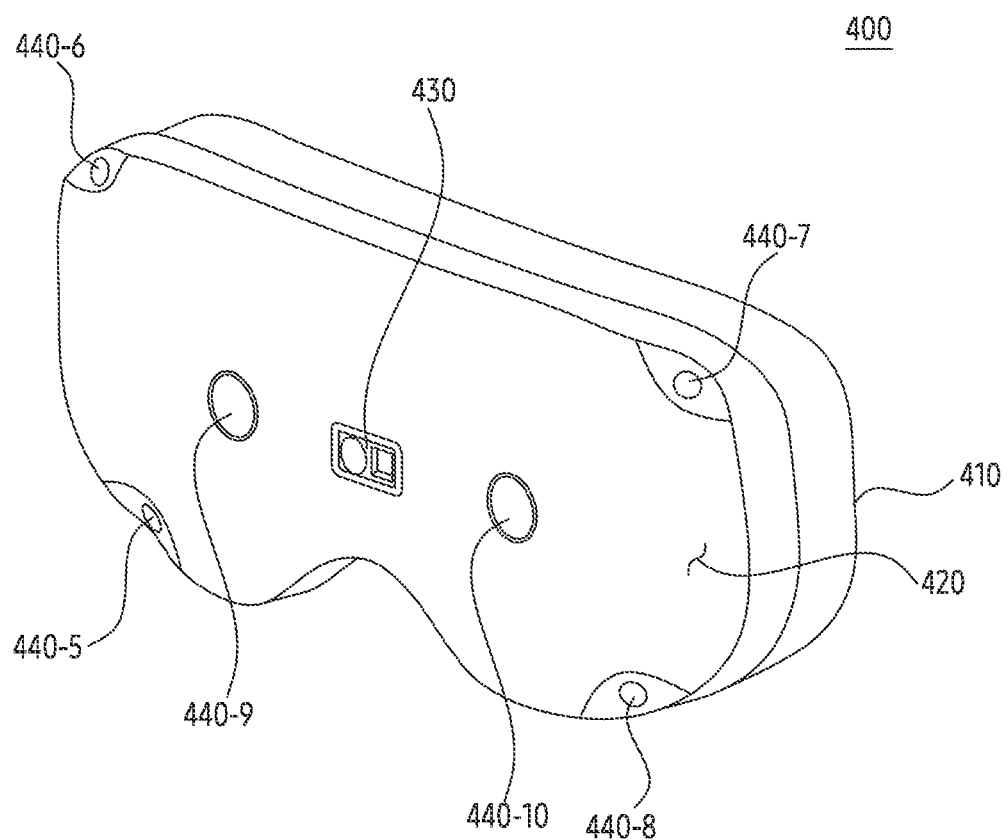

FIGS. 4A and 4B illustrate an exterior of a wearable device 400 according to an embodiment of the disclosure. The wearable device 400 of FIGS. 4A and 4B may be an example of a wearable device 101 of FIG. 1 and/or a wearable device of FIG. 2. According to an embodiment of the disclosure, an example of an exterior of a first surface 410 of the housing of the wearable device 400 may be illustrated in FIG. 4A, and an example of an exterior of a second surface 420 opposite to the first surface 410 may be illustrated in FIG. 4B.

Referring to FIG. 4A, according to an embodiment of the disclosure, the first surface 410 of the wearable device 400 may have an attachable shape on a body part of the user (e.g., a face of the user). Although not illustrated, the wearable device 400 may further include a strap for being fixed on the body part of the user, and/or one or more temples (e.g., a first temple 304 and/or a second temple 305 of FIGS. 3A and 3B). A first display 350-1 for outputting an image to the left eye among both eyes of the user and a second display 350-2 for outputting an image to the right eye among the both eyes of the user may be disposed on the first surface 410. The wearable device 400 may be formed on the first surface 410 and may further include rubber or silicon packing for preventing interference by light (e.g., ambient light) different from the light emitted from the first display 350-1 and the second display 350-2.

According to an embodiment of the disclosure, the wearable device 400 may include cameras 440-1 and 440-2 for photographing and/or tracking both eyes of the user adjacent to each of the first display 350-1 and the second display 350-2. The cameras 440-1 and 440-2 may be referred to as ET cameras. The wearable device 400 according to an embodiment may include cameras 440-3 and 440-4 for photographing and/or recognizing the face of the user. The cameras 440-3 and 440-4 may be referred to as FT cameras.

Referring to FIG. 4B, a camera (e.g., cameras 440-5, 440-6, 440-7, 440-8, 440-9, and 440-10), and/or a sensor (e.g., a depth sensor 430) for obtaining information associated with the external environment of the wearable device 400 may be disposed on the second surface 420 opposite to the first surface 410 of FIG. 4A. For example, the cameras 440-5, 440-6, 440-7, 440-8, 440-9, and 440-10 may be disposed on the second surface 420 in order to recognize an external object different from the wearable device 400. For example, by using cameras 440-9 and 440-10, the wearable device 400 may obtain images and/or media to be transmitted to both eyes of the user. The camera 440-9 may be disposed on the second surface 420 of the wearable device 400 to obtain an image to be displayed through the second display 350-2 corresponding to the right eye among the two eyes. The camera 440-10 may be disposed on the second surface 420 of the wearable device 400 to obtain an image to be displayed through the first display 350-1 corresponding to the left eye among the two eyes.

According to an embodiment of the disclosure, the wearable device 400 may include the depth sensor 430 disposed on the second surface 420 in order to identify a distance between the wearable device 400 and the external object. By using the depth sensor 430, the wearable device 400 may obtain spatial information (e.g., a depth map) of at least a portion of the FoV of the user wearing the wearable device 400.

Although not illustrated, a microphone for obtaining sound outputted from the external object may be disposed on the second surface 420 of the wearable device 400. The number of microphones may be one or more depending on embodiments.

As described above, the wearable device 400 according to an embodiment may have a form factor for being worn on a head of the user. The wearable device 400 may provide a user experience based on augmented reality, virtual reality, and/or mixed reality in the state worn on the head. The wearable device 400 may display a screen including the external object by using the first display 350-1 and the second display 350-2 for being disposed toward each of the two eyes of the user. In the screen, the wearable device 400 may register the external object or may display a result of executing a function assigned to the external object.

Hereinafter, referring to FIG. 5, a structure of one or more hardware included in a wearable device (e.g., the wearable device 101 of FIG. 1) including a wearable device 300 of FIGS. 3A and 3B and/or the wearable device 400 of FIGS. 4A and 4B will be described.

Figure 5:
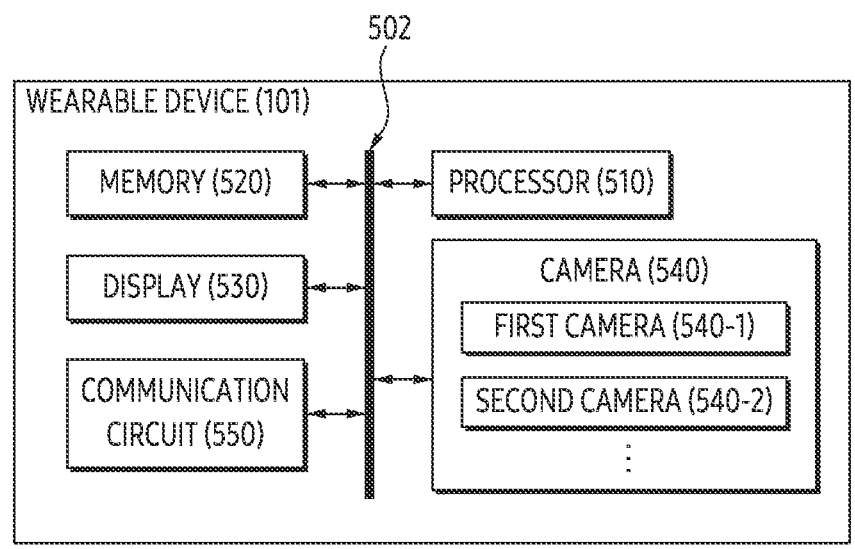
FIG. 5 is a block diagram of a wearable device according to an embodiment of the disclosure.

FIG. 5 is a block diagram of a wearable device according to an embodiment of the disclosure. The wearable device 101 of FIG. 5 may include the wearable device 101 of FIG. 1, a wearable device of FIG. 2, a wearable device 300 of FIGS. 3A and 3B, and/or a wearable device 400 of FIGS. 4A and 4B.

Referring to FIG. 5, the wearable device 101 may include at least one of a processor 510, a memory 520, a display 530, a camera 540, and a communication circuit 550. The processor 510, the memory 520, the display 530, the camera 540, and the communication circuit 550 may be electronically and/or operably coupled with each other by an electronical component, such as a communication bus 502. Hereinafter, that the hardware operably coupled with each other may mean that a direct connection or an indirect connection between hardware is established by wire or wirelessly so that the second hardware is controlled by the first hardware among the hardware. Although illustrated based on different blocks, the embodiment is not limited thereto, and some of the hardware of FIG. 5 (e.g., at least a portion of the processor 510, the memory 520, and the communication circuit 550) may be included in a single integrated circuit, such as a system on a chip (SoC). The types and/or numbers of hardware components included in the wearable device 101 are not limited to those illustrated in FIG. 5. For example, the wearable device 101 may include only some of the hardware components illustrated in FIG. 5.

The processor 510 of the wearable device 101 according to an embodiment may include the hardware component for processing data based on one or more instructions. The hardware component for processing data may include, for example, an arithmetic and logic unit (ALU), a floating point unit (FPU), a field programmable gate array (FPGA), a central processing unit (CPU), and/or an application processor (AP). The number of processors 510 may be one or more. For example, the processor 510 may have a structure of a multi-core processor, such as a dual core, a quad core, or a hexa core.

According to an embodiment of the disclosure, the memory 520 of the wearable device 101 may include the hardware component for storing data and/or instructions inputted and/or outputted to the processor 510. The memory 520 may include, for example, volatile memory such as a random-access memory (RAM) and/or a non-volatile memory, such as a read-only memory (ROM). The volatile memory may include, for example, at least one of a dynamic RAM (DRAM), a static RAM (SRAM), a cache RAM, and a pseudo SRAM (PSRAM). The non-volatile memory may include, for example, at least one of a programmable ROM (PROM), an erasable PROM (EPROM), an electrically erasable PROM (EEPROM), a flash memory, a hard disk, a compact disk, a solid state drive (SSD), and an embedded multimedia card (eMMC).

According to an embodiment of the disclosure, in the memory 520 of the wearable device 101, one or more instructions (or commands) indicating operations and/or operations to be performed on data by the processor 510 may be stored. The set of the one or more instructions may be referred to as firmware, operating system, process, routine, sub-routine, and/or application. For example, the wearable device 101 and/or the processor 510 may perform at least one of the operations of FIGS. 2, 7, 16, and/or 18 when set of a plurality of instructions distributed in the form of the operating system, the firmware, the driver, and/or the application is executed. Hereinafter, that the application is installed in the wearable device 101 means that the one or more instructions provided in the form of the application are stored in the memory 520 of the wearable device 101, and the one or more applications are stored in an executable format (e.g., a file having an extension designated by the operating system of the wearable device 101) by the processor 510 of the wearable device 101. For example, the wearable device 101 may obtain information (e.g., a path of a portion of the external object and/or at least one stroke drawn by the external object) associated with the motion of the external object (e.g., an external object 130 of FIG. 1), by executing the one or more instructions. The wearable device 101 may execute the one or more applications installed in the memory 520 based on the obtained information. The wearable device 101 may execute the one or more applications to execute a function matched to the external object based on the obtained information.

According to an embodiment of the disclosure, the display 530 of the wearable device 101 may output visualized information to the user. The display 530 of FIG. 5 may include at least one display 350 of FIGS. 3A and 3B and/or a first display 350-1 to a second display 350-2 of FIGS. 4A and 4B. The display 530 may output the visualized information to the user by being controlled by a controller, such as a graphics processing unit (GPU). The display 530 may include a flat panel display (FPD) and/or an electronic paper. The FPD may include a liquid crystal display (LCD), a plasma display panel (PDP), and/or one or more light emitting diodes (LEDs). The LED may include an organic LED (OLED).

According to an embodiment of the disclosure, the camera 540 of the wearable device 101 may include one or more optical sensors (e.g., a charged coupled device (CCD) sensor and a complementary metal oxide semiconductor (CMOS) sensor) that generate an electrical signal indicating the color and/or brightness of light. A plurality of optical sensors included in the camera 540 may be disposed in the form of a 2 dimensional array. The camera 540 may include a first camera 540-1 and a second camera 540-2. The camera 540 may generate 2 dimensional frame data corresponding to light reaching the light sensors of the 2 dimensional array, by substantially simultaneously obtaining electrical signals of a plurality of light sensors. For example, photo data captured by using the camera 540 may mean the one 2 dimensional frame data obtained from the camera 540. For example, video data captured by using the camera 540 may mean a sequence of a plurality of images obtained from the camera 540 according to a designated frame rate.

According to an embodiment of the disclosure, the wearable device 101 may include one or more cameras (e.g., the camera 540). In case that the wearable device 101 includes a plurality of cameras, the plurality of cameras may be distinguished by information to be obtained through the cameras. For example, a camera for tracking the eyes of the user wearing the wearable device 101 may be referred to as an ET camera (e.g., an ET camera 340-1 of FIGS. 3A and 3B). For example, a camera for tracking the face of the user wearing the wearable device 101 may be referred to as an FT camera. For example, in the wearable device 101, a camera for tracking the hand (e.g., a hand 140 of FIG. 1) of the user may be referred to as a motion recognition camera (e.g., a motion recognition camera 340-2 of FIG. 3B). Each of the plurality of cameras may be distinguished by a field-of-view (FoV) formed by a direction in which the camera faces and/or a view angle in a state in which the user wears the wearable device 101. The external object may include an object included in the FoV of the camera 540 and distinguished from the wearable device 101.

According to an embodiment of the disclosure, the communication circuit 550 of the wearable device 101 may include hardware for supporting transmission and/or reception of an electrical signal between the wearable device 101 and an external electronic device (e.g., a terminal 120 and/or a server 122 of FIG. 1). The communication circuit 550 may include, for example, at least one of a modem (MODEM), an antenna, and an optic/electronic (O/E) converter. The communication circuit 550 may support transmission and/or reception of the electrical signal based on various types of protocols, such as ethernet, local area network (LAN), wide area network (WAN), wireless fidelity (Wi-Fi), Bluetooth, Bluetooth low energy (BLE), ZigBee, long term evolution (LTE), and 5G new radio (NR).

Although not illustrated, the wearable device 101 according to an embodiment may include an output means for outputting information in a form other than a visualized form. For example, the wearable device 101 may include a speaker for outputting an acoustic signal. For example, the wearable device 101 may include a motor for providing haptic feedback based on vibration.

According to an embodiment of the disclosure, the wearable device 101 may identify the external object by using the camera 540. An attribute assigned to the external object may be stored in the memory 520 of the wearable device 101. Based on the attribute, the wearable device 101 may track at least one of a path of the external object and/or at least one stroke drawn by the external object. Based on the tracked path and/or the at least one stroke, the wearable device 101 may execute an application corresponding to the attribute. The wearable device 101 may obtain digital content from the tracked path and/or analog content indicated by the at least one stroke, by executing the application. The embodiment is not limited thereto, and the wearable device 101 may process the tracked path and/or information included in the at least one stroke based on the application.

In an embodiment of the disclosure, the wearable device 101 may receive an input for registering the identified external object by using the camera 540. Hereinafter, an example of an operation in which the wearable device 101 receives the input according to an embodiment will be described with reference to FIGS. 6A to 6D and/or 7.

FIGS. 6A, 6B, 6C, and 6D illustrate an operation of identifying an input indicating that a wearable device registers an external object according to an embodiment of the disclosure. The wearable device 101 of FIG. 5 may include the wearable device 101 of FIGS. 6A to 6D.

Referring to FIGS. 6A to 6D, according to an embodiment of the disclosure, different states 601, 602, 603, and 604 in which the wearable device 101 displays a user interface (UI) through a displaying area of a display (e.g., the display 530 of FIG. 5) are illustrated. In a state in which a user 110 wears the wearable device 101, the UI may be viewed by the user 110.

Figure 6A:
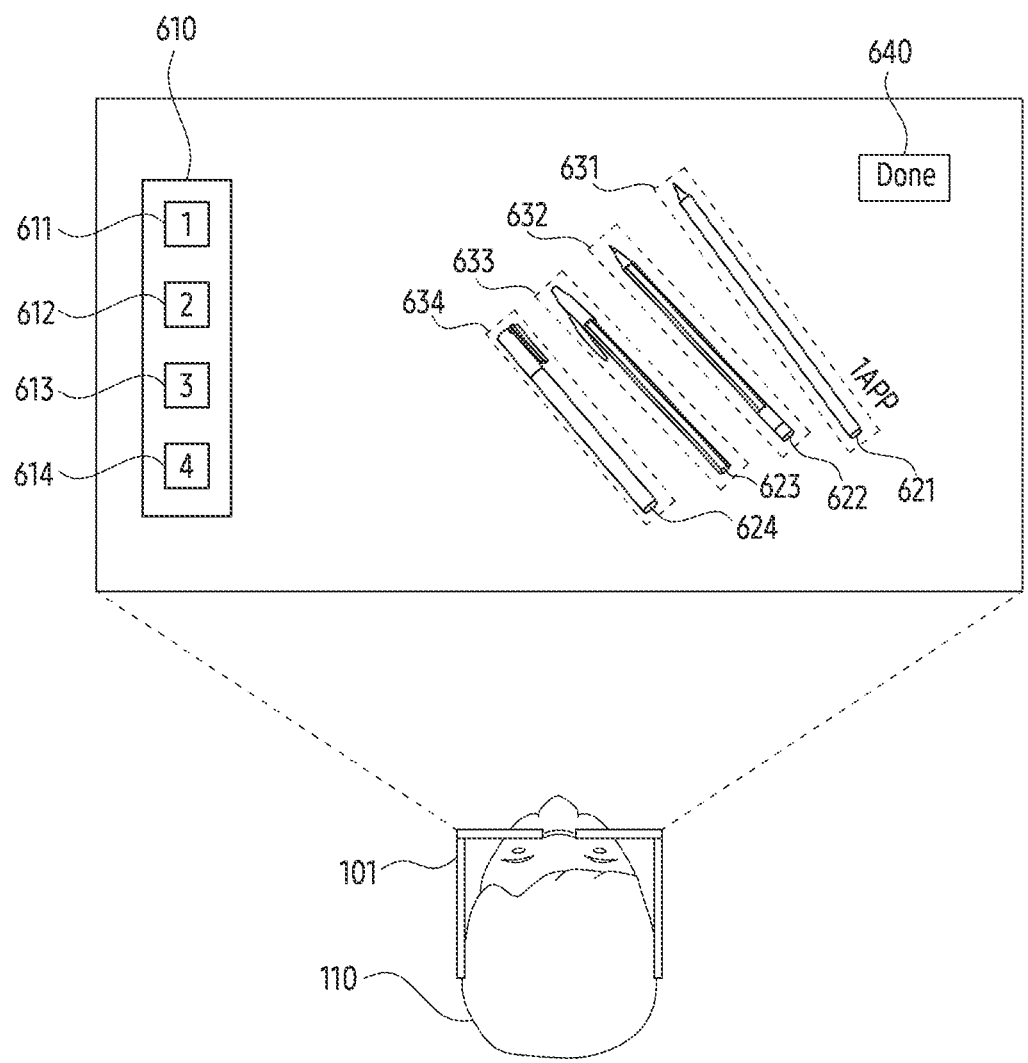
FIGS. 6A, 6B, 6C, and 6D illustrate an operation of identifying an input indicating that a wearable device registers an external object according to an embodiment of the disclosure.

Referring to FIG. 6A, according to an embodiment of the disclosure, the state 601 in which the wearable device 101 displays a list 610 of a plurality of applications stored in the memory (e.g., the memory 520 of FIG. 5) of the wearable device 101 in the displaying area formed by the display, is illustrated. The list 610 may be displayed in a portion of the displaying area and may have the form of an application tray. The wearable device 101 may display icons 611, 612, 613, and 614 representing each of the plurality of applications in the list 610. The number of icons 611, 612, 613, and 614 displayed in the list 610 by the wearable device 101 is not limited to the embodiment of FIG. 6A. In case that the number of applications installed on the wearable device 101 exceeds a designated upper limit that may be simultaneously displayable through the list 610, the wearable device 101 may switch an icon displayed through the list 610 in response to an input indicating to scroll the list 610.

In state 601 of FIG. 6A, according to an embodiment of the disclosure, the wearable device 101 may identify one or more external objects 621, 622, 623, and 624 shown by the user 110. In a state in which the user 110 is wearing the wearable device 101, the wearable device 101 may identify external objects 621, 622, 623, and 624 included in the displaying area of the display. Based on identifying external objects 621, 622, 623, and 624, the wearable device 101 may display bounding boxes 631, 632, 633, and 634 for guiding that the external objects 621, 622, 623, and 624 have been identified by the wearable device 101, in the displaying area. Although bounding boxes 631, 632, 633, and 634 having a rectangular line shape are illustrated, the embodiments are not limited thereto.

According to an embodiment of the disclosure, the wearable device 101 may identify whether the external object is registered based on the shape, size, and/or color of the external object. That the external object is registered may mean that the attribute of the external object including the shape, size, and/or color are stored in the wearable device 101 and/or the external electronic device (e.g., a terminal 120 and/or a server 122 of FIG. 1). Hereinafter, the operation of registering the external object in the wearable device 101 is not limited to the operation of storing the attributes of the external object in the wearable device 101, and may include a case stored in the external electronic device connected to the wearable device 101. In the case, according to an embodiment of the disclosure, the wearable device 101 may obtain attributes of the external object stored in the external electronic device by accessing the external electronic device. The attribute may include information (e.g., motion of the external object and/or material outputted from the external object) on the external object, which should be tracked by the wearable device 101. The attribute may include an application matched to the external object and/or a function matched to the external object among a plurality of functions supported by the application. The embodiment is not limited thereto, and the attribute may include a plurality of applications matched to the external object.

For example, in case that an external object 621 is registered in a wearable device 101, the wearable device 101 may display a bounding box 631 having a designated color (e.g., yellow) for guiding registration of the external object 621 overlapping with the external object 621 included in the displaying area. Referring to FIG. 6A, the wearable device 101 may display the name (e.g., "1 APP") of an application matched to the external object 621 in the displaying area in association with the external object 621. In case that the external objects 622, 623, and 624, which are distinguished from the external object 621, are not registered in the wearable device 101, the wearable device 101 may display the colors of the bounding boxes 632, 633, and 634, which overlap with the external objects 622, 623, and 624, in a designated color (e.g., blue) different from the designated color of the bounding box 631.

According to an embodiment of the disclosure, the wearable device 101 may enter the state 601 of FIG. 6A in response to an input indicating that the external object is registered with the wearable device 101. For example, the wearable device 101 may enter the state 601 of FIG. 6A in response to an input indicating that the list 610 is displayed. In the state 601, the wearable device 101 may display a visual object having the form of a button 640 for returning to another state before entering the state 601 in the displaying area.

Figure 6B:
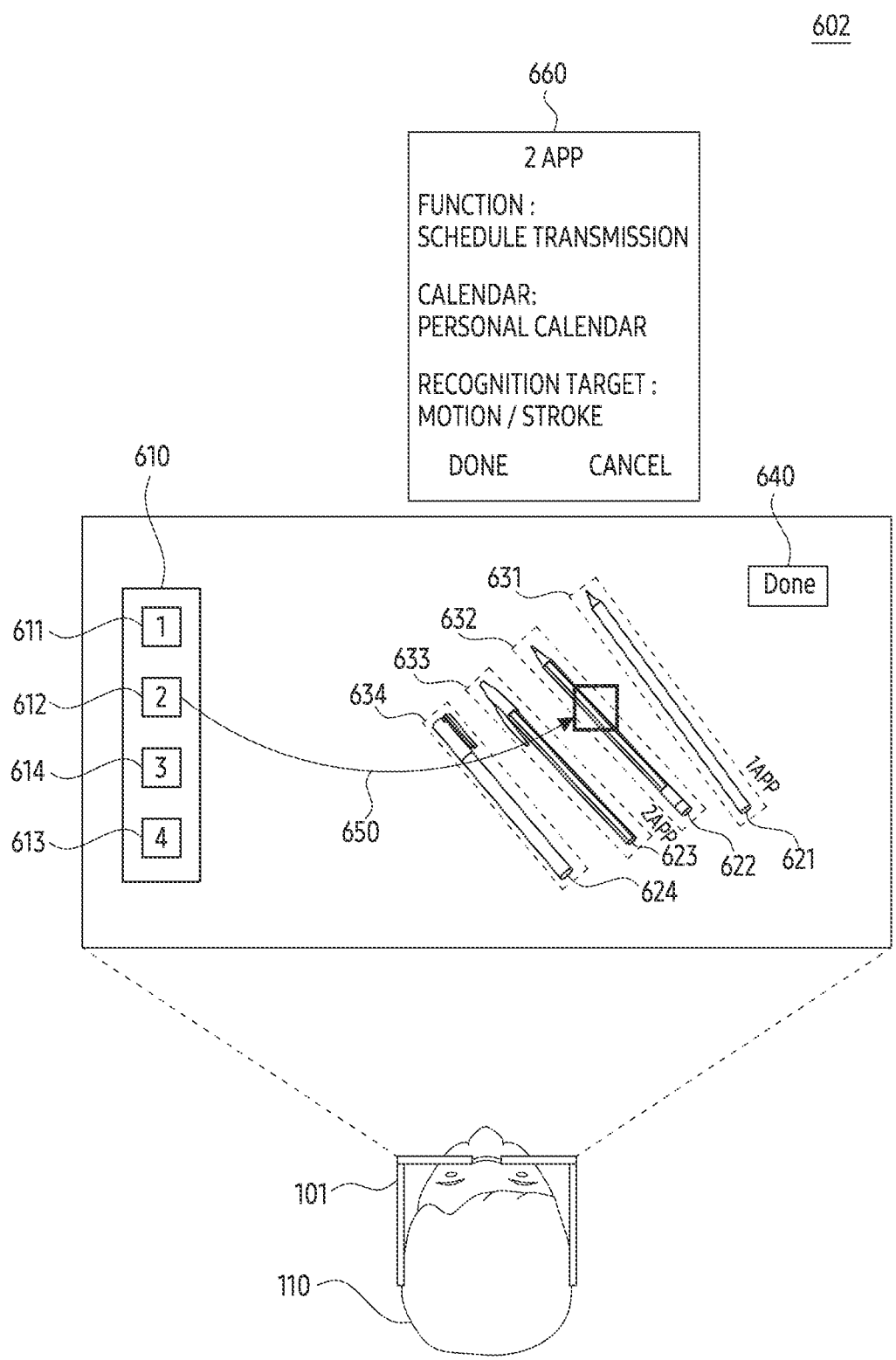

According to an embodiment of the disclosure, the wearable device 101 may identify an input indicating mapping of the application in the list 610 to the external object included in the displaying area. The input may include a gesture overlapping the visual object (e.g., at least one of icons 611, 612, 613, and 614) representing a specific application included in the list 610. Referring to FIG. 6B, a state 602 in which the wearable device 101 identifies the input included in the list 610 is illustrated. In the state 602, the wearable device 101 may display the icon 612 overlapping the external object 622 in response to the input. In the state 602, the wearable device 101 may identify a gesture that moves the icon 612 along the path 650 based on the motion of the designated body part (e.g., a hand 140 and/or an eye of FIG. 1) the user 110. The gesture may include a drag-and-drop gesture for the icon 612. The gesture may be identified based on a hand (or finger) that moves to a portion (e.g., an area visible to the user 110 wearing the wearable device 101, a space in which the icon 612 is floating) corresponding to the icon 612 in the outer space. The gesture may be identified based on the hand approaching less than a specified distance from the portion. The gesture may be identified based on the hand that remains in excess of a specified period (e.g., about 1 to 1.5 seconds) in a portion corresponding to the icon 612 in the external space. Although the gesture is illustrated based on the hand, the embodiment is not limited thereto. For example, the wearable device 101 may identify the gesture based on a direction of the gaze of the user 110 toward the icon 612, and/or a period in which the direction of the gaze of the user 110 faces the icon 612. For example, the wearable device 101 may identify an input that maps a specific application to a specific external object based on the remarks (e.g., "Please map which application with which pencil") of the user 110 and the gestures of the user 110 in the time section in which the remarks are received. Based on the input, the wearable device 101 may assign an application corresponding to the icon 612 to the external object 622 included in the displaying area.

Within the state 602 in which the input dragged along the path 650 of FIG. 6B is identified, the wearable device 101 may obtain attributes for executing the application (e.g., an application corresponding to the icon 612) by using the external object 622. Although the input of moving the icon 612 to the external object 622 along the path 650 is exemplarily described, the embodiment is not limited thereto. For example, the wearable device 101 may obtain the attribute for executing an application corresponding to an icon moved by the other input based on another input for moving one of the icons 611, 612, 613, and 614, to one of the external objects 621, 622, 623, and 624. For example, the wearable device 101 may display a visual object having the form of a window 660 for obtaining the attribute in the displaying area. The window 660 may be referred to as a screen for receiving one or more attributes associated with the application. In the window 660, the wearable device 101 may display information associated with the external object 622 selected by the input and/or the application. In the window 660, the wearable device 101 may display information (e.g., "function: schedule transmission") indicating an executable function by using the external object 622. The function may be supported by the application. In the window 660, the wearable device 101 may receive the attribute required to execute the function. The attribute required to execute the function may be set by the application selected by the input.

Referring to FIG. 6B, the wearable device 101 according to an embodiment may receive an input for selecting information to be recognized by the wearable device 101 in the window 660. For example, the wearable device 101 may display options for selecting which of a motion of a portion of the external object 622 or a stroke drawn by the external object 622 is tracked in the window 660. For example, in case that the external object 622 is recognized as a pen including ink, the wearable device 101 may display the options in the window 660. The wearable device 101 may display options for selecting a portion of the external object 622 to be tracked by the wearable device 101 in the window 660. For example, in case that one option for tracking the motion of the external object 622 is selected among the options, the wearable device 101 may track an end of the external object 622. The end of the external object 622 may be selected based on the location of the icon 612 dragged on the external object 622 along the path 650 among both ends of the external object 622. The embodiment is not limited thereto, and the wearable device 101 may additionally receive an input to select a portion of the external object 622 to be tracked by the wearable device 101.

Referring to FIG. 6B, an example of the wearable device 101 displaying the window 660 including attributes associated with the schedule application is illustrated in the state 602 in which the icon 612 corresponds to the schedule application. In the state 602, the wearable device 101 may display text (e.g., "calendar: personal calendar") for selecting the type of calendar to which information (e.g., a path of a portion of the external object 622 and/or handwriting drawn by the external object 622) obtained by tracking the external object 622 is added. In the state 602, the wearable device 101 may display options for selecting whether to track the end of the external object 622 or the stroke drawn by the external object 622. For example, in case that an option is selected to track the stroke drawn by the external object 622, the wearable device 101 may identify the handwriting input inputted through the material (e.g., ink and/or graphite) of the external object 622. The end of the external object 622 may be selected as an end adjacent to the point of the external object 622 where the icon 612 dragged along the path 650 overlaps, among both ends of the external object 622 extending along a length direction. The wearable device 101 may selectively display the window 660 according to the type of application selected in the list 610. In the state 602 of FIG. 6B, in response to an input indicating that a button (e.g., a button including a designated text, such as "OK") included in the window 660 is selected, the wearable device 101 may register external object 622 based on the attributes included in window 660. In an embodiment of registering the external object 622, independent of Windows 660, the wearable device 101 may register the external object 622 based on an input indicating that the icon 612 is dragged along the path 650. Based on the registration of the external object 622, the wearable device 101 may match a function (e.g., a function executed based on the attributes included in the window 660) to be executed by tracking the external object 622 to the external object 622.

Although an operation of obtaining at least one attribute set by a schedule application through the window 660 by the wearable device 101 has been described, the embodiment is not limited thereto. According to one embodiment of the disclosure, wearable device 101 may identify one or more attributes required to execute an application corresponding to the external object 622 in the state 602 for registration of the external object 622. The one or more attributes may be set by an application corresponding to an icon moved to external object 622 For example, the one or more attributes may be classified as shown in Table 1 based on applications installed in the wearable device 101.

TABLE 1

| Application | Attribute |
| --- | --- |
| Schedule application | the type of calendar the event will be stored in, the number of repetitions, and the timing of the reminder |
| Note application | the digital note where the handwriting will be stored, the style of the stroke (e.g., color, thickness, transparency and/or pattern) |
| Messenger application | receiver |
| Payment application | currency, bank, receiver |

Referring to Table 1, in case of matching the note application and the external object 622, the wearable device 101 may obtain a digital note in which digital content including at least one stroke drawn by the external object 622 is to be stored and/or the attribute for the style of the at least one stroke. In case of matching the messenger application and the external object 622, the wearable device 101 may obtain the attribute for a counterpart to receive the identified text message by tracking the external object 622. In case of matching the payment application and the external object 622, the wearable device 101 may obtain the attribute for the currency for the amount identified by tracking the external object 622, the counterpart to which the amount is to be remitted, and/or the bank. Independently of the attribute included in Table 1, the wearable device 101 may obtain an attribute for whether to track the end of the external object 622 or the stroke drawn by the external object 622.

Figure 6C:
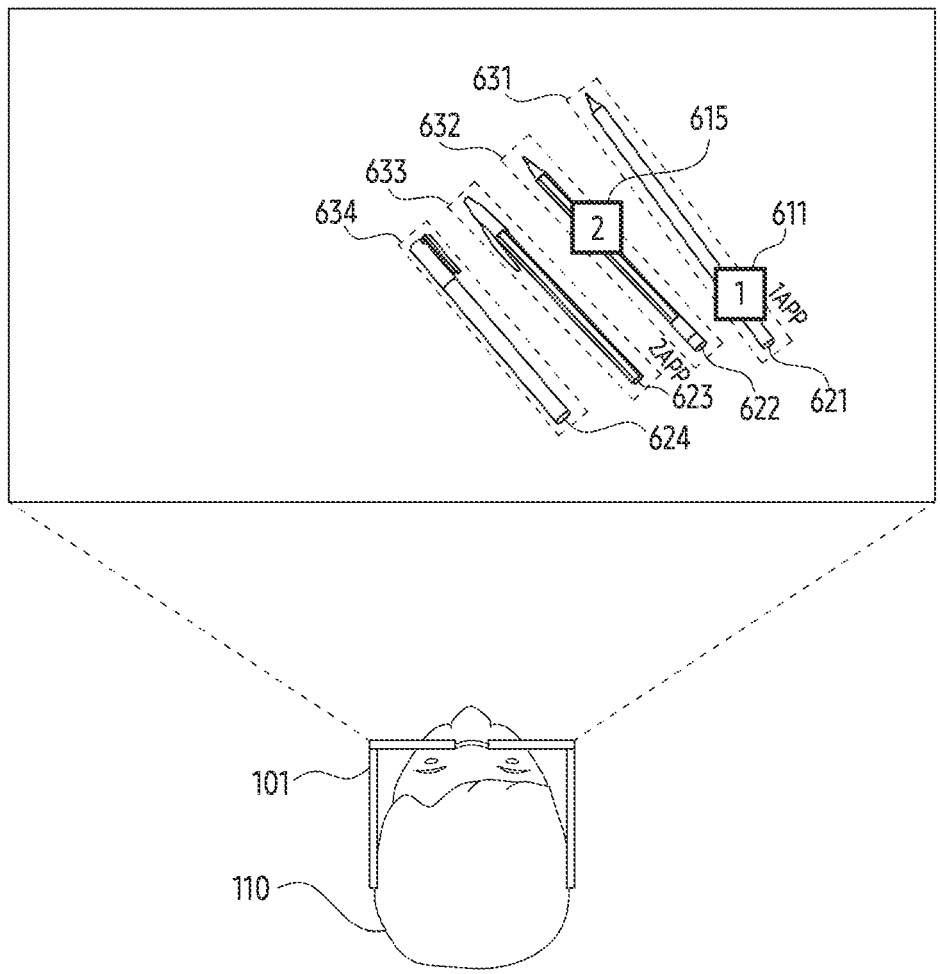

Referring to FIG. 6C, the state 603 in which the wearable device 101 registers the external object 622 is illustrated. The state 603 may be a state after the state 602. In the state 603, the wearable device 101 may display an icon 615 representing an application matched to the external object 622 in association with the external object 622 included in the displaying area. In an embodiment in which the external object 622 is registered based on an input that moves the icon 612 of FIG. 6B to the external object 622 along the path 650, the icon 615 of FIG. 6C may match the icon 612 of FIGS. 6A and 6B. The embodiment is not limited thereto. As described with reference to the state 601 of FIG. 6A, in the state 603 after the external object 621 is registered to the wearable device 101, the wearable device 101 may display the bounding boxes 631 and 632 having shapes wrapping each of the external objects 621 and 622 in a color different from that of the bounding boxes 633 and 634. The wearable device 101 may display the names (e.g., "1 APP" and "2 APP") of applications matched to each of the external objects 621 and 622 on a portion of the displaying area adjacent to the bounding boxes 631 and 632. In the state 603 of FIG. 6C, the wearable device 101 may change analog content generated by the registered external object 622 into digital content by using an application matched to the icon 612.

Figure 6D:
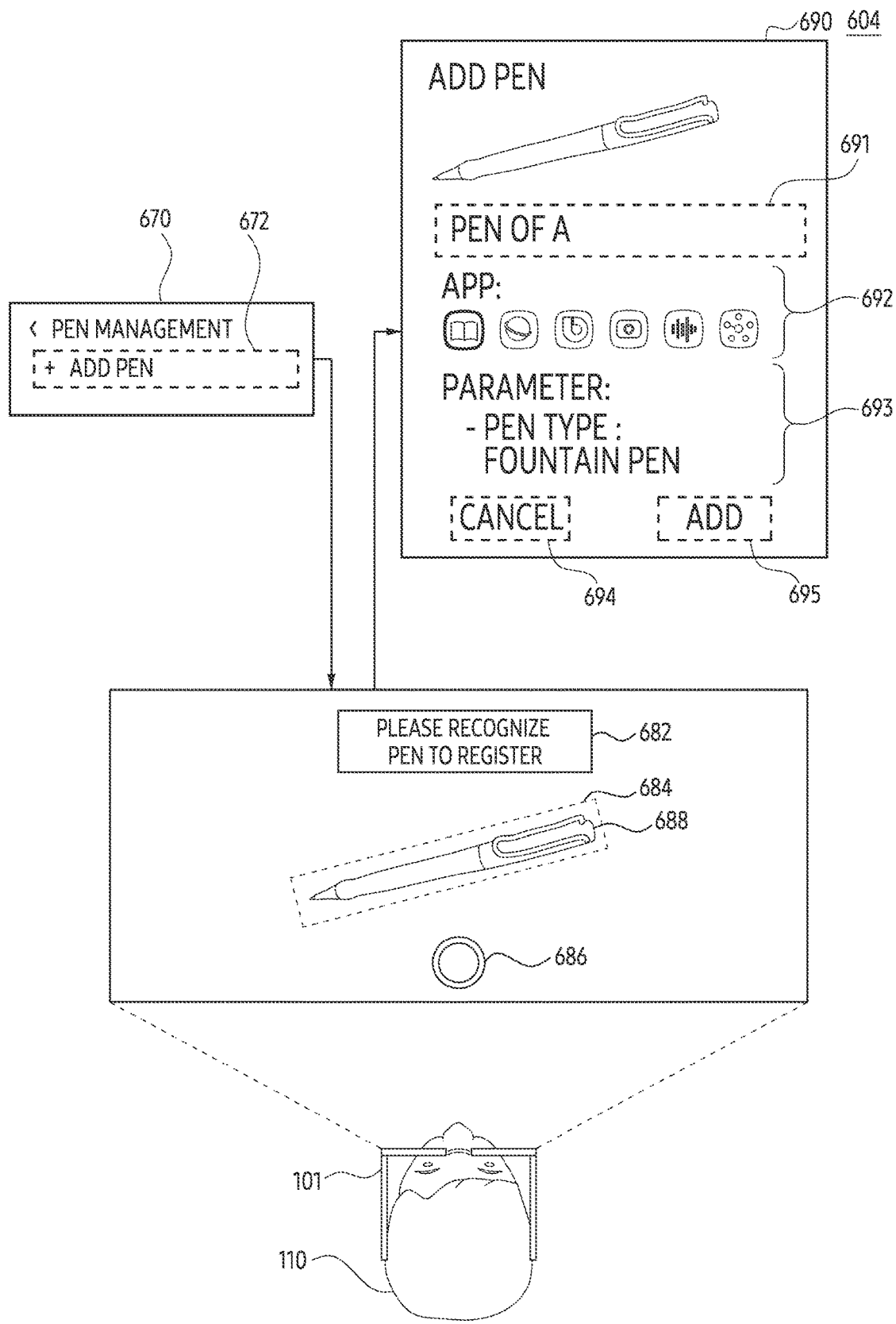

An embodiment of registering the external object by using the list 610 of FIG. 6A has been described, but the embodiment is not limited thereto. Referring to FIG. 6D, a state 604 in which the wearable device 101 registers an external object 688 is illustrated by using a camera (e.g., a motion recognition camera 340-2 of FIG. 3B, cameras 440-9 and 440-10 of FIG. 4B and/or a camera 540 of FIG. 5) having FoV that at least partially overlaps the displaying area of the wearable device 101. The wearable device 101 may display lists of one or more external objects registered as the wearable device 101 in a visual object having the form of a window 670 overlapping at least a portion of the displaying area. In the window 670, the wearable device 101 may display a visual object having the form of a button 672 including designated text (e.g., "add pen") for registering the external object. In response to an input indicating to select the button 672, the wearable device 101 may display a UI for registering the external object in the displaying area.

In the state 604 of FIG. 6D, the wearable device 101 may display the UI for identifying the selection of the user for the external object in the displaying area based on the input indicating to select the button 672. For example, the wearable device 101 may display a visual object having the form of a window 682 including a designated text (e.g., "Please recognize the pen to be registered") for guiding the selection of the external object in the displaying area. The wearable device 101 may display a bounding box 684 in association with the external object 688 included in the displaying area based on identifying the external object 688 in the displaying area. The wearable device 101 may display a shutter 686 for recognizing the external object 688 included in the displaying area. Based on an input indicating to select the shutter 686 and/or the bounding box 684, the wearable device 101 may display a window 690 for registering the external object 688.

In the state 604 of FIG. 6D, the wearable device 101 may display an image for the external object 688 in the window 690. The image may include an image obtained by controlling the camera by the wearable device 101 that identifies a gesture for the shutter 686. In the image, the wearable device 101 may display a portion of the external object 688 to be tracked by the wearable device 101. In the window 690, the wearable device 101 may display one or more attributes for the external object 688. The one or more attributes for the external object 688 may include a name assigned to the external object 688. The wearable device 101 may identify an input indicating that the name is assigned by using a text box 691 included in the window 690. The one or more attributes for the external object 688 may include one or more applications matched to the external object 688. The wearable device 101 may display a list 692 of applications installed in the wearable device 101 in the window 690. Through the list 692, the wearable device 101 may identify an input indicating to match the one or more applications to the external object 688. The wearable device 101 may emphasize an icon of an application selected by the input in the list 692. The wearable device 101 may emphasize the icon based on the thickness, color and/or pattern of the outline of the icon.

According to an embodiment of the disclosure, the wearable device 101 may display the attribute associated with at least one application selected through the list 692 in a portion 693 of the window 690. In the state 604 of FIG. 6D, the wearable device 101 may display the attribute associated with the drawing application in the portion 693, in response to an input indicating to select the drawing application for drawing an image in the list 692. For example, the wearable device 101 may display a visual object for adjusting a brush type corresponding to the external object 688 in the portion 693. The wearable device 101 may identify a category of the external object 688 among designated categories associated with the pen by performing object recognition on the external object 688. In the state 604 that the wearable device 101 has identified the external object 688 having the shape of a fountain pen, the wearable device 101 may display text indicating the brush type (e.g., "fountain pen") corresponding to the category of the external object 688 in the portion 693 of the window 690. The attribute displayed through the portion 693 is not limited thereto, and the wearable device 101 may display other attributes (e.g., stroke width, color, and pattern) associated with the drawing application in the portion 693. The other attributes may also be adaptively changed based on the category of the external object 688.

As described above, the wearable device 101 according to an embodiment may register the external object based on object recognition using a camera in a state worn by the user 110. The wearable device 101 may provide the user 110 with a user experience of changing the analog content into digital content, by registering the external object, such as a pen used by the user 110 to generate analog content. In the state 604 of registering the external object 688, the wearable device 101 may change the attribute for the external object 688 based on characteristics of the external object 688.

Hereinafter, an operation of the wearable device 101 associated with the states 601, 602, 603, and 604 of FIGS. 6A to 6D will be described with reference to FIG. 7.

Figure 7:
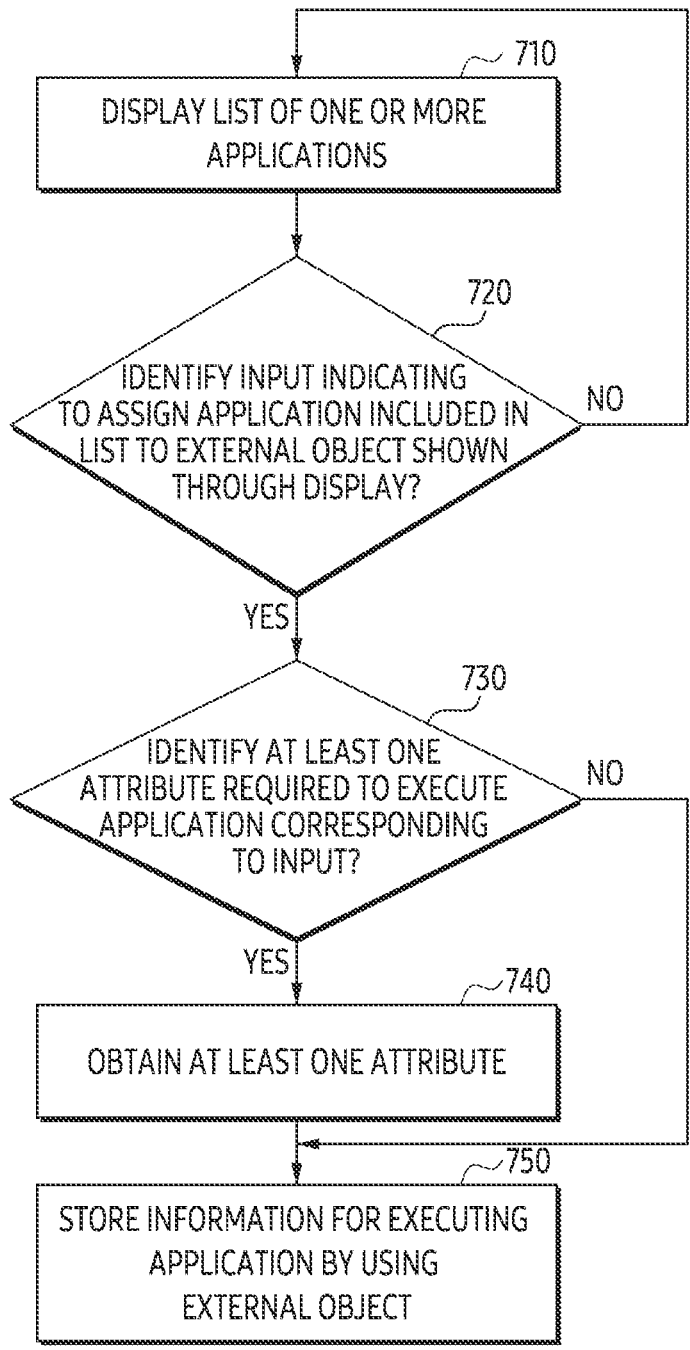
FIG. 7 illustrates a flowchart for a wearable device according to an embodiment of the disclosure.

FIG. 7 illustrates a flowchart for a wearable device according to an embodiment of the disclosure. A wearable device 101 of FIG. 5 may include the wearable device of FIG. 7. For example, operations of FIG. 7 may be performed by the wearable device 101 and/or a processor 510 of FIG. 5. The operations of FIG. 7 may be associated with at least one of the states 601, 602, 603, and 604 of FIGS. 6A to 6D. The operations of FIG. 7 may be associated with at least one of the operations of FIG. 2 (e.g., an operation 210 of FIG. 2).

Referring to FIG. 7, in operation 710, according to an embodiment of the disclosure, the wearable device may display a list of one or more applications. In the state 601 of FIG. 6A, the wearable device may display the list (e.g., a list 610 of FIG. 6A) of one or more applications installed in the wearable device by performing operation 719. In the list, the wearable device may display one or more icons representing the one or more applications.

Referring to FIG. 7, in operation 720, according to an embodiment of the disclosure, the wearable device may identify an input indicating to assign an application included in the list to an external object shown through a display. For example, based on the icon included in the list and selected by a user (e.g., a user 110 in FIG. 1), such as an input indicating dragging an icon 612 along a path 650 in FIG. 6B, the wearable device may identify the input indicating to assign the application to the external object. Before identifying the input (720-NO), the wearable device may maintain displaying the list based on the operation 710.

Based on operation 730, in the state of receiving the input indicating to assign the application to the external object (720-YES), according to an embodiment of the disclosure, the wearable device may identify at least one attribute required to execute an application corresponding to the input. As shown in Table 1, the at least one attribute may be set by the application assigned to the external object by the input of the operation 720. The embodiment is not limited thereto, and the number of attributes set by the application may be zero. In case that the at least one attribute required to execute the application does not exist (730-NO), the wearable device may bypass performing operation 740. For example, in case that no attribute is required to execute the application, the wearable device may not obtain at least one attribute based on the operation 740.

In the state of identifying the at least one attribute (e.g., an attribute distinguished by the application of Table 1) required to execute the application (730-YES), based on the operation 740, the wearable device according to an embodiment may obtain the at least one attribute. The at least one attribute may be set by a category of the external object identified based on the shape of the external object and/or object recognition. The at least one attribute may be identified through a visual object having the form of a pop-up window displayed by the wearable device to receive attributes, such as a window 660 of FIG. 6B and/or a window 690 of FIG. 6D. For example, the wearable device may display the visual object to identify the at least one attribute, such as the window 660 of FIG. 6B and/or a portion 693 of the window 690 of FIG. 6D, based on the operation 740.

Referring to FIG. 7, in operation 750, the wearable device according to an embodiment may store information for executing the application by using the external object. The wearable device may store, in a memory (e.g., the memory 520 of FIG. 5), the at least one attribute obtained based on the operation 740 together with information for recognizing the external object. After the operation 750, in response to identifying motion of the external object (e.g., a path of a portion of the external object) and/or analog content (e.g., at least one stroke generated by a material included in the external object) generated by the external object, the wearable device may execute the application by using the stored information based on the operation 750.

As described above, according to an embodiment of the disclosure, the wearable device, such as a pen, may register the external object that does not support communication with the wearable device. Based on the registered external object, the wearable device may obtain digital content from the external object. Hereinafter, according to an embodiment of the disclosure, an example of a UI displayed by a wearable device within a state identifying different external objects registered as wearable devices will be described with reference to FIGS. 8A and 8B.

Figure 8A:
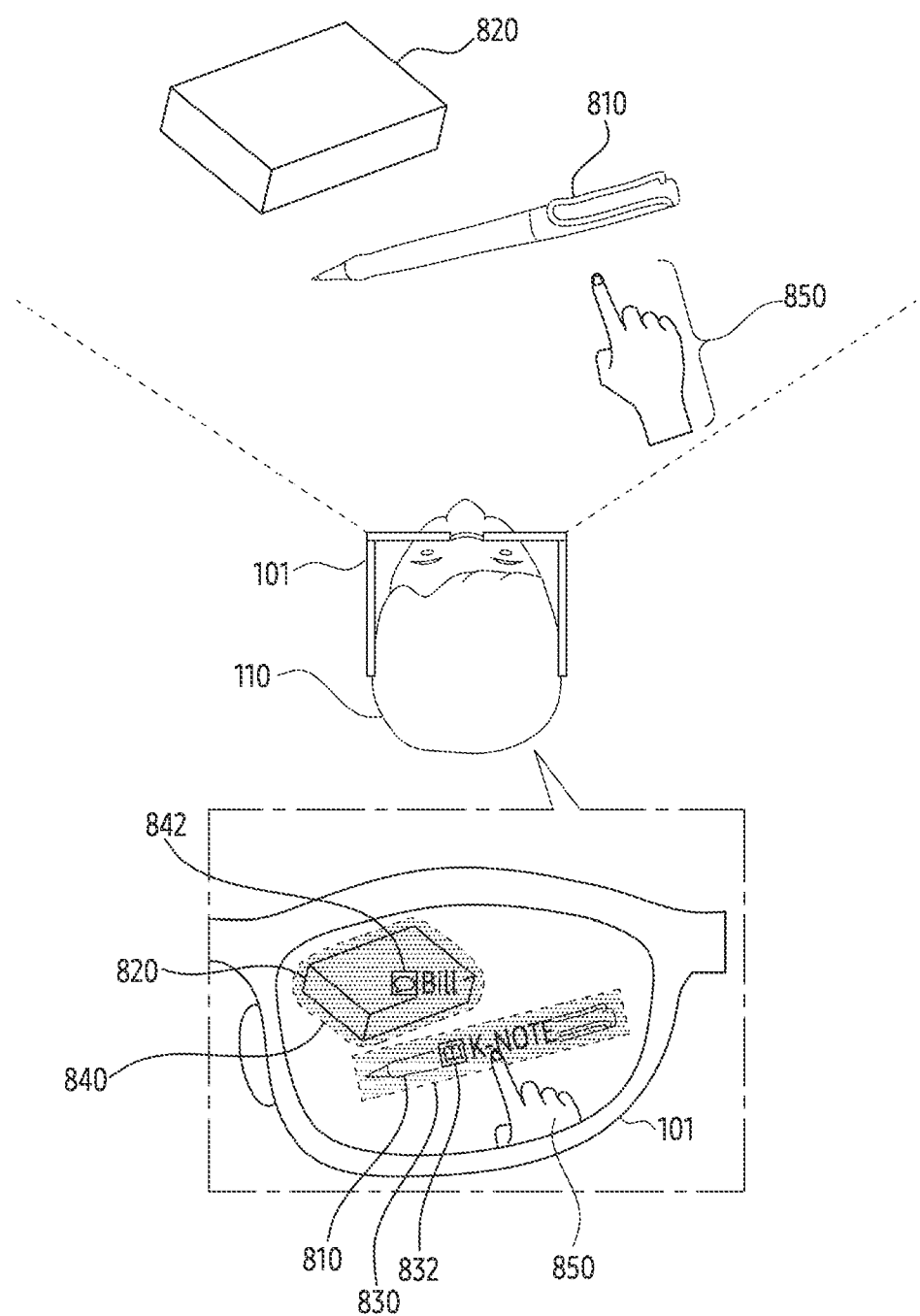
FIGS. 8A and 8B illustrate a user interface (UI) displayed by a wearable device based on an external object according to an embodiment of the disclosure.
Figure 8B:
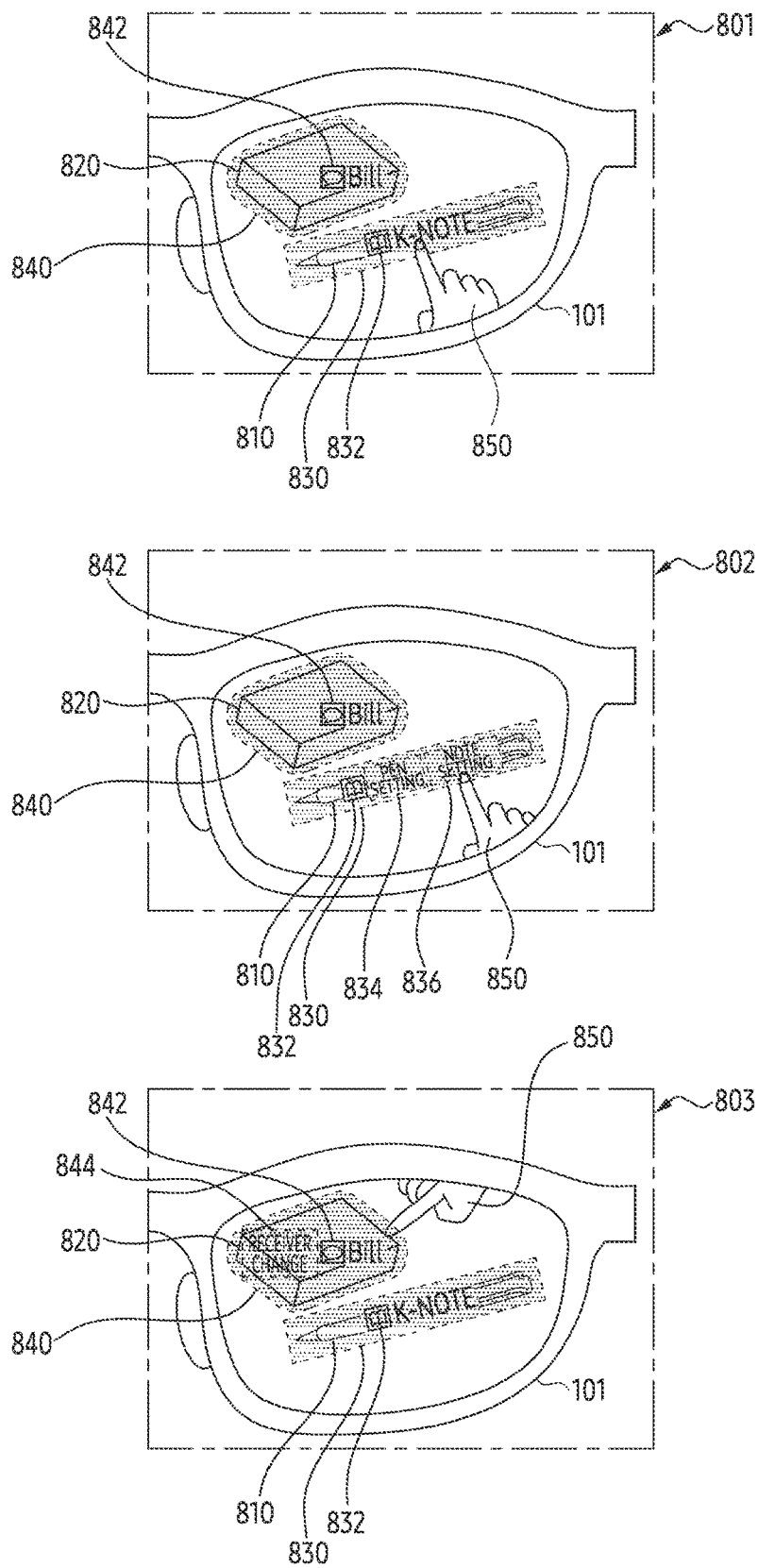

FIGS. 8A and 8B illustrate a user interface (UI) displayed by a wearable device based on an external object according to an embodiment of the disclosure. The wearable device 101 of FIG. 5 may include the wearable device 101 of FIGS. 8A and 8B.

Referring to FIGS. 8A and 8B, according to an embodiment of the disclosure, different states 801, 802, and 803 in which the wearable device 101 displays the UI based on different external objects 810 and 820 included in the displaying area of a display (e.g., the display 530 of FIG. 5) are illustrated. It is assumed that each of the external objects 810 and 820 is registered as the wearable device 101 in response to an input indicating to register the external object described above with reference to FIGS. 6A to 6D and/or 7.

Referring to FIG. 8A, in state 801, according to one embodiment of the disclosure, the wearable device 101 may identify the external objects 810 and 820 by using a camera having FoV that overlaps at least partially with the displaying area (e.g., a motion recognition camera 340-2 of FIG. 3B, cameras 440-9 and 440-10 of FIG. 4B, and/or a camera 540 of FIG. 5). The wearable device 101 may identify whether each of the external objects 810 and 820 is an external object registered in the wearable device 101 based on the shape and/or size of each of the external objects 810 and 820. In the assumption, the wearable device 101 may identify attributes assigned to each of the external objects 810 and 820. Based on the identified attribute, the wearable device 101 may display one or more visual objects based on the attribute, overlapping the external objects 810 and 820 in the displaying area.

In the state 801 of FIG. 8A, in case that a note application for generating a digital note is assigned to an external object 810, the wearable device 101 may display an icon 832 that is associated with the external object 810 and represents the note application. Referring to FIG. 8A, the wearable device 101 may display the icon 832 representing the note application overlapping the external object 810. The embodiment is not limited thereto, and the wearable device 101 may display the icon 832 on a portion adjacent to the external object 810 in the displaying area. The wearable device 101 may display a FIG. 830 for guiding the note application registered as an external object 810. The wearable device 101 may display the quadrangle FIG. 830 having a location associated with the external object 810. The color of the FIG. 830 may have a designated transparency or opacity and may at least partially include the color of the icon 832. For example, the color of the FIG. 830 may be a gradation of the color of the icon 832 and the color of the external object 810. Although the polygonal FIG. 830, such as a quadrangle is exemplarily illustrated, the embodiment is not limited thereto, and the wearable device 101 may display the FIG. 830 having the form of a closed curve and/or a line. The wearable device 101 may display text indicating an attribute assigned to the external object 810 by overlapping with the external object 810. In the state 801 in which the note application is assigned to the external object 810, the wearable device 101 may display the name (e.g., "K-note") of the digital note matched to the external object 810 by overlapping with the external object 810.

In the state 801 of FIG. 8A, in case that a messenger application for exchanging messages is assigned to the external object 820, the wearable device 101 may display an icon 842 representing the messenger application by overlapping with the external object 820. The wearable device 101 may emphasize that the external object 820 is registered as the wearable device 101 by using a FIG. 840 overlapping the external object 820. The wearable device 101 may display the color of the FIG. 840 based on at least one of the color of the icon 842 and/or the color of the external object 820. The wearable device 101 may display attributes (e.g., receiver) assigned to the external object 820 based on the messenger application by overlapping with the external object 820.

According to an embodiment of the disclosure, the wearable device 101 may identify a designated body part that is moved in the displaying area to select external objects 810 and 820, such as a hand 850. Referring to FIG. 8B, in response to identifying the external object 810, and/or the hand 850 pointing to the visual object (e.g., the icon 832) overlapping the external object 810, the wearable device 101 may display a UI for changing the attribute assigned to the external object 810 as shown in the state 802. The UI may be displayed overlapping with the external object 810 in the displaying area. In state 802, the wearable device 101 may display the UI for changing the attribute assigned to the external object 810 based on the note application matched with the external object 810. The UI may include a button 834 (e.g., the button 834 including designated text, such as "pen settings") for adjusting the style of at least one stroke to be added to the note application by the external object 810. The UI may include a button 836 (e.g., the button 836 including designated text, such as "note setting") for selecting the digital note to which information obtained by tracking the external object 810 is added. In response to an input indicating to select any one of the buttons 834 and 836, the wearable device 101 may display a window for changing the attribute corresponding to the button selected by the input in the displaying area.

Referring to FIG. 8B, in response to identifying the hand 850 pointing to the external object 820 among external objects 810 and 820, the wearable device 101 may display the UI for changing the attribute assigned to the external object 820, as shown in state 803. A gesture for displaying the UI is not limited to the gesture of the hand 850 described above. For example, the wearable device 101 may display the UI based on identifying that the user stares at the external object 820 for more than a designated period of time by using data indicating the direction of the gaze of the user (e.g., a user 110 of FIG. 1). The attribute changed through the UI may be set by the messenger application matched with the external object 820. In the state 803, the wearable device 101 may display a button 844 (e.g., the button 844 including designated text, such as "receiver change") for changing the counterpart to receive a message including information obtained by tracking the external object 820. The wearable device 101 may display the button 844 overlapping the external object 820. In response to an input instructing selecting the button 844, the wearable device 101 may display the UI for changing the counterpart, such as a contact list.

As described above, according to an embodiment of the disclosure, the wearable device 101 may display the visual object based on one or more attributes assigned to the external object by overlapping with the external object (e.g., the external objects 810 and 820) registered as the wearable device 101. Based on identifying the external object registered as the wearable device 101, such as the external objects 810 and 820, the wearable device 101 may track the identified external object. The information obtained by tracking the external object may include information on a path of a portion of the external object selected by the attribute assigned to the external object, or at least one stroke drawn by the external object. Based on the information, the wearable device 101 may execute at least one application matched to the external object. Since the wearable device 101 executes the application based on the motion of the external object produced independently of the communication circuit, the wearable device 101 may enable the user to control the wearable device 101 by using more various tools.

Hereinafter, cases in which the wearable device 101 according to an embodiment executes the at least one application matched to the external object based on information obtained by tracking the external object will be described. For example, an example in which the wearable device 101 executes the note application will be described with reference to FIGS. 9A to 9C, 10, and 11. For example, an example in which the wearable device 101 executes a calendar application will be described with reference to FIGS. 12A and 12B. For example, an example in which the wearable device 101 executes the messenger application will be described with reference to FIG. 13. For example, an example in which the wearable device 101 executes a recording application will be described with reference to FIG. 14. For example, an example in which the wearable device 101 executes a plurality of applications assigned as one external object will be described with reference to FIGS. 15A and 15B.

Figure 9A:
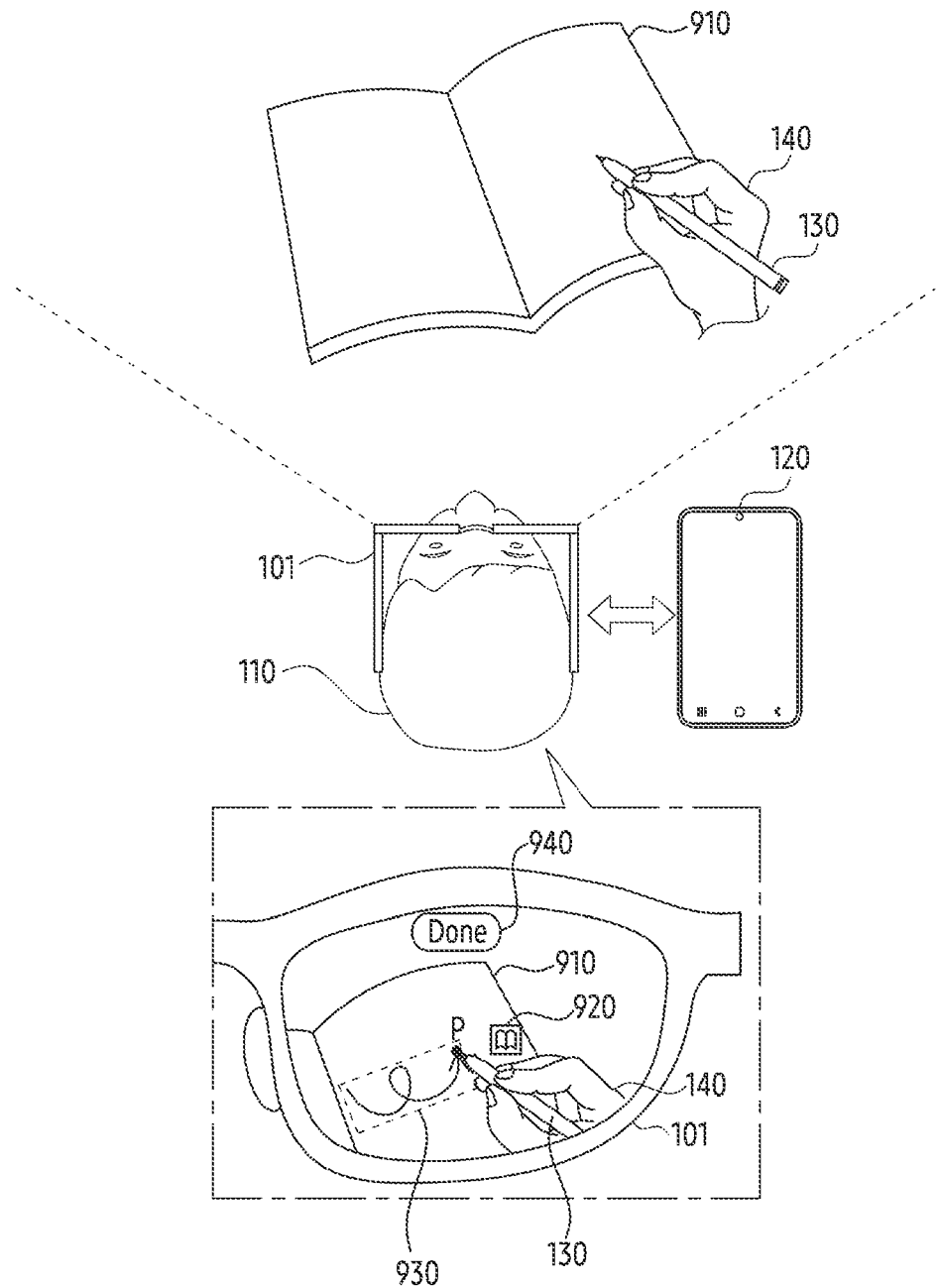
FIGS. 9A, 9B, and 9C illustrate an operation in which a wearable device executes an application based on information obtained by tracking an external object according to an embodiment of the disclosure.
Figure 9B:
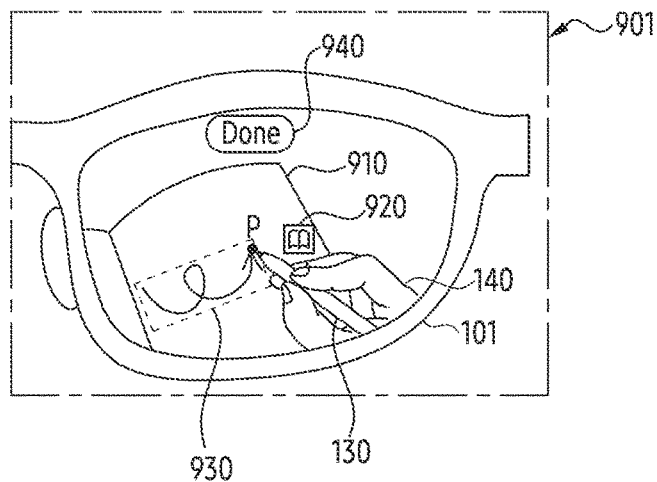
Figure 9B:
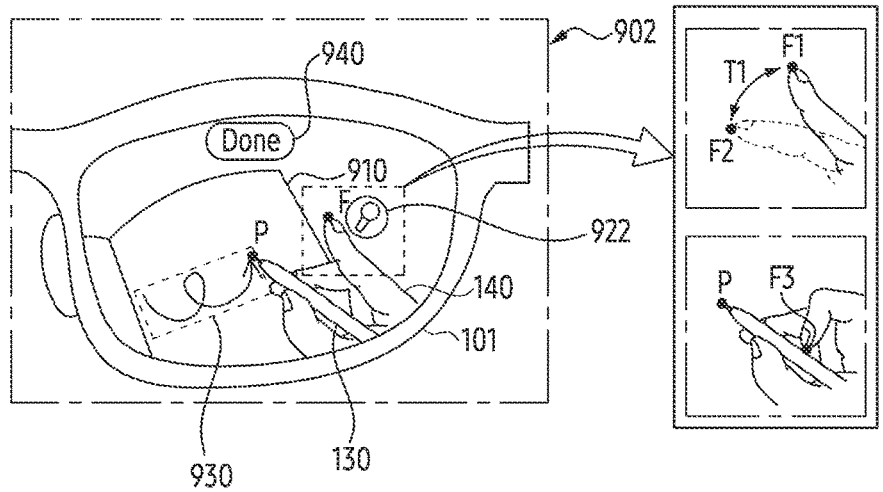
Figure 9B:
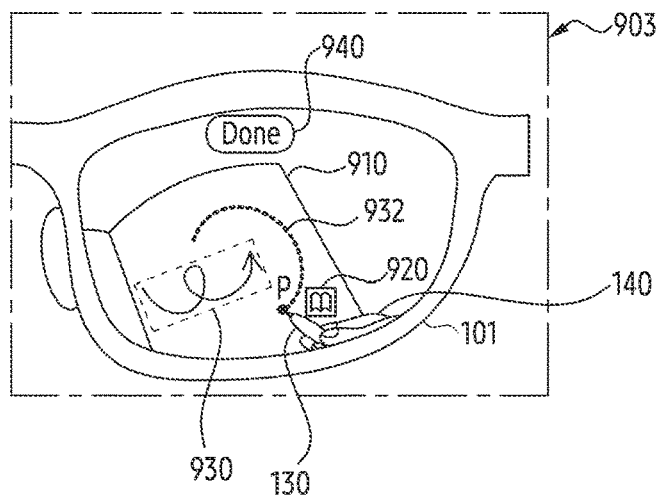
Figure 9C:
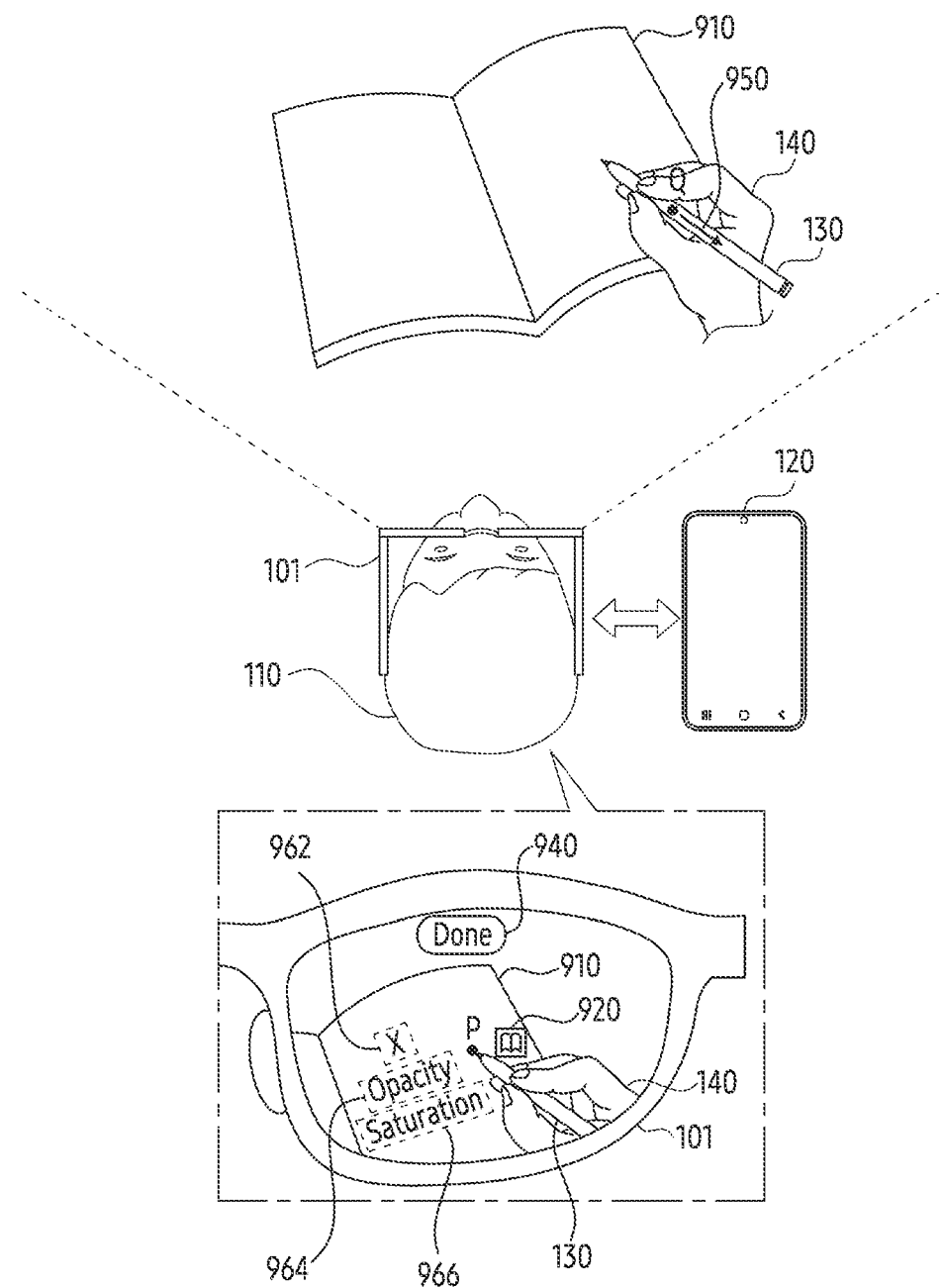

FIGS. 9A, 9B, and 9C illustrate an operation in which a wearable device executes an application based on information obtained by tracking an external object according to an embodiment of the disclosure. The wearable device 101 of FIG. 5 may include the wearable device 101 of FIGS. 9A to 9C. Hereinafter, it is assumed that a note application for generating digital content, such as a digital note in which text, image, and/or video are combined is matched with the external object 130. The wearable device 101 may identify an input indicating to register the note application as the external object 130 based on the operations of FIGS. 6A to 6D and/or 7.

Referring to FIG. 9A, in a state 901, according to an embodiment of the disclosure, the wearable device 101 may track the external object 130. That the wearable device 101 tracks the external object 130 may be performed based on an application executed by the wearable device 101 and/or a terminal 120. The wearable devices 101 may identify and/or track the external object 130 by using a camera (e.g., a motion recognition camera 340-2 of FIG. 3B, cameras 440-9 and 440-10 of FIG. 4B, and/or a camera 540 of FIG. 5) having FoV at least partially overlapping the displaying area. The operation of identifying the external object 130 may include an operation of identifying one or more applications assigned to the external object 130. In the state 901 in which the external object 130 is identified, the wearable device 101 may display an icon 920 representing the note application matched to the external object 130 in a portion adjacent to the external object 130 in the displaying area.

Referring to FIG. 9A, in the state 901 of tracking the external object 130, the wearable device 101 may display a visual object based on information obtained by tracking the external object 130 in the displaying area. In the state 901 in which the wearable device 101 tracks a path of a portion (e.g., a point P corresponding to a pen tip) of the external object 130, the wearable device 101 may display a virtual object 930 representing the path in the displaying area. Based on the distance between the external object 130 and the wearable device 101, the wearable device 101 may identify a path of the external object 130 that is contacted on one plane (e.g., a plane formed by a note 910). For example, based on identifying the contact between the external object 130 and the plane, the wearable device 101 may track the path. The wearable device 101 may display the virtual object 930 representing the tracked path in the displaying area.

Referring to FIG. 9A, the state 901 in which the virtual object 930 having the shape of a line and/or a stroke is displayed by the wearable device 101 is illustrated, but the embodiment is not limited thereto. For example, the wearable device 101 may change the thickness, color, and/or pattern of the stroke included in the virtual object 930 based on the shape of the external object 130 and/or the shape of a portion of the external object 130 selected by the user 110. For example, the wearable device 101 may set at least one of the color, transparency, or thickness of the stroke included in the virtual object 930 based on an attribute (e.g., an attribute set through a portion 693 of FIG. 6D) assigned to the external object 130. For example, the color of the stroke included in the virtual object 930 may be set to a specific color by the attribute assigned to the external object 130 or may be set to a second color (e.g., the second color in which the first color is inverted) based on a first color (e.g., a background color) adjacent to the external object 130 in the displaying area. According to an embodiment of the disclosure, the wearable device 101 may change the color of the stroke based on the color distribution in the displaying area. For example, the wearable device 101 may identify a representative color from the color distribution by applying weights assigned to each of the portions of the displaying area to the color distribution. The wearable device 101 may set the color of the stroke by inverting the representative color. The wearable device 101 may invert the color based on brightness, saturation, and/or distance between colors in a color space.

Although an embodiment in which the wearable device 101 tracks the path of the point P of the external object 130 is described, the embodiment is not limited thereto. For example, the wearable device 101 may identify at least one stroke drawn by a material (e.g., ink and/or graphite) outputted from the external object 130. The wearable device 101 may selectively track any one of the path of the point P or the material based on the attribute assigned to the external object 130.

Referring to FIG. 9A, in the state 901 tracking the external object 130, the wearable device 101 may display a button 940 for executing the application (e.g., the note application corresponding to the icon 920) by using information (e.g., information for displaying the virtual object 930) obtained by tracking an external object 130. The button 940 may include designated text (e.g., confirmation ("done")) for executing the application. The button 940 may be displayed based on the location of the external object 130 in the displaying area. In response to an input indicating to select the button 940, the wearable device 101 may execute the note application. The embodiment is not limited to this, and the wearable device 101 may execute the note application before (e.g., timing of identifying the external object 130) the input and may execute the function of the note application based on the input associated with the button 940. In an embodiment of the disclosure, the wearable device 101 may transmit a signal for executing the note application installed in the terminal 120 to the terminal 120 based on the information in response to the input.

Referring to FIG. 9B, an embodiment in which the wearable device 101 executes the note application corresponding to the external object 130 based on the input associated with the button 940 is illustrated, but the embodiment is not limited thereto. For example, the wearable device 101 may track the path of the point P of the external object 130 independently of displaying the button 940. The wearable device 101 may execute the note application independently of the button 940 based on information obtained by tracking the external object 130.

In the state in which the note application is executed, the wearable device 101 may execute at least one function matching the attribute among different functions supported by the note application based on the attributes (e.g., for the note application, the digital note where the handwriting drawn by the external object 130 will be stored) assigned to the external object 130. For example, the wearable device 101 may add an image and/or at least one character represented by the virtual object 930 into the digital note stored in the wearable device 101 by the note application. For example, the image and/or the at least one character represented by the virtual object 930 may be displayed in the displaying area of the wearable device 101 and/or the terminal 120 based on the execution of the note application of the wearable device 101 and/or the terminal 120. The wearable device 101 may store information (e.g., digital content) generated by the external object 130, such as the virtual object 930, in the wearable device 101, based on the execution of the note application corresponding to the external object 130.

According to an embodiment of the disclosure, the wearable device 101 may change at least one of the color, thickness, or transparency of a stroke added by information obtained by tracking the external object 130 based on a posture of a hand 140 holding the external object 130. Referring to FIG. 9B, according to an embodiment of the disclosure, states 901, 902, and 903 in which the wearable device 101 changes the attribute of the external object 130 based on the posture of the hand 140 are illustrated. Referring to FIG. 9B, in the state 902 after the state 901, the wearable device 101 may identify a posture in which the index finger included in the hand 140 is unfolding. The wearable device 101 may change the attribute assigned to the external object 130 based on the location and/or trajectory of the point F in the fingertip of the index finger.

In the state 902 of FIG. 9B, the wearable device 101 may change the color and/or pattern of the stroke extended by the path of the point P of the external object 130 based on the color of a portion adjacent to the point F in the displaying area. For example, a posture of unfolding the index finger may correspond to a tool (e.g., pipette) for selecting the color of the stroke drawn by the external object 130. Based on identifying the posture of the hand 140 unfolding the index finger, the wearable device 101 may displays an icon 922 (e.g., the icon 922 representing the pipette) for guiding the tool in the displaying area. The wearable device 101 may display the icon 922 on a portion of the displaying area adjacent to the hand 140.

According to an embodiment of the disclosure, the wearable device 101 may identify an input indicating to change the color of the stroke based on the point F of the fingertip. For example, the wearable device 101 may move the point F to a portion of the displaying area and then may repeatedly move the fingertip. Based on identifying the fingertip (e.g., the fingertip that is repeatedly moved along a path T1 between points F1 and F2) that is repeatedly moved, the wearable device 101 may select the color of a portion adjacent to the point F in the displaying area. The wearable device 101 may change the color (e g, the color of the outline of the icon 922) of the icon 922 based on the selected color. In the state 902, after changing the color based on the gesture associated with the point F, the wearable device 101 may add a stroke having the changed color along the path of the external object 130.

In an embodiment of the disclosure, an operation performed by the wearable device 101 by using a gesture for the fingertip is not limited to the selection and/or change of the above-described color. Based on identifying the gesture of rotating the fingertip in a circular shape, the wearable device 101 may mix the color indicated by the attribute assigned to the external object 130 and another color adjacent to the point F in the fingertip. The wearable device 101 may add a stroke having in the shape of the path of the external object 130 and having the mixed color. For example, in case that the color (e.g., the color of the strokes included in the virtual object 930) of the stroke drawn by the path of the point P of the external object 130 is yellow and the other color adjacent to the point F is white, the wearable device 101 may gradually change the color of the stroke to white based on the number of rotations of the fingertip in the circular shape. The wearable device 101 may perform color mixing differently based on the rotation direction of the fingertip. For example, in case of identifying the gesture of the fingertip rotating in a clockwise direction, the wearable device 101 may change the ratio of mixing the first color indicated by the attribute assigned to the external object 130 and the second color of the point F in the fingertip to increase the proportion of the second color. In the above example, in case of identifying the gesture of the fingertip rotating in a counterclockwise direction, the wearable device 101 may change the ratio so that the weight of the first color increases.

In an embodiment of the disclosure, the posture of the index finger identified by the wearable device 101 is not limited to the posture of unfolding the index finger. For example, the wearable device 101 may identify whether the index finger is unfolded or bent by using an angle of joints included in the index finger. Based on identifying the posture (e.g., the index finger bent toward a point F3) of the bent index finger, the wearable device 101 may execute a function of extracting a pattern of a portion adjacent to the point P of the external object 130 in the displaying area. For example, after identifying the posture, the wearable device 101 may display a visual object indicating that the function of extracting the pattern is executed. The wearable device 101 may identify a portion of the displaying area including the point P of the external object 130 in the state in which the function is executed. The wearable device 101 may add a stroke to the path of the point P of the external object 130 based on the identified portion.

Referring to FIG. 9B, in the state 903, the wearable device 101 may display a stroke 932 representing the path of the point P of the external object 130 based on the attribute changed by the posture of the hand 140 identified in the state 902. In case that the wearable device 101 identifies an input indicating to select a color based on the unfolded index finger, in the state 903, the color of the stroke 932 may have the color selected by the input. In case that the wearable device 101 identifies an input indicating to mix colors based on the fingertip rotating in the circular shape, in the state 903, the color of the stroke 932 may have a color mixed by the input. In case that the wearable device 101 identifies an input indicating to select the pattern based on the bent index finger, in the state 903, the color of the stroke 932 may have the pattern selected by the input.

In an embodiment of the disclosure, the wearable device 101 may identify a movement of the hand 140 touching the external object 130 in order to change the attribute assigned to the external object 130. Referring to FIG. 9C, according to an embodiment of the disclosure, a state 904 in which the wearable device 101 identifies a gesture (e.g., a drag gesture) rubbing the external object 130 along a direction 950 from a point Q on the surface of the external object 130 is shown. The gesture may be performed by a finger (e.g., the index finger) of the hand 140 holding the external object 130. Based on identifying the gesture, the wearable device 101 may change at least one of attributes assigned to the external object 130. For example, the wearable device 101 may increase saturation and/or transparency. Similarly, in case of identifying the finger rubbing the external object 130 in a different direction opposite to the direction 950 on the surface of the external object 130, the wearable device 101 may reduce the saturation and/or transparency.

In an embodiment of the disclosure, identifying the movement of the hand 140 in which the wearable device 101 touches the external object 130 is not limited to a drag gesture performed along a direction in which the external object 130 extends. For example, the wearable device 101 may display a visual object for changing at least one attribute assigned to the external object 130 based on identifying a gesture (e.g., a long tap gesture) that touches the point Q on the external object 130 for more than a designated period (e.g., 1.5 seconds). In the state 904 of FIG. 9C, based on identifying the long tap gesture for the point Q, the wearable device 101 may display buttons 962, 964, and 966 for changing the at least one attribute in the displaying area. The button 962 may correspond to a function for stopping the display of buttons 964 and 966. The button 964 may correspond to a function for changing the transparency of a stroke to be added along the path of the point P of the external object 130. The wearable device 101 may display designated text (e.g., "opacity") for guiding a change of transparency in the button 964. The button 966 may change the saturation of a stroke to be added along the path of the point P of the external object 130. The wearable device 101 may display designated text (e.g., "saturation") for guiding the change of saturation in the button 966.

As described above, according to an embodiment of the disclosure, the wearable device 101 may track the path of the point P of the external object 130. Based on the tracked path, the wearable device 101 may display the virtual object (e.g., the virtual object 930 and/or stroke 932) representing the tracked path in the displaying area. The virtual object may be associated with the attribute (e.g., the stroke thickness, color, and/or pattern) assigned to the external object 130. The wearable device 101 may at least partially change the attribute based on the posture of the hand 140 holding the external object 130. The wearable device 101 may obtain digital content independently of electrical communication between the external object 130 and the wearable device 101 by tracking the hand 140 holding the external object 130 and/or the external object 130. In the state 903 of FIG. 9B, in response to an input indicating to select the button 940, the wearable device 101 may store the digital note including the virtual object 930 and the stroke 932 in the memory (e.g., the memory 520 of FIG. 5) based on the execution of the note application.

Referring to FIGS. 9A to 9C, an embodiment of tracking the motion for the external object 130 by using the camera having the FoV that at least partially overlaps with the displaying area of the wearable device 101 has been described, but the embodiment is not limited thereto. Hereinafter, an example of an operation of tracking the motion by the wearable device 101 by using another camera different from the camera according to an embodiment will be described with reference to FIG. 10.

Figure 10:
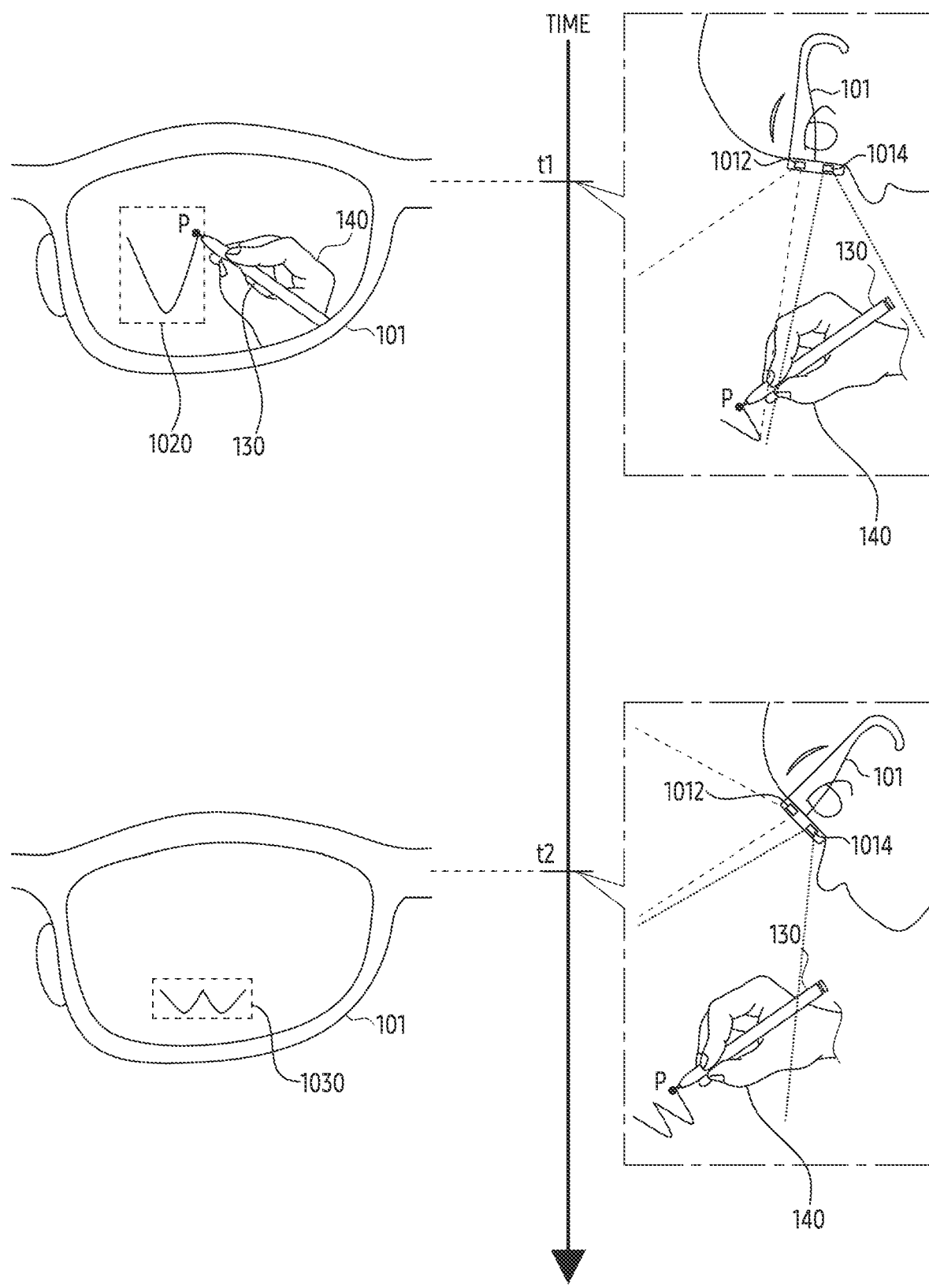
FIG. 10 illustrates an operation in which a wearable device switches a camera for tracking an external object according to an embodiment of the disclosure.

FIG. 10 illustrates an operation in which a wearable device switches a camera for tracking an external object according to an embodiment of the disclosure. The wearable device 101 of FIG. 5 may include the wearable device 101 of FIG. 10.

Referring to FIG. 10, according to an embodiment of the disclosure, the wearable device 101 may include a first camera 1012 having FoV overlapping a displaying area formed by the display (e.g., the display 530 of FIG. 5) of the wearable device 101 and a second camera 1014 having a direction and/or FoV different from that of the first camera. The first camera 1012 and the second camera 1014 of FIG. 10 may be an example of a camera 540 of FIG. 5.

Referring to FIG. 10, a state in which the wearable device 101 tracks the external object 130 by using the first camera 1012 and the second camera 1014 according to an embodiment is illustrated. For example, in timing t1, based on identifying the external object 130 registered as the wearable device 101 by using the first camera 1012 having the FoV overlapping the displaying area, the wearable device 101 may obtain information associated with the external object 130 by using an attribute assigned to the external object 130. In the timing t1, the wearable device 101 may display a virtual object 1020 (e.g., a stroke) indicating the tracked path in a displaying area of the wearable device 101, by tracking a path of a point P of the external object 130.

According to an embodiment of the disclosure, the wearable device 101 may select any one of the cameras based on identifying the external object 130 moving between FoVs of cameras in the wearable device 101. In a state in which a user (e.g., a user 110 of FIG. 1) wears the wearable device 101, based on the motion of the head of the user, the external object 130 may be moved out of the FoV of the first camera 1012. In timing t2, the external object 130 may be moved out of the FoV of the first camera 1012 and may be included in the FoV of the second camera 1014 different from the first camera 1012. According to an embodiment of the disclosure, the wearable device 101 may identify that the external object 130 is moved out of the displaying area and/or the FoV of the first camera 1012 based on the frames obtained from the first camera 1012. Based on identifying that the external object 130 is moved out of the displaying area, the wearable device 101 may track the path of the external object 130 by using the second camera 1014 facing the external object 130.

Referring to FIG. 10, in the timing t2 of tracking the external object 130 by using the second camera 1014, the wearable device 101 may display information associated with the external object 130 tracked by the second camera 1014 in the displaying area. For example, the wearable device 101 may display a virtual object 1030 in which the path of the point P of the external object 130 is represented in the displaying area. The virtual object 1030 may include a line in which the path of the point P of the external object 130 tracked by the second camera 1014 and the path of the point P of the external object 130 tracked by the first camera 1012 different from the second camera 1014 before the timing t2 are combined. A point at which the virtual object 1030 is displayed in the displaying area is not limited to an example of FIG. 10.

As described above, according to an embodiment of the disclosure, in a state in which the external object 130 is tracked by using the first camera 1012 overlapping the displaying area, the wearable device 101 may continuously track the external object 130 by using the second camera 1014, which is different from the first camera 1012, based on the external object 130 which is moved out of the displaying area. Since the external object 130 is tracked by using different cameras of the wearable device 101, the wearable device 101 may track the external object 130 independently of the location relationship between the wearable device 101 and the external object 130. In case that the external object 130 moves out of the displaying area, the wearable device 101 may display the virtual object 1030 in the displaying area in order to visualize information obtained by tracking the external object 130. By using the virtual object 1030, the wearable device 101 may inform the user of the motion of the external object 130 moved out of the FoV of the user.

Hereinafter, an example of the operation of the wearable device 101 that displays the virtual object 1030 in the displaying area based on the motion of the external object 130 moved out of the FoV of the user will be described with reference to FIG. 11.

Figure 11:
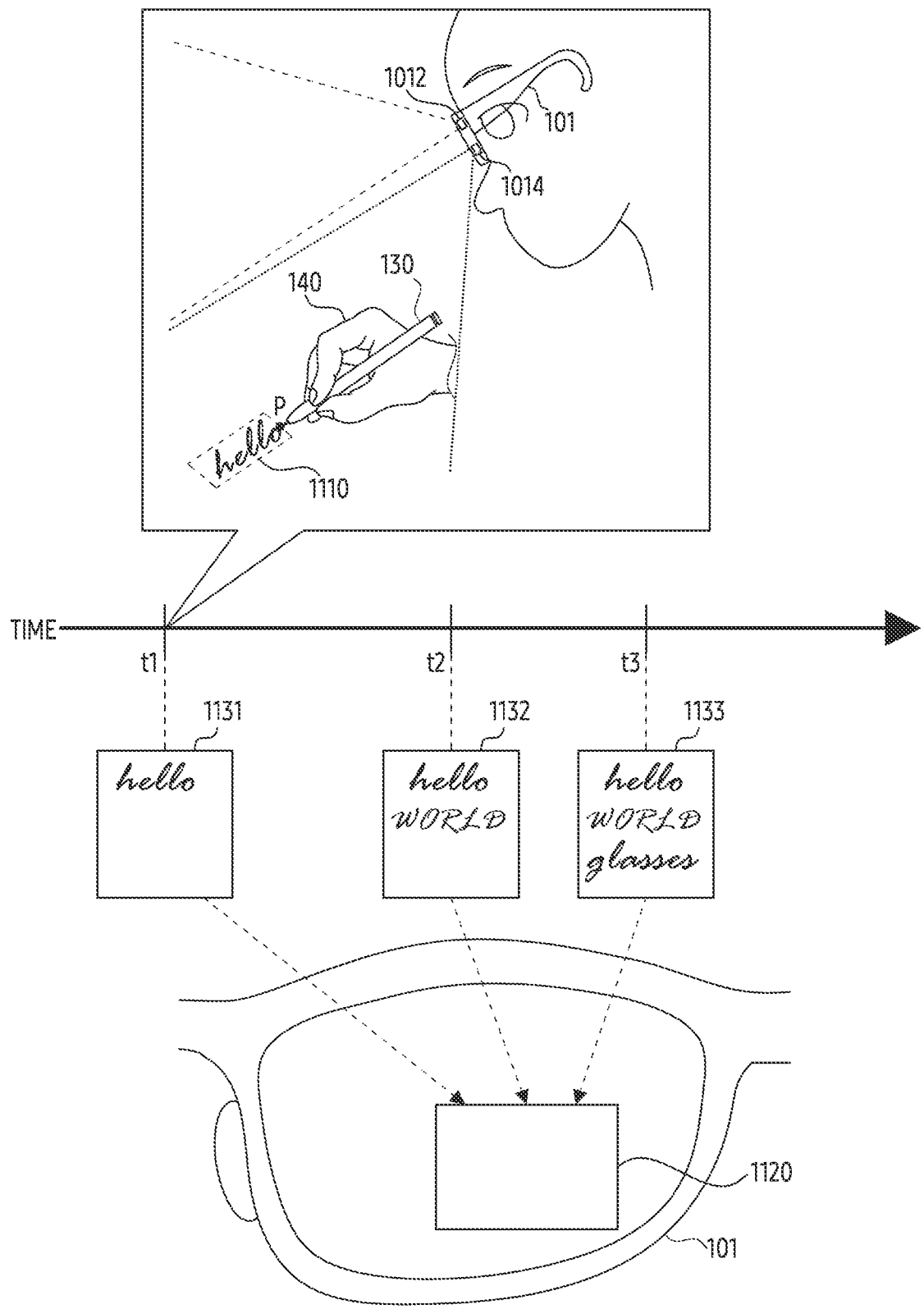
FIG. 11 illustrates a UI displayed by a wearable device based on information obtained by tracking an external object, according to an embodiment of the disclosure.

FIG. 11 illustrates a UI displayed by a wearable device based on information obtained by tracking an external object according to an embodiment of the disclosure. The wearable device 101 of FIG. 5 may include the wearable device 101 of FIG. 11. The wearable device 101 of FIG. 11 may be an example of the wearable device 101 of FIG. 10. For example, the first camera 1012 and the second camera 1014 of FIG. 11 may include the first camera 1012 and the second camera 1014 of FIG. 10.

Referring to FIG. 11, a state of tracking the external object 130 by using a second camera 1014 having FoV different from that of the displaying area of the wearable device 101 is illustrated. In the state of FIG. 11, the wearable device 101 may display information obtained by tracking the external object 130 in a portion 1120 of the displaying area. In the portion 1120, the wearable device 101 may display one or more strokes representing a path of contacted external object 130 on a plane 1110. According to an embodiment of the disclosure, the wearable device 101 may identify one or more characters from the path. For example, in the timing t1, the wearable device 101 may identify a plurality of characters arranged along one line, such as "hello". That the wearable device 101 identifies the plurality of characters may be performed by the wearable device 101 and/or an external electronic device (e.g., a terminal 120 of FIG. 1) connected to the wearable device 101. The wearable device 101 may display a virtual object 1131 representing the plurality of characters in the portion 1120 of the displaying area based on identifying the plurality of characters. The virtual object 1131 may have a shape of a path of the external object 130 contacting the plane 1110.

Referring to FIG. 11, the wearable device 101 may identify a gesture indicating to add a line in which the plurality of characters are arranged based on the motion of the external object 130. In the state of FIG. 11 that identifies the alphabets, the wearable device 101 may identify the plurality characters recorded along the direction from left to right. In the above state, the wearable device 101 may recognize a new character represented by the path of the external object 130 by using a second line different from a first line in which the plurality of characters are arranged based on identifying the external object 130 moved from right to left. Referring to timing t2, the wearable device 101 may identify written characters ("WORLD") along a direction from the left to the right of the plane 1110 in the plane 1110. The wearable device 101 may display a virtual object 1132 on which characters "WORLD" are disposed in the portion 1120, in a line different from the line in which the identified characters ("hello") are disposed in the timing t1, in the timing t2. Similarly, between the timing t2 and timing t3, based on identifying the external object 130 moving back to the left of the plane 1110, the wearable device 101 may add the characters "glasses" obtained by tracking the point P of the external object 130, in a line different from the first line where the characters ("hello") are disposed, and the second line where the characters ("WORLD") are disposed. In a virtual object 1133 displayed in the portion 1120 within the displaying area of the wearable device 101 in the timing t3, each of characters ("hello", "WORLD", and "glasses") may be displayed through three different lines.

As described above, the wearable device 101 may identify a gesture indicating to add a line in which the plurality of characters are arranged, by comparing the direction in which the characters are arranged with the direction of the external object 130. For example, in case of a language in which characters are arranged from the left to the right in the line, such as English, the wearable device 101 may identify the gesture based on detecting the external object 130 moving from the right to the left. For example, in case of a language in which characters are arranged from the right to the left, such as Arabic, the wearable device 101 may identify the gesture based on identifying the external object 130 moving from the left to the right. Since the wearable device 101 add a line in which characters drawn by the external object 130 are arranged by using the direction of the external object 130, the wearable device 101 may support recognizing characters arranged along a plurality of lines based on the plane 1110 having the size of a single line.

Figure 12A:
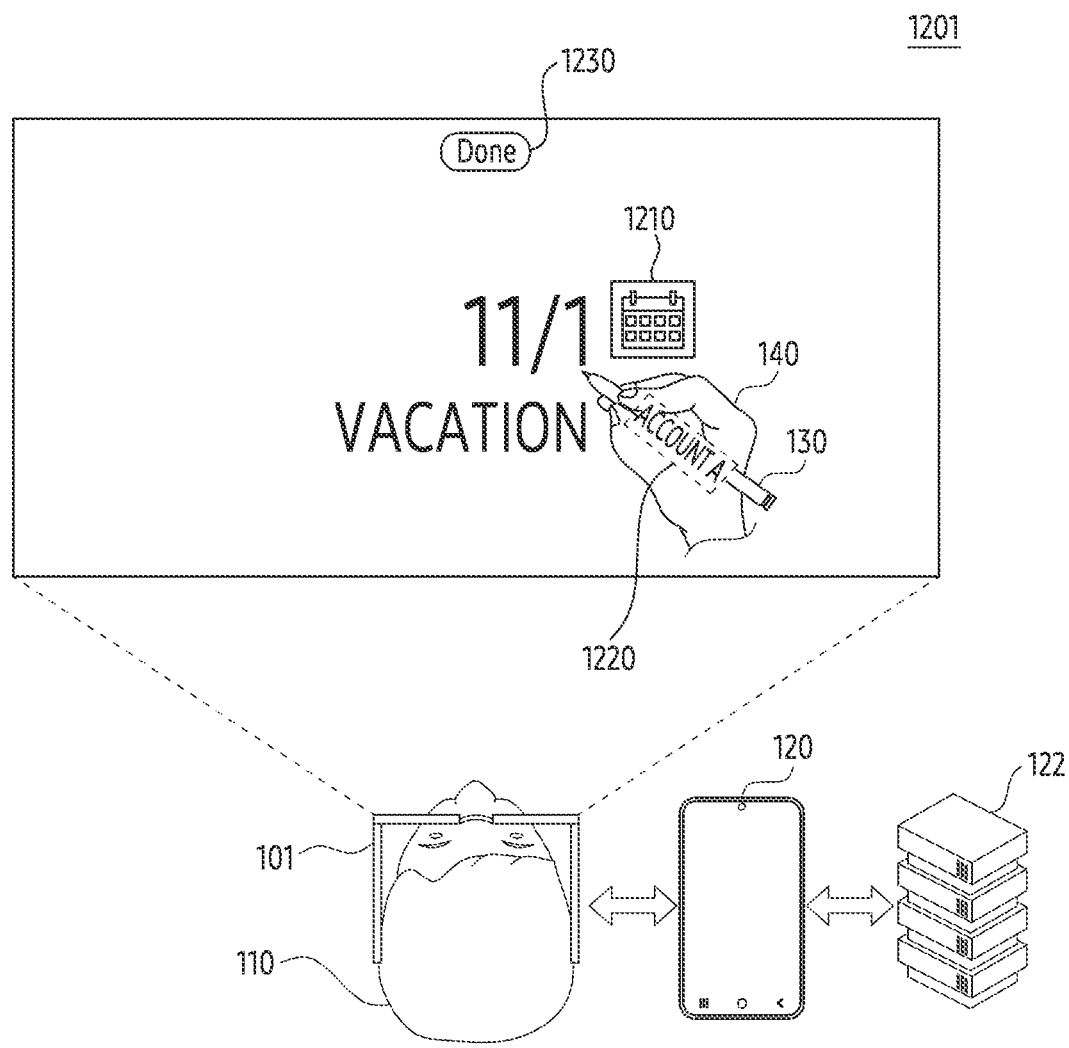
FIGS. 12A and 12B illustrate an operation in which a wearable device executes an application based on information obtained by tracking an external object according to an embodiment of the disclosure.
Figure 12B:
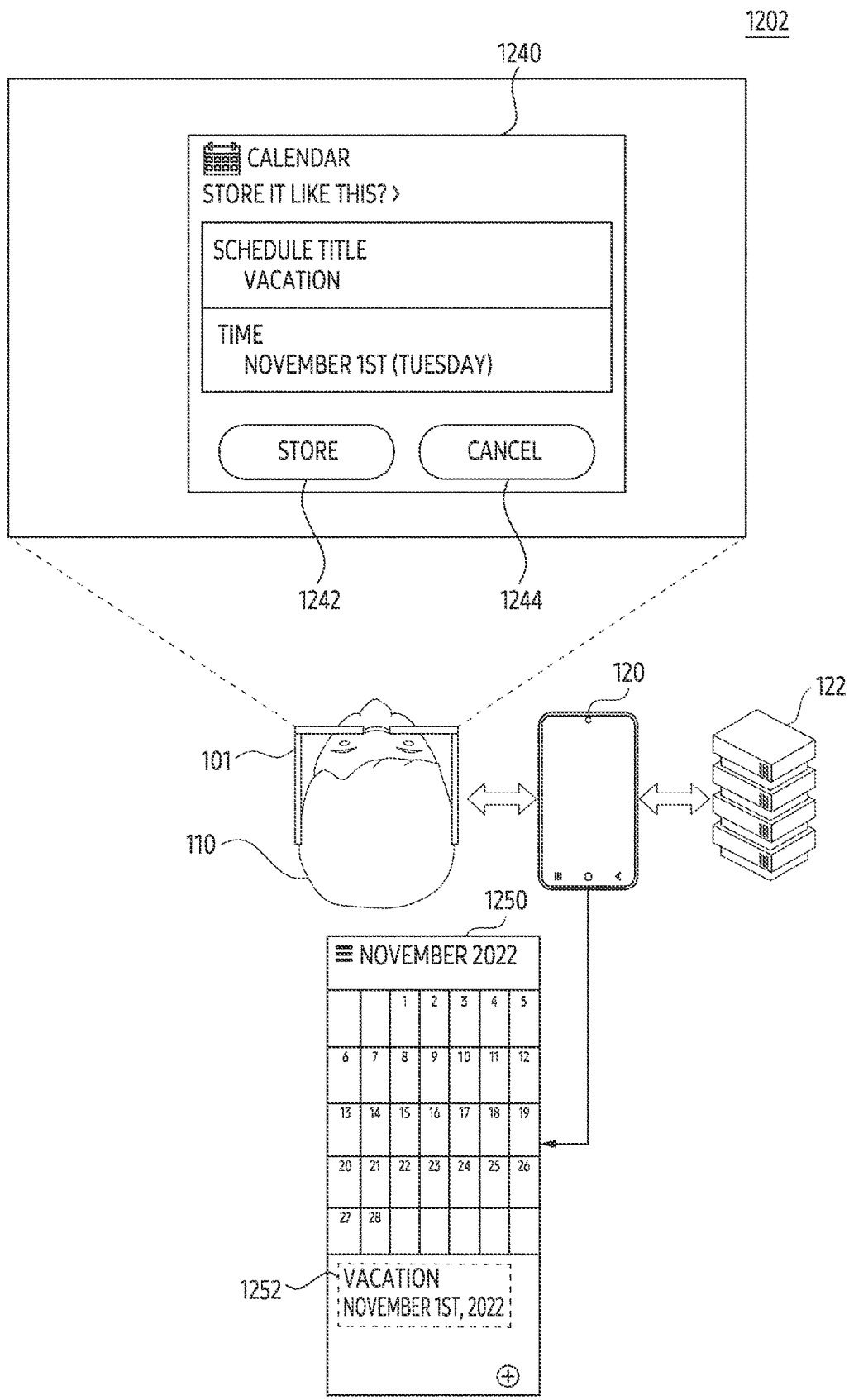

FIGS. 12A and 12B illustrates an operation in which a wearable device executes an application based on information obtained by tracking an external object according to an embodiment of the disclosure. The wearable device 101 of FIG. 5 may include the wearable device 101 of FIGS. 12A and 12B. Hereinafter, it is assumed that a calendar application for storing the schedule is matched with the external object 130. The wearable device 101 may identify an input indicating that the calendar application is registered as the external object 130 based on the operations of FIGS. 6A to 6D and/or 7.

Referring to FIG. 12A, in a state 1201 in which the external object 130 matched with the calendar application is identified, the wearable device 101 may display an icon 1210 representing the calendar application in the displaying area. Together with the icon 1210, the wearable device 101 may display a visual object indicating an attribute assigned to the external object 130 overlapping the external object 130. In the state 1201 of FIG. 12A, the wearable device 101 may display text 1220 (e.g., "account A") indicating an account matched with the external object 130 among accounts registered in the calendar application, overlapping with the external object 130.

In the state 1201 of FIG. 12A, the wearable device 101 may track a path of a portion of the external object 130 or at least one stroke drawn by a material included in the external object 130 based on the attribute assigned to the external object 130. For example, in the state 1201 identifying the attribute set to track ink extended from one end (e.g., a pen tip of the external object 130) of the external object 130, the wearable device 101 may identify at least one stroke drawn by the ink. The wearable device 101 may identify a character (in an example of FIG. 12A, "11/1 vacation") expressed by the at least one stroke. The wearable device 101 may obtain the result of recognizing characters from the at least one stroke by using a terminal 120 and/or a server 122 connected to the wearable device 101. For example, in order to reduce the amount of computation of the wearable device 101, the wearable device 101 may request the terminal 120 and/or the server 122 to recognize characters from the strokes drawn by the ink. The reduction in the amount of computation of the wearable device 101 may reduce heat emitted from the wearable device 101.

In the state 1201 of FIG. 12A, in which a character drawn by ink output from the external object 130 is identified, the wearable device 101 may identify an input indicating to select a button 1230 for executing the calendar application matched with the external object 130. In response to the input, the wearable device 101 may execute the calendar application based on the characters (e.g., "11/1 vacation") drawn by the ink. In an embodiment of the disclosure, the wearable device 101 may execute a function based on the characters by using the calendar application executed before the input. The wearable device 101 may execute a function associated with the identified text by executing the calendar application before receiving the input associated with the button 1230 based on identifying the character drawn by the external object 130. For example, the wearable device 101 may add schedule data based on information included in the text 1220 in the account indicated by the text 1220 in the state that the calendar application is executed.

Referring to FIG. 12B, a state 1202 in which the wearable device 101 displays a window 1240 for adding schedule data is illustrated based on an input indicating to select the button 1230 in the state 1201 of FIG. 12A. In the state 1202, the wearable device 101 may display the window 1240 for adding schedule data based on characters identified in the state 1201. In the window 1240, the wearable device 101 may display parameters (e.g., schedule title, and time) required to generate the schedule data. The wearable device 101 may change the parameters based on information (e.g., the characters) obtained by tracking the external object 130 in the state 1201. For example, the parameter (e.g., a parameter having a field name of "schedule title") included in the window 1240 and indicating the name of the schedule data may include some (e.g., "vacation") of the characters identified in the state 1201. For example, the parameter (e.g., a parameter having a field name of "time") included in the window 1240 and representing the time of schedule data may include the date and/or time represented by some (e.g., "11/1") of the characters identified in the state 1201. Matching the characters identified in the parameters and the state 1201 may be performed by an engine (e.g., a natural language engine (NLU)) executed by the wearable device 101 and/or the server 122 for natural language processing.

Referring to FIG. 12B, the wearable device 101 may display a button 1242 for adding schedule data based on parameters displayed through the window 1240 in the window 1240. In the button 1242, the wearable device 101 may display designated text (e.g., "store") for guiding the addition and/or storing of schedule data. In the window 1240, the wearable device 101 may display a button 1244 (e.g., a button 1244 including designated text, such as "cancel") for stopping adding the schedule data.

In the state 1202 of FIG. 12B, in response to an input indicating to select the button 1242, the wearable device 101 may store schedule data based on parameters displayed through the window 1240 by executing the calendar application. Referring to FIG. 12B, the schedule data may be shared in different electronic devices (e.g., the wearable device 101, and the terminal 120) used by the user 110. For example, the terminal 120 connected to the wearable device 101 may display a visual object 1252 based on the schedule data in the screen 1250 displayed through the display of the terminal 120.

As described above, according to an embodiment of the disclosure, the wearable device 101 may obtain information for adding schedule data from the path of a portion of the external object 130 and/or from at least one stroke drawn by the external object 130. In the states 1201 and 1202 in which the external object 130 and the calendar application are matched, the wearable device 101 may obtain the information by recognizing characters drawn by the external object 130. Since the wearable device 101 adds the schedule data by using the information, it may obtain the computer readable information independently of communication with the external object 130.

Figure 13:
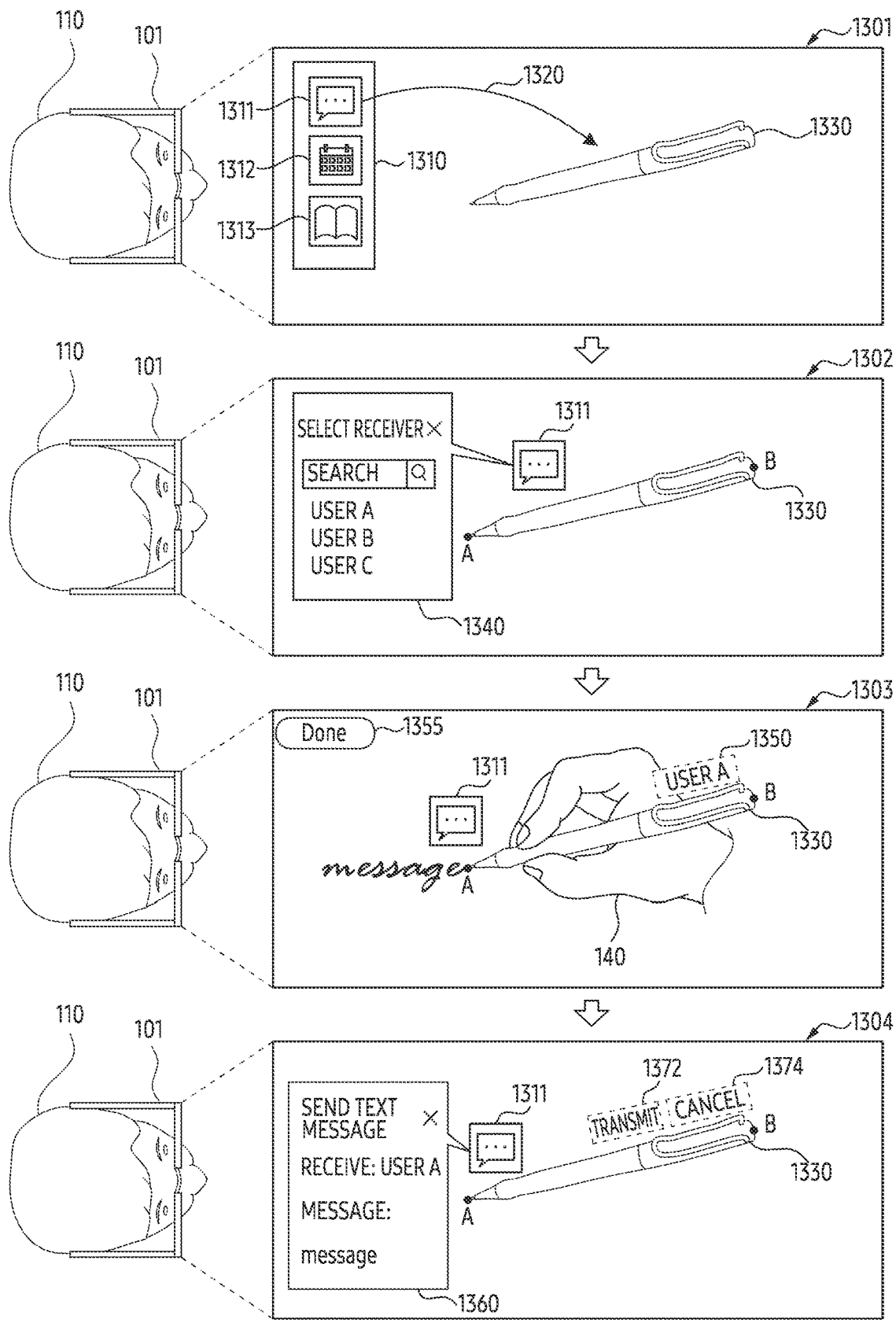
FIG. 13 illustrates an operation in which a wearable device executes an application based on information obtained by tracking an external object according to an embodiment of the disclosure.

FIG. 13 illustrates an operation in which a wearable device executes an application based on information obtained by tracking an external object according to an embodiment of the disclosure. The wearable device 101 of FIG. 5 may include the wearable device 101 of FIG. 13.

Referring to FIG. 13, states 1301, 1302, 1303, and 1304 in which the wearable device 101 executes a messenger application by using information obtained by tracking the external object 1330 are illustrated, according to an embodiment. In state 1301, the wearable device 101 may display a list 1310 of applications installed in the wearable device 101, similar to states 601 and 602 of FIG. 6A. The wearable device 101 may identify an input indicating that the messenger application matched with the icon 1311 is matched with the external object 1330, based on the icon 1311 dragged to the external object 1330 along the path 1320, among the icons 1311, 1312, and 1313 included in the list 1310. Based on the input, the wearable device 101 may switch from the state 1301 to the state 1302.

In the state 1302 of FIG. 13, the wearable device 101 may display a window 1340 for receiving at least one parameter required to execute the messenger application. In the window 1340, the wearable device 101 may display a list for selecting a counterpart to receive a message corresponding to the information obtained by tracking the external object 1330. The list may be associated with a contact list stored in a memory (e.g., the memory 520 of FIG. 5) of the wearable device 101. It is assumed that the wearable device 101 has received an input indicating to select a user A in the window 1340 in the state 1302 of FIG. 13. In the assumption, the wearable device 101 may store an attribute indicating that external object 1330 matches the function of the messenger application for transmitting a message to the user A.

Referring to FIG. 13, in the state 1303 after registering the external object 1330 based on the state 1302, the wearable device 101 may track the external object 1330 included in the displaying area. In the state 1303, the wearable device 101 may display the icon 1311 representing an application matched with the external object 1330 and a text 1350 indicating the attribute assigned to the external object 1330 by overlapping with the external object 1330. In the assumption, the wearable device 101 may display the text 1350 (e.g., "user A") indicating a counterpart to receive a message including information obtained by tracking the external object 1330. The embodiment is not limited thereto, and the wearable device 101 displays a shape based on the color of the icon 1311 and/or the color of the external object 1330 by overlapping with the external object 1330, such as shapes 832 and 834 of FIGS. 8A and 8B.

In the state 1303 of FIG. 13, the wearable device 101 may identify one or more strokes (e.g., handwriting expressing "message") drawn by ink outputted from the point A. The wearable device 101 may identify text corresponding to the one or more strokes based on the OCR. In the state 1303, the wearable device 101 may display a button 1355 for executing an application (e.g., a messenger application) by using information obtained by tracking external object 1330. In response to an input indicating to select the button 1355, the wearable device 101 may switch from the state 1303 to the state 1304.

Referring to FIG. 13, in the state 1304, the wearable device 101 may display the window 1360 provided from the messenger application corresponding to the external object 1330. In the window 1360, the wearable device 101 may display information obtained by tracking the external object 1330. For example, the wearable device 101 may guide that text identified from the strokes drawn by the external object 1330 (e.g., "message") will be transmitted to the counterpart (e.g., "user A") indicated by the attribute assigned to the external object 1330 by using the window 1360. The wearable device 101 may display a button 1372 for transmitting a message based on the information included in the window 1360 and a button 1375 for stopping transmission of the message in the displaying area, together with the window 1360. In the button 1372, the wearable device 101 may display designated text (e.g., "transmission") for guiding the transmission of the message. In a button 1374, the wearable device 101 may display designated text (e.g., "cancel") for guiding the stop of message transmission. For example, in response to an input indicating to select the button 1372, the wearable device 101 may execute a function for transmitting a message among the functions supported by the messenger application based on the information included in the window 1360. The wearable device 101 may control a communication circuit (e.g., the communication circuit 550 of FIG. 5) to transmit a message.

As described above, according to an embodiment of the disclosure, the wearable device 101 may obtain information used to transmit a message by using the messenger application by tracking the external object 1330 matched with the messenger application. For example, the wearable device 101 may obtain text to be included in the message from at least one character drawn by the external object 1330. The wearable device 101 may execute a function for transmitting a message including the text to the counterpart indicated by the attribute assigned to the external object 1330 by using the communication circuit of the wearable device 101.

Figure 14:
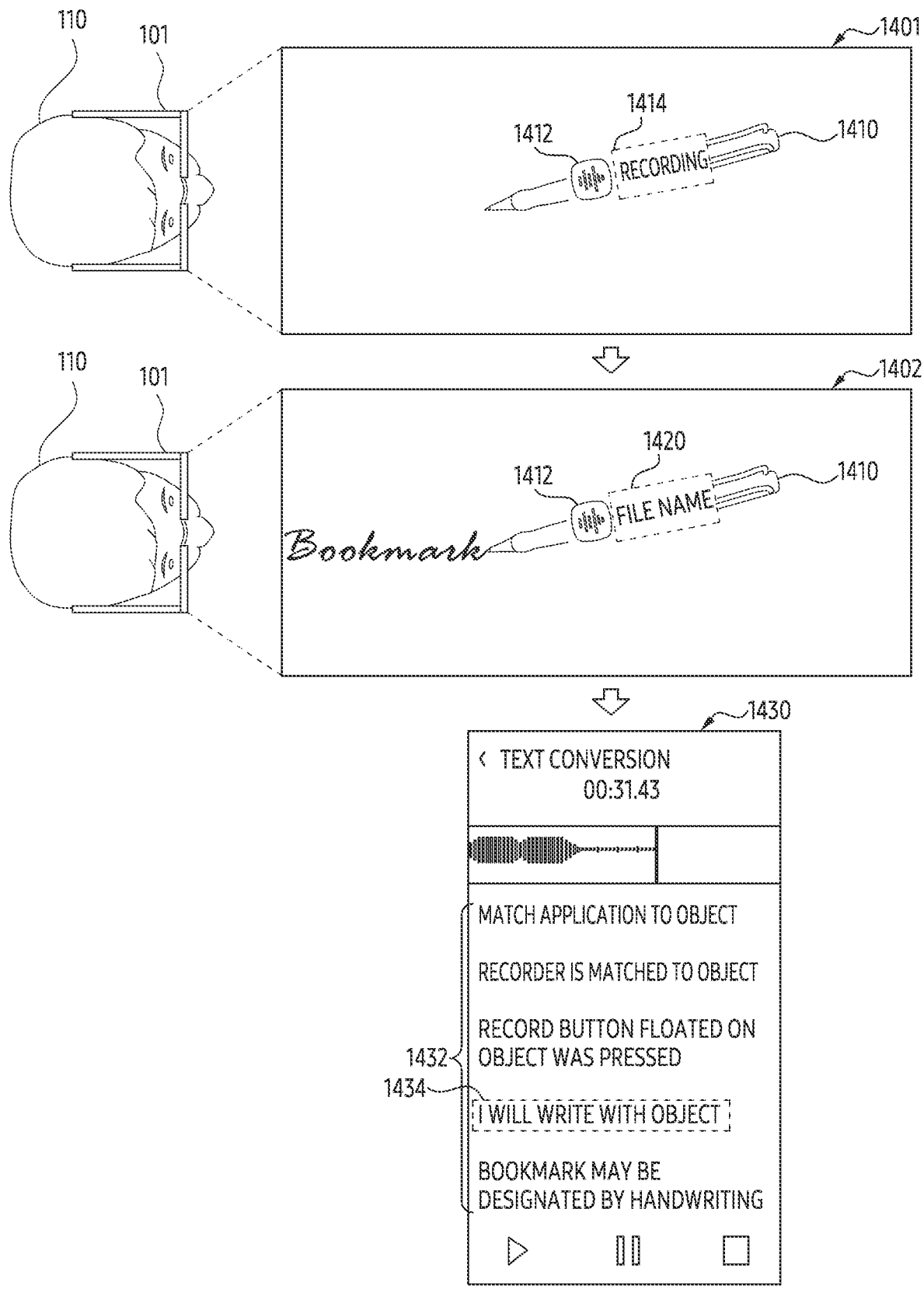
FIG. 14 illustrates an operation in which a wearable device executes an application based on information obtained by tracking an external object according to an embodiment of the disclosure.

FIG. 14 illustrates an operation in which a wearable device executes an application based on information obtained by tracking an external object according to an embodiment of the disclosure.

Referring to FIG. 14, the wearable device 101 of FIG. 5 may include the wearable device 101 of FIG. 14. Hereinafter, it is assumed that a recording application for recording an audio signal is matched with the external object 1410. The wearable device 101 may identify an input indicating to register the recording application as the external object 1410 based on the operations of FIGS. 6A to 6D and/or 7.

Referring to FIG. 14, different states 1401 and 1402 in which the wearable device 101 tracks the external object 1410 are illustrated. In the state 1401, the wearable device 101 identifying the external object 1410 may display an icon 1412 representing the recording application matched with the external object 1410 and/or a button 1414 for recording the audio signal based on the execution of the recording application by overlapping with the external object 1410 in the displaying area. In the state 1401, in response to an input indicating to select the button 1414, the wearable device 101 may execute the recording application. Based on the execution of the recording application, the wearable device 101 may initiate recording of the audio signal. In order to record the audio signal, the wearable device 101 may include a microphone.

Referring to FIG. 14, in a state 1402 of recording the audio signal based on the execution of the recording application, the wearable device 101 may display text 1420 indicating the name of a file including the recorded audio signal, by overlapping with the external object 1410 included in the displaying area. In the state 1402, the wearable device 101 may track the external object 1410 matched to the recording application. For example, the wearable device 101 may identify a handwriting ("bookmark") drawn by the external object 1410. Information obtained by tracking the external object 1410 by the wearable device 101 may include text corresponding to the handwriting. For example, the information may include a result of performing OCR on the handwriting.

In the state 1402 of FIG. 14, based on identifying handwriting drawn by the external object 1410, the wearable device 101 may add the bookmark in the audio signal recorded by the execution of the recording application. For example, the wearable device 101 may add the bookmark to the section corresponding to the timing at which the handwriting is drawn in the audio signal recorded by the recording application. The bookmark may be stored in metadata corresponding to the audio signal. The name of the bookmark may include text corresponding to the handwriting.

Referring to FIG. 14, an example of a screen 1430 displayed while playing the audio signal obtained in the state 1402 is illustrated. The screen 1430 may be displayed by the wearable device 101 in response to an input instructing to play the audio signal. In an embodiment of the disclosure, the wearable device 101 may obtain text representing speech included in the audio signal by performing speech-to-text (STT) on the audio signal. In a portion 1432 of the screen 1430, the wearable device 101 may display the obtained text. The wearable device 101 may display the text (e.g., "I'm going to write with an object") included in the section corresponding to the timing at which the handwriting is drawn in the state 1402 among the text displayed in the screen 1430 together with a visual object 1434 indicating the bookmark added by the handwriting. For example, the visual object 1434 may have a shape of a bounding box for distinguishing text (e.g., "I'm going to write with an object") recognized from a portion of the audio signal corresponding to the section from other text. Based on an input indicating to select the visual object 1434, the wearable device 101 may display an attribute of the bookmark (e.g., a name of the bookmark) corresponding to the visual object 1434 in the displaying area.

As described above, according to an embodiment of the disclosure, the wearable device 101 may execute different functions of the recording application by tracking the external object 1410 matched to the recording application. For example, the wearable device 101 may execute a recording function based on the recording application based on the button 1414 displayed by overlapping with the external object 1410. For example, the wearable device 101 may execute a function for adding the bookmark to the audio signal recorded by the recording application based on information obtained by tracking the external object 1410.

Figure 15A:
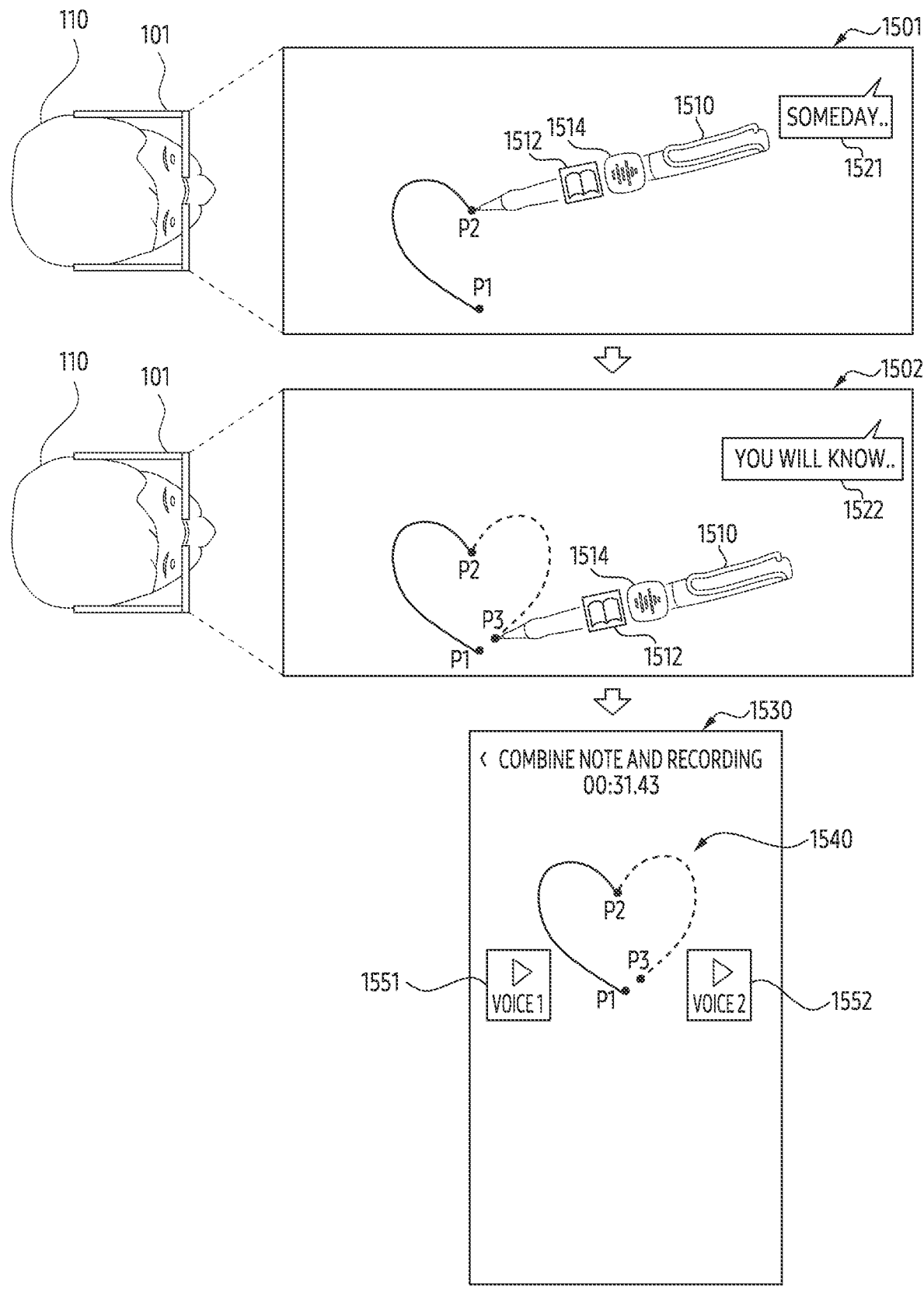
FIGS. 15A and 15B illustrate an operation in which a wearable device executes a plurality of applications based on information obtained by tracking an external object according to an embodiment of the disclosure.
Figure 15B:
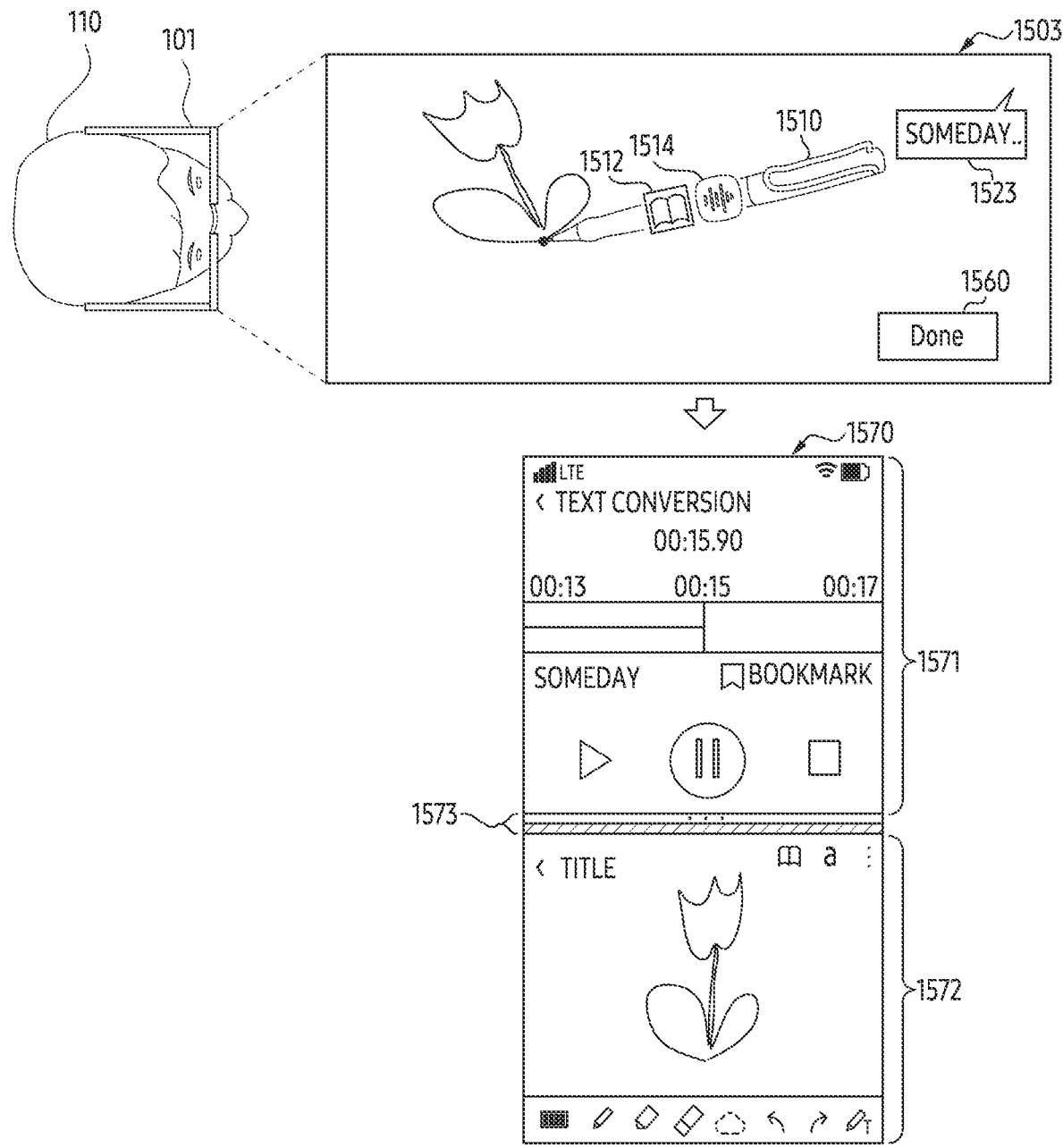

FIGS. 15A and 15B illustrate an operation in which a wearable device executes a plurality of applications based on information obtained by tracking an external object according to an embodiment of the disclosure. The wearable device 101 of FIG. 5 may include the wearable device 101 of FIGS. 15A and 15B. Hereinafter, it is assumed that a plurality of applications (e.g., a note application and a recording application) are matched with the external object 1510. The wearable device 101 may identify an input indicating that the plurality of applications are registered as the external object 1510 based on the operations of FIGS. 6A to 6D and/or 7.

Referring to FIG. 15A, different states 1501 and 1502 in which the wearable device 101 tracks the external object 1510 are illustrated. In the state 1501, the wearable device 101 identifying the external object 1510 may display icons 1512 and 1514, which represent each of a plurality of applications matched with the external object 1510 by overlapping with the external object 1510 included in the displaying area. For example, the wearable device 101 may display the icon 1512 representing the note application and the icon 1514 representing the recording application. In the state 1501, the wearable device 101 may identify a curve drawn by the external object 1510 from a point P1 along a point P2. The curve may be a visualization of a path of a portion of the external object 1510 by the wearable device 101. The curve may be drawn by ink in the external object 1510.

Referring to FIG. 15A, in the state 1501 in which a curve drawn by the external object 1510 is identified, the wearable device 101 may execute the plurality of applications matched with the external object 1510. For example, the wearable device 101 may execute the note application and the recording application. Based on the execution of the recording application, the wearable device 101 may initiate recording of an audio signal. Based on the execution of the note application, the wearable device 101 may identify digital content based on the identified curve. For example, based on execution of the recording application, in the state 1501, the wearable device 101 may obtain the audio signal including a speech 1521.

Referring to FIG. 15A, in the state 1502, similar to the state 1501, the wearable device 101 may maintain tracking the curve drawn by the external object 1510. The wearable device 101 may maintain recording based on execution of the recording application in the state 1502. The wearable device 101 may identify another curve drawn by the external object 1510 from the point P2 along a point P3 in the state 1502. The wearable device 101 may obtain the audio signal including a speech 1522 based on the recording application in the state 1502.

According to an embodiment of the disclosure, the wearable device 101 may obtain first media content including curves moved along the points P1, P2, and P3 based on the states 1501 and 1502. The first media content may be obtained based on execution of the note application among a plurality of applications matched with the external object 1510. The wearable device 101 may obtain second media content in which the speeches 1521 and 1522 are recorded based on the states 1501 and 1502. The second media content may be obtained based on execution of the recording application among a plurality of applications matched to the external object 1510. The first media content and the second media content may be stored in a memory (e.g., the memory 520 of FIG. 5) of the wearable device 101.

According to an embodiment of the disclosure, the wearable device 101 may synchronize the first media content and the second media content obtained by executing each of a plurality of applications matched with the external object 1510. Referring to FIG. 15A, after the states 1501 and 1502, the wearable device 101 may display a screen 1530 for synchronizing the first media content and the second media content. The screen 1530 may be displayed through the displaying area formed by a display device (e.g., the display 530 of FIG. 5) of the wearable device 101. The screen 1530 may be provided from at least one of the note application or the recording application matched with the external object 1510.

Referring to FIG. 15A, in the screen 1530, the wearable device 101 may display a visual object 1540 corresponding to first media content obtained based on the execution of the note application. For example, the visual object 1540 may be a line representing a path of a portion of the external object 1510 moved along the points P1, P2, and P3 in the states 1501 and 1502. Based on the screen 1530 on which the visual object 1540 corresponding to the first media content is displayed, the wearable device 101 may execute a function for synchronizing the first media content and the second media content. The function for synchronizing the first media content and the second media content may include an operation of simultaneously playing a line (e.g., a line representing a path of the external object 1510) included in the first media content and the audio signal included in the second media content.

Referring to FIG. 15A, in the screen 1530, the wearable device 101 may display visual objects 1551 and 1552 corresponding to different sections of the second media content. The visual object 1551 may correspond to a first section in which the speech 1521 is recorded in the second media content. The visual object 1552 may correspond to a second section in which the speech 1522 is recorded in the second media content. The wearable device 101 may display the visual object 1551 corresponding to the first section in a line included in the visual object 1540, adjacent to a portion of a line drawn in the first section. The wearable device 101 may display the visual object 1552 corresponding to the second section in a line included in the visual object 1540, adjacent to a portion of a line drawn in the second section. As described above, according to an embodiment of the disclosure, the wearable device 101 may synchronize a line included in the first media content and an audio signal included in the second media content based on a section in the screen 1530.

According to an embodiment of the disclosure, the wearable device 101 may simultaneously play the first media content and the second media content. For example, while playing a first animation that draws a curve along the points P1 and P2 in the screen 1530, the wearable device 101 may play an audio signal (e.g., an audio signal including the speech 1521) corresponding to the visual object 1551. After playing the first animation, while playing a second animation that draws a curve along the points P2 and P3 in the screen 1530, the wearable device 101 may play an audio signal (e.g., an audio signal including the speech 1522) corresponding to the visual object 1552.

As described above, the wearable device 101 may obtain a plurality of media contents by using each of the plurality of applications in a state in which a plurality of applications are matched with the external object 1510. In the states 1501 and 1502 of FIG. 15A, the wearable device 101 may obtain different types of media content (e.g., the first media content including the visualized stroke, and the second media content including the audio signal). The wearable device 101 may synchronize the plurality of media contents obtained substantially simultaneously.

Referring to FIG. 15B, a state 1503 in which the wearable device 101 simultaneously executes a plurality of applications matched with an external object 1510 is illustrated. The wearable device 101 may register the plurality of applications as the external object 1510 based on the operations of FIGS. 6A to 6D and/or 7. Hereinafter, it is assumed that the plurality of applications include the note application corresponding to the icon 1512 and the recording application corresponding to the icon 1514.

Referring to FIG. 15B, the wearable device 101 may execute a plurality of applications matched with the external object 1510 in the state 1503 in which a curve drawn by the external object 1510 is identified. For example, in the state 1503 identifying the path of a portion of external object 1510, or the curve drawn by a material (e.g., ink and/or graphite) included in external object 1510, the wearable device 101 may execute the plurality of applications in response to an input indicating selection of a visual object 1560. Referring to FIG. 15B, the visual object 1560 having the shape of a button including a designated text, such as "done" is exemplarily illustrated in the displaying area of the wearable device 101, but the embodiment is not limited thereto.

In the state 1503 of FIG. 15B, the wearable device 101 may display a multi-window 1570 in which screens 1571 and 1572 provided from each of the plurality of applications assigned to the external object 1510 are arranged. The screens 1571 and 1572 may be displayed on at least a portion of the displaying area of the wearable device 101. Referring to FIG. 15B, a case in which the wearable device 101 displays the screens 1571 and 1572 coupled in parallel in a vertical direction is illustrated. The embodiment is not limited thereto, and the wearable device 101 may display the screens 1571 and 1572 along a direction (e.g., a horizontal direction 1573) different from the vertical direction. The wearable device 101 may display the screens 1571 and 1572 on portions spaced apart from each other in the displaying area.

Referring to FIG. 15B, based on the assumption, the wearable device 101 may display the screen 1571 corresponding to the recording application and the screen 1572 corresponding to the note application. The wearable device 101 may obtain an audio signal obtained while tracing the external object 1510 or a curve drawn by the external object 1510 in the screen 1571. In a case in which the audio signal includes a speech 1523, the wearable device 101 may display text for the speech 1523 on the screen 1571. The wearable device 101 may display an image representing the curve in the screen 1572.

As described above, according to an embodiment of the disclosure, the wearable device 101 may execute a plurality of applications assigned to the external object 1510 substantially simultaneously based on multi-tasking. The wearable device 101 may display the multi-window in which the screens 1571 and 1572 provided from the plurality of applications are arranged. The wearable device 101 may execute one or more functions for obtaining digital content based on the external object 1510 that does not include a communication circuit, by using the multi-window.

Hereinafter, referring to FIG. 16, an operation in which the wearable device 101 according to an embodiment executes applications matched with the external object by using the external object will be described.

Figure 16:
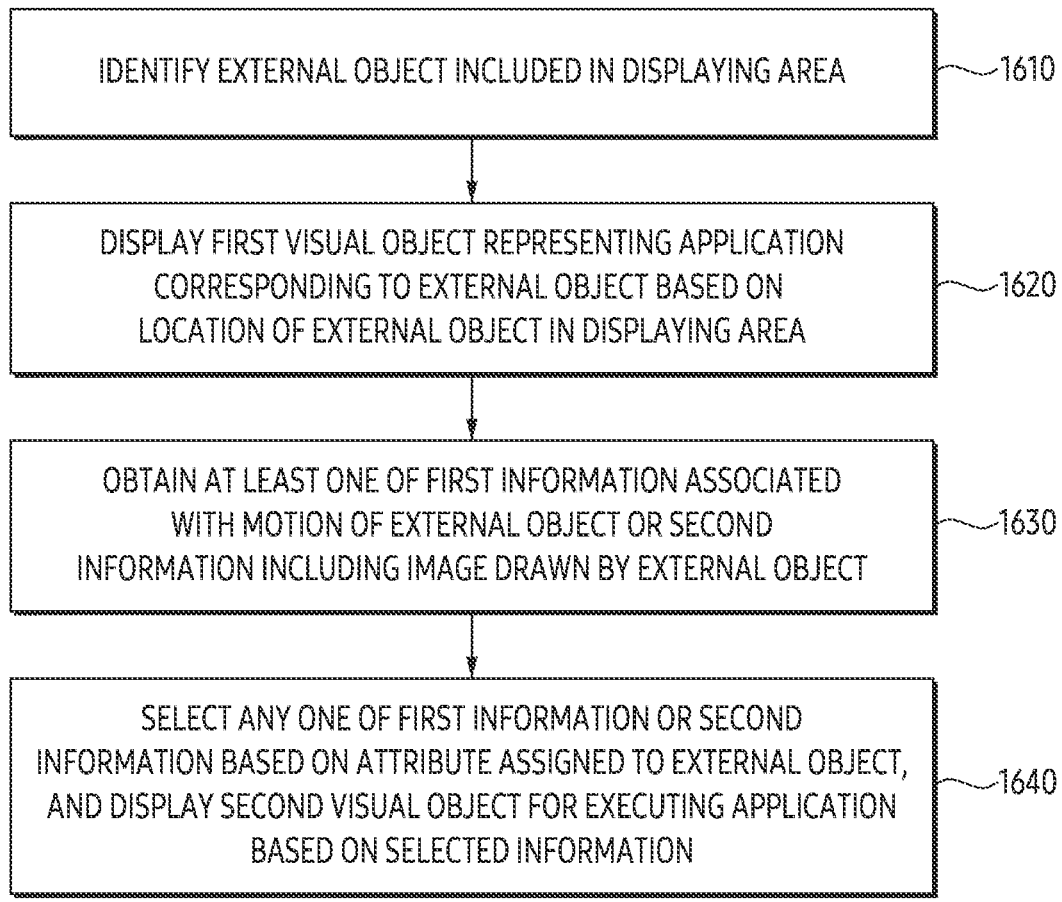
FIG. 16 illustrates a flowchart for a wearable device according to an embodiment of the disclosure.

FIG. 16 illustrates a flowchart for a wearable device according to an embodiment of the disclosure. A wearable device 101 of FIG. 5 may include the wearable device of FIG. 16. For example, the operations of FIG. 16 may be performed by the wearable device 101 and/or the processor 510 of FIG. 5. The operations of FIG. 16 may be associated with the operations of the wearable device 101 described above with reference to FIGS. 8A, 8B, 9A to 9C, 10, 11, 12A, 12B, 13, 14, 15A, and 15B. The operations of FIG. 16 be associated with at least one (e.g., an operation 220 of FIG. 2) of the operations of FIG. 2 and/or the operations of FIG. 7.

Referring to FIG. 16, in operation 1610, according to an embodiment of the disclosure, the wearable device may identify an external object included in the displaying area. The wearable device may identify the external object registered as the wearable device based on information stored in a memory (e.g., the memory 520 of FIG. 5). The information may include data indicating the shape, color, and/or size of the external object registered as the wearable device. The wearable device may identify the external object based on frames obtained from the camera (e.g., a motion recognition camera 340-2 of FIG. 3B, cameras 440-9 and 440-10 of FIG. 4B, and/or a camera 540 of FIG. 5) that overlap at least partially with the displaying area of the wearable device. That the wearable device identify the external object may include identifying at least one attribute assigned to the external object.

Referring to FIG. 16, in operation 1620, according to an embodiment of the disclosure, the wearable device may display the first visual object representing the application corresponding to the external object based on the location of the external object in the displaying area. The first visual object may be displayed to emphasize the external object identified based on the operation 1610. The first visual object may include, for example, FIGS. 830 and 840 of FIG. 8A and icons 832 and 842. The first visual object may include text (e.g., a name assigned to the application) indicating the application.

Referring to FIG. 16, in operation 1630, according to an embodiment of the disclosure, the wearable device may obtain at least one of first information associated with the motion of the external object or second information including an image drawn by the external object. For example, the wearable device may obtain the first information including at least partially a path of a portion (e.g., a point P of FIG. 9A) of the external object indicated by the attribute assigned to the external object. The first information may include a path of a portion of the external object contacted on one plane (e.g., a plane formed by the note 910 of FIG. 9A). For example, the wearable device may obtain the second information including at least one stroke drawn by a material (e.g., ink and/or graphite) outputted from the external object based on the attribute assigned to the external object. For example, the at least one stroke may be referred to as at least one stroke drawn by the external object.

Referring to FIG. 16, in operation 1640, according to an embodiment of the disclosure, the wearable device may select any one of the first information or the second information based on the attribute assigned to the external object and may display a second visual object for executing an application by using the selected information. The second visual object may include a buttons 940 of FIGS. 9A to 9C. According to an embodiment of the disclosure, the wearable device may selectively obtain any one of the first information or the second information of the operation 1630 by using the attribute assigned to the external object. After the operation 1640, the wearable device may execute the application based on the selected information in response to an input indicating to select the second visual object. Based on execution of the application, the wearable device may execute a function of the application based on the selected information.

As described above with reference to FIGS. 6A, 6B, 7, 8A, 8B, 9A to 9C, 10, 11, 12A, 12B, 13, 14, 15A, 15B, and 16, the wearable device according to an embodiment may require an input for registering the external object in order to execute the application based on the external object. However, the embodiment is not limited thereto. Hereinafter, referring to FIGS. 17 and 18, an example of an operation in which the wearable device according to an embodiment identifies the external object independently of the input and executes at least one application corresponding to the identified external object will be described.

Figure 17:
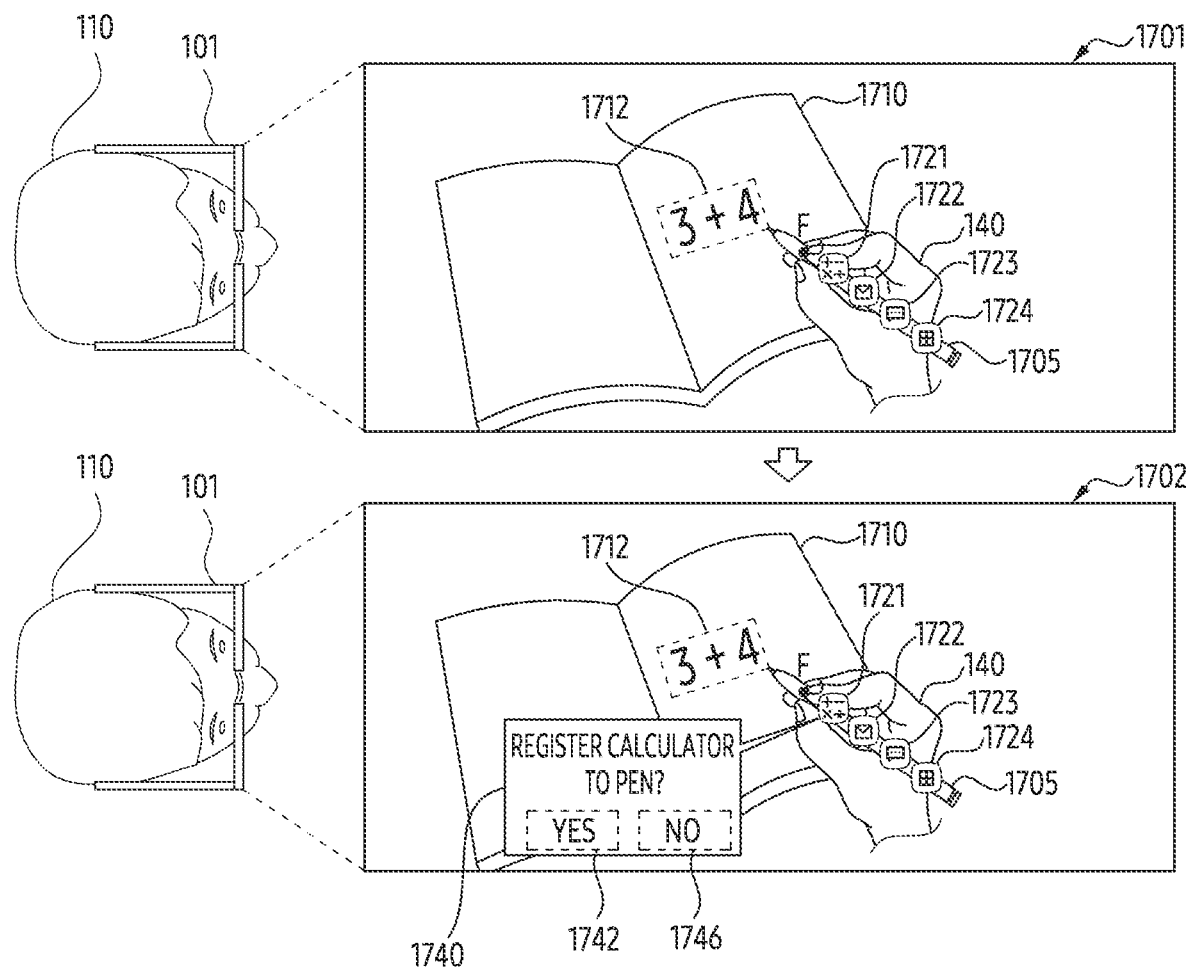
FIG. 17 illustrates an operation in which a wearable device displays a UI for recommending at least one application based on information obtained by tracking an external object according to an embodiment of the disclosure.

FIG. 17 illustrates an operation in which a wearable device displays a UI for recommending at least one application based on information obtained by tracking an external object according to an embodiment of the disclosure. The wearable device 101 of FIG. 5 may include the wearable device 101 of FIG. 17.

Referring to FIG. 17, according to an embodiment of the disclosure, a state 1701 in which the wearable device 101 identifies an external object 1705 included in the displaying area is illustrated. Hereinafter, it is assumed that the state 1701 is a state before the wearable device 101 receives an input indicating to register the external object 1705 described above with reference to FIGS. 6A to 6D and/or 7. For example, in the state 1701, the wearable device 101 may not be able to identify information that matches the shape, color, and/or size of the external object 1705 included in the displaying area. In the state 1701 in which the external object 1705 is not registered as the wearable device 101, the wearable device 101 may identify a category of the external object 1705. In case that the external object 1705 is classified into a designated category corresponding to a pen including a material, such as ink and/or graphite, the wearable device 101 may identify at least one stroke drawn by the external object 1705. For example, the wearable device 101 may identify analog content drawn by the external object 1705 on a note 1710. For example, as the external object 1705 is moved on the note 1710 by a hand 140 holding the external object 1705, the wearable device 101 is attached on the note 1710 and may identify traces of ink outputted from the external object 1705.

In the state 1701 of FIG. 17, the wearable device 101 may identify the text 1712 drawn on the note 1710 by the external object 1705. The wearable device 101 is obtained from a camera (e.g., a camera 540 of FIG. 5) and may identify the text 1712 based on an image including the note 1710. For example, the wearable device 101 may identify the text 1712 by performing OCR on the image. According to an embodiment of the disclosure, the wearable device 101 may recommend a user 110 to execute at least one of a plurality of applications installed in wearable device 101 based on the information included in the text 1712 generated by the external object 1705. For example, the wearable device 101 may select at least one application to be recommended to the user 110 based on whether the text 1712 includes characters arranged along the format included in Table 2. "#" in Table 2 may mean a number between 0 and 9.

TABLE 2

| Format | Applications to be recommended |
| --- | --- |
| ####-##-## #month #date Date format, such as ####year #month #date and the like | Calendar application |
| ## hour ## minute or ##:## | Reminder (or alarm) application |
| Formula including arithmetic operators | Calculator application |
| Numbers including monetary units | Payment application |
| Non-textual information, including pictures | Note application |
| Textual information that does not correspond to the above format | Note application |

Referring to Table 2, the wearable device 101 may recommend the execution of the calendar application based on identifying handwriting recorded according to notation of the related art for recording dates. The wearable device 101 may recommend the execution of the reminder application based on handwriting recorded according to the customary notation for recording time. Referring to FIG. 17, since the text 1712 has a format of formula including an addition operator (+), the wearable device 101 may recommend the calculator application based on the text 1712.

In the state 1701 of FIG. 17, the wearable device 101 may display an icon 1721 representing the calculator application by overlapping with the external object 1705 included in the displaying area. The wearable device 101 may display another icon representing another application installed in the wearable device 101 together with the icon 1721 corresponding to the calculator application. For example, the wearable device 101 may sequentially display one or more icons representing the application recently executed by the wearable device 101 together with the icon 1721 of the application selected based on the text 1712.

Referring to FIG. 17, the state 1701 in which the wearable device 101 sequentially displays a plurality of icons 1721, 1722, 1723, and 1734 is illustrated. Among the icons 1721, 1722, 1723, and 1724, the wearable device 101 may dispose the icon 1721, which corresponds to the calculator application recommended based on the text 1712, closest to a portion (e.g., a portion where ink is outputted from the external object 1705, such as a pen tip) of the external object 1705.

According to an embodiment of the disclosure, the order in which the wearable device 101 displays icons 1721, 1722, 1723, and 1724 on the external object 1705 may be associated with the order executed by the wearable device 101. For example, the order of icons 1722, 1723, and 1724 except for the icon 1721 corresponding to the calculator application recommended based on the text 1712 may correspond to the order of applications recently executed by the wearable device 101. For example, in case that the wearable device 101 does not recommend any application, the wearable device 101 may display icons for a plurality of recently executed applications.

Referring to FIG. 17, the wearable device 101 may arrange icons 1721, 1722, 1723, and 1724 based on the shape of the external object 1705 shown through the displaying area. For example, the icons 1721, 1722, 1723, and 1724 may be arranged along a direction in which the external object 1705 extends in the displaying area. The number of icons 1721, 1722, 1723, and 1724, which overlap on the external object 1705, may be associated with the length of the external object 1705 shown through the displaying area and the size of each of the icons 1721, 1722, 1723, and 1724. The number of icons displayed together with the external object 1705 may have a designated upper limit or may be adaptively changed based on the length of the external object 1705 shown through the displaying area.

Referring to FIG. 17, in the state 1701 in which applications are recommended by using the icons 1721, 1722, 1723, and 1724, the wearable device 101 may identify an input indicating to execute at least one of the recommended applications. For example, the wearable device 101 may execute the calculator application corresponding to the icon 1721, in response to an input indicating to select the icon 1721. The wearable device 101 may output a result of the formula, by executing the calculator application based on the formula included in the text 1712. The result may be visually displayed in the displaying area of the wearable device 101 and/or may be outputted in the form of an audio signal through a speaker of the wearable device 101.

Referring to FIG. 17, in a state 1702 after executing the calculator application, the wearable device 101 may display a window 1740 for registering the external object 1705. In the window 1740, the wearable device 101 may display text (e.g., "Do you want to register a calculator with this pen?") for guiding whether to register the calculator application. In the window 1740, the wearable device 101 may display a button 1742 for registering the calculator application and a button 1746 for stopping the display of the window 1740. In response to an input indicating to select the button 1742, the wearable device 101 may register the external object 1705. In the state of registering the external object 1705, the wearable device 101 may store information for executing the calculator application based on the external object 1705.

As described above, according to an embodiment of the disclosure, the wearable device 101 may identify the analog content drawn by the external object 1705 in the state 1701 in which the external object 1705, such as the pen is identified. In case that the external object 1705 is not registered, the wearable device 101 may recommend execution of at least one application based on the digital content converted from the analog content. The wearable device 101 may enhance user experience associated with the external object 1705, such as the pen, by recommending the execution of the application.

Figure 18:
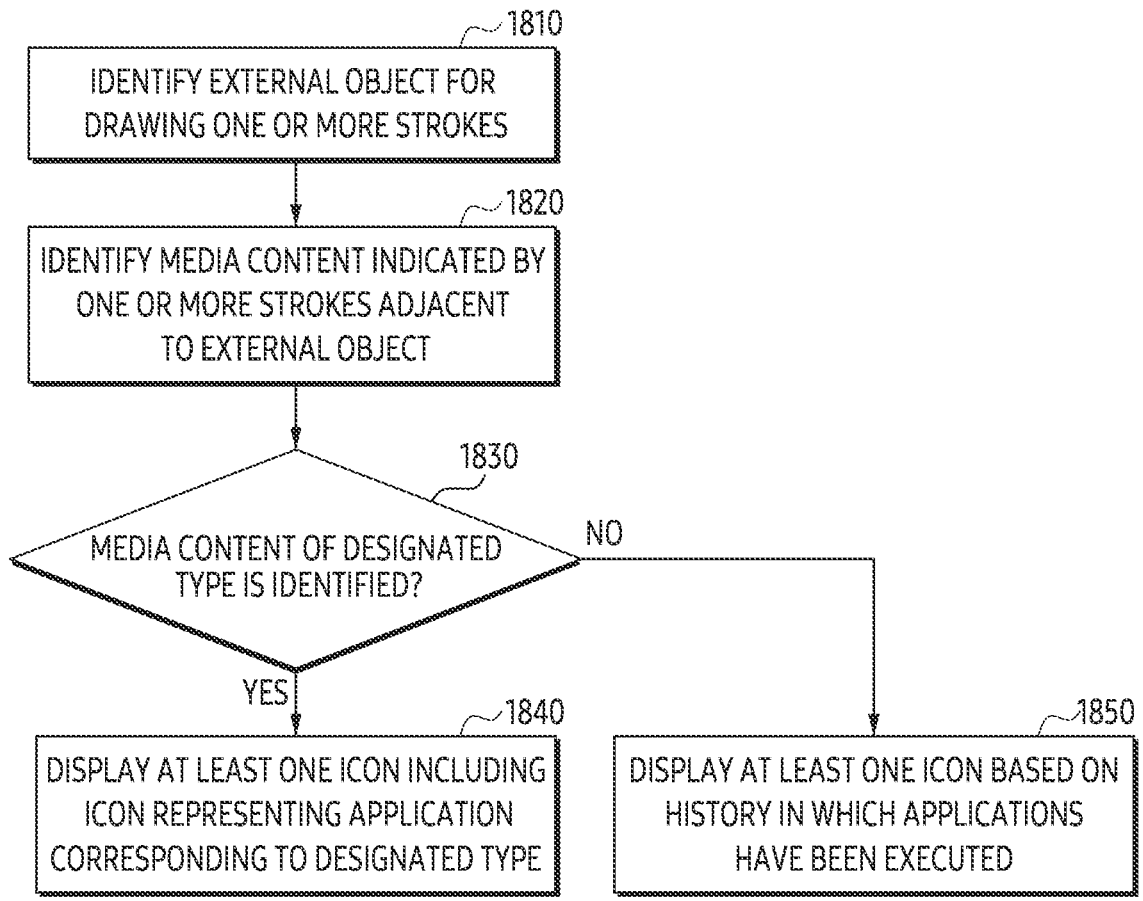
FIG. 18 illustrates a flowchart for a wearable device according to an embodiment of the disclosure.

FIG. 18 illustrates a flowchart for a wearable device according to an embodiment of the disclosure. A wearable device 101 of FIG. 5 may include the wearable device of FIG. 18. For example, the operations of FIG. 18 may be performed by the wearable device 101 and/or a processor 510 of FIG. 5. The operations of FIG. 18 may be associated with the operations of the wearable device 101 described above with reference to FIG. 17. The operations of FIG. 18 may be associated with the operations of FIGS. 2, 7 and/or 16.

Referring to FIG. 18, in operation 1810, according to an embodiment of the disclosure, the wearable device may identify an external object for drawing one or more strokes. The external object may be another external object different from the external object registered in the wearable device, such as an external object 1705 of FIG. 17. The wearable device may identify the external object by using a camera (e.g., a camera 540 of FIG. 5) in the wearable device. For example, the wearable device may identify the external object including the pen.

Referring to FIG. 18, in operation 1820, according to an embodiment of the disclosure, the wearable device may identify media content indicated by one or more strokes adjacent to the external object. The wearable device may identify the one or more strokes drawn on the external object by tracking the motion of the external object. The wearable device may obtain an image including the one or more strokes by using the camera in the wearable device. The wearable device may identify the media content by performing OCR on the obtained image. The media content identified by the wearable device may include text and/or images indicated by the one or more strokes.

Referring to FIG. 18, in operation 1830, according to an embodiment of the disclosure, the wearable device may determine whether media content of a designated type is identified. For example, the wearable device may identify whether text arranged according to a designated format of Table 2 is included in the media content. The designated type of the operation 1830 may be associated with the designated format of Table 2. For example, the designated type may be set to identify at least one application corresponding to the media content identified by the wearable device.

In case that the media content of the designated type is identified (in operation 1830-YES), based on operation 1840, the wearable device may display at least one icon including an icon representing an application corresponding to the designated type. For example, like an icon 1721 of FIG. 17, the wearable device may display an icon for guiding the execution of the application corresponding to the designated type. The wearable device may display icons representing other applications recently executed by the wearable device together with an icon representing the application corresponding to the designated type. The icons displayed by the wearable device may be displayed by overlapping with the external object in the displaying area. Since the icons are displayed by overlapping with the external object, the wearable device may prevent the media content from being covered by the icons. For example, the wearable device may maintain the visibility of the media content by superimposing and displaying the icons on the external object.

In case that the designated type of media content is not identified (in operation 1830-NO), the wearable device may display at least one icon based on the history in which the applications have been executed, by perform operation 1850. For example, the wearable device may display icons representing a designated number of applications recently executed by the wearable device. In the displaying area, the wearable device may display the icons by overlapping with the external object. In case that the external object, such as the pen, has a shape extended along a length direction, the wearable device may arrange the icons along the length direction in the displaying area.

As described above, according to an embodiment of the disclosure, the wearable device may recognize the external object independently of an operation of electrically communicating with the external object. Based on the recognition of the external object, the wearable device may execute a function of generating digital content based on the external object. The embodiment is not limited thereto, and the wearable device may obtain information used for execution of an application installed on the wearable device by communicating with the external object. Hereinafter, an example of an operation in which the wearable device communicates with the external object according to an embodiment will be described with reference to FIG. 19.

Figure 19:
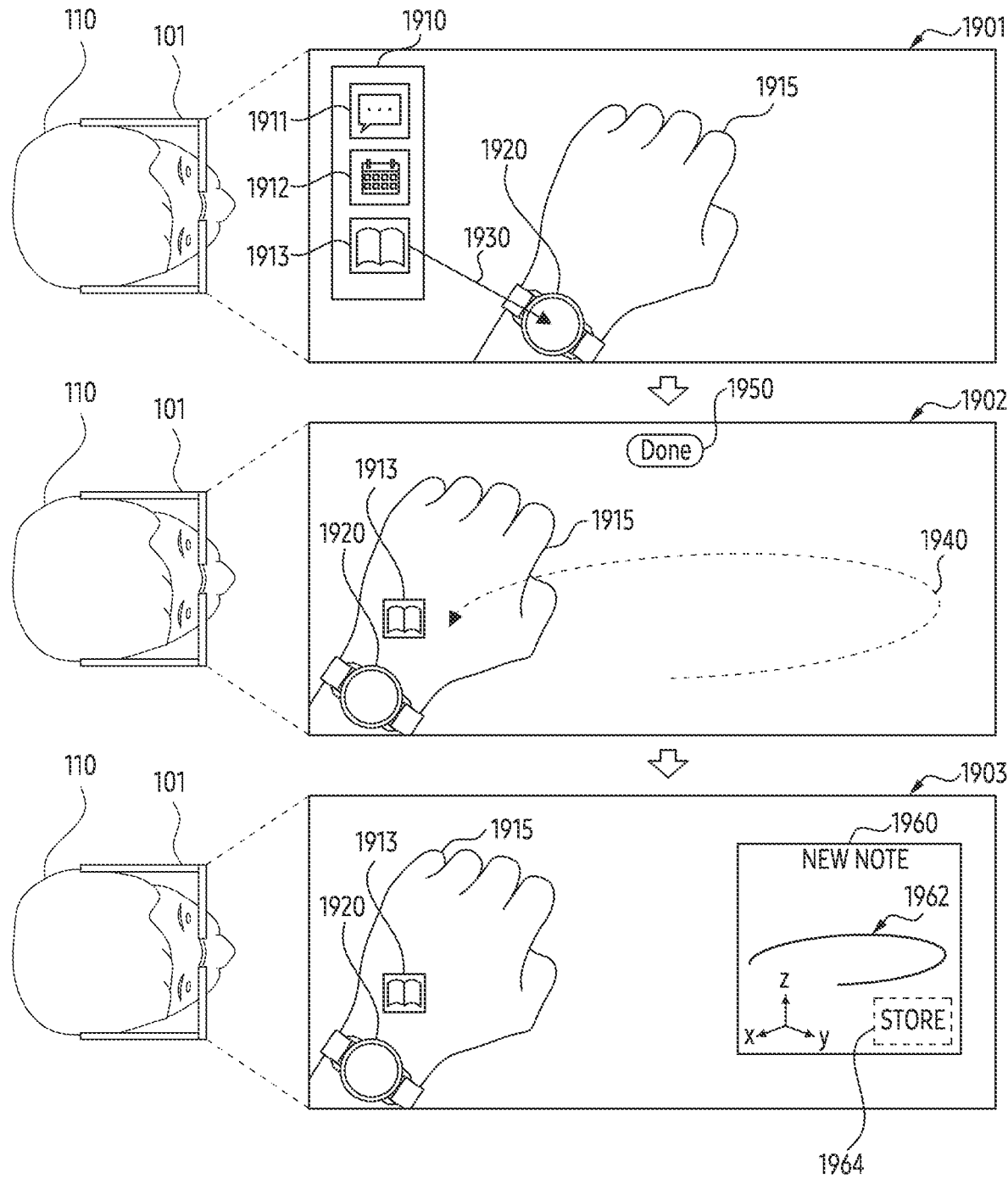
FIG. 19 illustrates an operation in which a wearable device executes an application based on information obtained by an external electronic device, according to an embodiment of the disclosure.

FIG. 19 illustrates an operation in which a wearable device executes an application based on information obtained by an external electronic device according to an embodiment of the disclosure. The wearable device 101 of FIG. 5 may include the wearable device 101 of FIG. 19.

Referring to FIG. 19, states 1901, 1902, and 1903 after the wearable device 101 identifies the external electronic device 1920 according to an embodiment are illustrated. Hereinafter, the external electronic device 1920 having the form of a smart watch on a user's hand 1915 will be described as an example, but the embodiment is not limited thereto. For example, the wearable device 101 may be connected to the external electronic device 1920, such as a smart ring or a stylus. The wearable device 101 may identify the external electronic device 1920 based on a wireless communication protocol, such as Bluetooth. The wearable device 101 may identify the external electronic device 1920 by using a camera (e.g., a camera 540 of FIG. 5) having an FoV that at least partially overlaps with the displaying area.

In state 1901 of FIG. 19, the wearable device 101 may display a list 1910 of applications installed in the wearable device 101 similarly to states 601 and 602 of FIG. 6A. Among the icons 1911, 1912, and 1913 included in the list 1910, the wearable device 101 may identify the icon 1913 dragged on the external electronic device 1920 dragged along the path 1930. Based on an input of dragging the icon 1913 along the path 1930, the wearable device 101 may assign a note application corresponding to the icon 1913 to the external electronic device 1920.

Referring to FIG. 19, a state 1902 after the wearable device 101 assigns the note application to the external electronic device 1920 is illustrated. In the state 1902, the wearable device 101 may display the icon 1913 representing the note application assigned to the external electronic device 1920 in a portion of the displaying area adjacent to the external electronic device 1920. In the state 1902, the wearable device 101 may track the motion of the external electronic device 1920 by using the camera. For example, the wearable device 101 may identify the motion of the external electronic device 1920 moving along a path 1940. The wearable device 101 may identify the two-dimensional motion of the external electronic device 1920 from the frames of the camera. According to an embodiment of the disclosure, the wearable device 101 may identify the motion three-dimensionally by electrically communicating with the external electronic device 1920. For example, in the state 1902, the wearable device 101 may request information identified by a sensor (e.g., an inertial measurement unit (IMU)) in external electronic device 1920 to the external electronic device 1920. The information may include a three-dimensional motion of the external electronic device 1920 moved along the path 1940. Based on the information received from the external electronic device 1920, the wearable device 101 may identify the three-dimensional motion of the external electronic device 1920.

Referring to FIG. 19, the state 1903 after executing the note application based on the information obtained by tracking the external electronic device 1920 is illustrated. In the state 1902, the wearable device 101 may switch from the state 1902 to the state 1903 based on an input for selecting a button 1950 for executing the note application. In the state 1903, the wearable device 101 may display a screen 1960 for storing digital content based on information obtained by tracking the external electronic device 1920, by executing the note application. In the screen 1960, the wearable device 101 may display a visual object 1962 representing the motion of the external electronic device 1920 moved along the path 1940. Since the wearable device 101 identified the three-dimensional motion of the external electronic device 1920 moved along the path 1940 by using the sensor of the external electronic device 1920, the wearable device 101 may three-dimensionally display the visual object 1962.

In the state 1903 of FIG. 19, the wearable device 101 may display the screen 1960 for three-dimensionally browsing the visual object 1962 based on axes (x-axis, y-axis, and z-axis). For example, based on the axes, the wearable device 101 may identify an input for rotating the visual object 1962. Based on the input, the wearable device 101 may provide a user experience of viewing the visual object 1962 in a three-dimensional spatial coordinate system by rotating or moving the visual object 1962. The wearable device 101 may display a button 1964 for storing digital content corresponding to the visual object 1962 in the screen 1960. Based on an input indicating to select the button 1964, the wearable device 101 may store information for displaying the path 1940 in three dimensions, such as the visual object 1962, in memory.

As described above, the wearable device 101 according to an embodiment may support registering the external electronic device 1920. By using the sensor included in the external electronic device 1920, the wearable device 101 may enhance information obtained by tracking the external electronic device 1920. For example, by using the sensor included in the external electronic device 1920, the wearable device 101 may enhance information obtained by using a camera.

In an embodiment of the disclosure, a method for a wearable device to execute an application installed in the wearable device, by recognizing the motion of an external object or analog content drawn by an external object may be required. As described above, a wearable device (e.g., a wearable device 101 of FIGS. 1 and/or 5) according to an embodiment may comprise a display (e.g., a display 530 of FIG. 5), a camera (e.g., a camera 540 of FIG. 5), and a processor (e.g., a processor 510 of FIG. 5). The processor may be configured to identify, by using the camera, an external object (e.g., an external object 130 of FIG. 1) included in a displaying area of the display. The processor may be configured to display a first visual object (e.g., an icon 160 of FIG. 1) representing an application corresponding to the external object based on a location of the external object in the displaying area. The processor may be configured to obtain, while displaying the first visual object, at least one of first information associated with a path of the external object moved on a plane, or second information including at least one stroke drawn by the external object. The processor may be configured to display, based on the location, a second visual object (e.g., a button 940 of FIG. 9A) for executing the application by using information that is identified among the first information or the second information according to an attribute assigned to the external object. According to an embodiment of the disclosure, the wearable device may execute the application installed in the wearable device by using the information obtained by tracking the external object.

For example, the processor may be configured to obtain the first information by tracking the path based on whether a portion of the external object indicated by the attribute is contact to the plane.

For example, the processor may be configured to display one or more lines having a shape of the tracked path in the display.

For example, the processor may be configured to identify, while tracking the path by using the camera which is a first camera, that the external object is moved outside of the displaying area by motion of the wearable device. The processor may be configured to track a path of the external object by using a second camera toward the external object moved outside of the displaying area. The processor may be configured to display a line having a shape of the path tracked by the second camera, in the display.

For example, the processor may be configured to display one or more lines having at least one of color, opacity or thickness set by the attribute, in the display.

For example, the processor may be configured to obtain, based on the attribute set to tracking the at least one stroke drawn by an ink extended from an end of the external object, the second information among the first information or the second information.

For example, the processor may be configured to execute, in response to an input indicating to select the second visual object, the application by using the information identified according to the attribute.

For example, the processor may be configured to display, by executing the application based on the second visual object, a screen including an image indicated by the information identified according to the attribute in the display.

For example, the electronic device may further comprise a communication circuit. The processor may be configured to transmit to an external electronic device indicated by the second visual object through the communication circuit, a message including text indicated by the information identified according to the attribute by executing the application based on the second visual object.

For example, the processor configured to obtain, by executing the application based on the second visual object, schedule data based on text indicated by the information identified according to the attribute.

As described above, a method of a wearable device according to an embodiment may comprise displaying, in a display of the wearable device, list of a plurality of applications stored in a memory of the wearable device. The method may comprise obtaining, based on an input indicating overlapping a visual object representing a first application included in the list on an external object included in a displaying area of the display, an attribute for executing the first application by using the external object. The method may comprise obtaining, after obtaining the attribute, at least one of first information associated with a path of the external object moved on a plane, or second information including at least one stroke drawn by the external object. The method may comprise executing, the first application by using information identified by the attribute among the first information or the second information.

For example, the obtaining the attribute may comprise displaying, in response to the input, a screen for receiving one or more attributes associated with the first application, in the displaying area.

For example, the obtaining the attribute may comprise identifying, among both ends of the external object extended along a length direction, an end adjacent to the first visual object overlapped to the external object by the input.

For example, the obtaining at least one of the first information or the second information may comprise obtaining the first information associated with the path of the identified end.

For example, the executing may comprise executing the application based on text recognized from the information identified by the attribute among the first information or the second information.

For example, the method may comprise displaying one or more lines having at least one of color, opacity or thickness set by the attribute, in the display.

For example, the method may comprise obtaining, based on the attribute set to tracking the at least one stroke drawn by an ink extended from an end of the external object, the second information among the first information or the second information.

As described above, a method of a wearable device according to an embodiment may comprise identifying, by using a camera of the wearable device, an external object included in a displaying area of a display of the wearable device. The method may comprise displaying a first visual object representing an application corresponding to the external object based on a location of the external object in the displaying area. The method may comprise obtaining, while displaying the first visual object, at least one of first information associated with a path of the external object moved on a plane, or second information including at least one stroke drawn by the external object. The method may comprise displaying, based on the location, a second visual object for executing the application by using information that is identified among the first information or the second information according to an attribute assigned to the external object.

For example, the obtaining may comprise obtaining the first information by tracking the path based on whether a portion of the external object indicated by the attribute is contact to the plane.

For example, the obtaining the first information may comprise displaying one or more lines having a shape of the tracked path in the display.

For example, the displaying the one or more lines may comprise identifying, while tracking the path by using the camera which is a first camera, that the external object is moved outside of the displaying area by motion of the wearable device. The method may comprise tracking a path of the external object by using a second camera toward the external object moved outside of the displaying area. The method may comprise displaying a line having a shape of the path tracked by the second camera, in the display.

For example, the method may comprise executing, in response to an input indicating to select the second visual object, the application by using the information identified according to the attribute.

For example, the executing may comprise displaying a screen including an image indicated by the information identified according to the attribute in the display.

For example, the executing may comprise transmitting a message including text indicated by the information identified according to the attribute to an external electronic device indicated by the second visual object through a communication circuit of the wearable device.

For example, the executing may comprise obtaining schedule data based on the text indicated by the information identified according to the attribute.

As described above, according to an embodiment of the disclosure, a wearable device (e.g., a wearable device 101 of FIGS. 1 and/or 5) may comprise a display (e.g., a display 530 of FIG. 5), a memory (e.g., the memory 520 of FIG. 5), and a processor (e.g., a processor 510 of FIG. 5). The processor may be configured to display, in a display of the wearable device, list (e.g., a list 610 of FIGS. 6A and 6B) of a plurality of applications stored in a memory of the wearable device. The processor may be configured to obtain, based on an input indicating overlapping a visual object representing a first application included in the list on an external object (e.g., an external object 130 of FIG. 1) included in a displaying area of the display, an attribute for executing the first application by using the external object. The processor may be configured to obtain, after obtaining the attribute, at least one of first information associated with a path of the external object moved on a plane, or second information including at least one stroke drawn by the external object. The processor may be configured to execute, the first application by using information identified by the attribute among the first information or the second information.

For example, the processor may be configured to display a screen for receiving one or more attributes associated with the first application in the displaying area in response to the input.

For example, the processor may be configured to identify, among both ends of the external object extended along a length direction, an end adjacent to the first visual object overlapped to the external object by the input.

For example, the processor may be configured to obtain the first information associated with the path of the identified end.

For example, the processor may be configured to execute the application based on text recognized from the information identified by the attribute among the first information or the second information.

The apparatus described above may be implemented as a combination of hardware components, software components, and/or hardware components and software components. For example, the devices and components described in the embodiments may be implemented using one or more general purpose computers or special purpose computers, such as processors, controllers, arithmetical logic unit (ALU), digital signal processor, microcomputers, field programmable gate array (FPGA), programmable logic unit (PLU), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media, such as hard disks, floppy disks and magnetic tapes, optical recording media, such as compact disc (CD)-ROMs and digital versatile discs (DVDs), magneto-optical media, such as floppy disks, ROMs, RAMs, flash memories, and the like to store program instructions. Examples of other media include app stores that distribute applications, sites that supply or distribute various software, and recording media or storage media managed by servers.

While the disclosure has been shown and described with reference to various embodiments thereof, it will be understood by those skilled in the art that various changes in form and details may be made therein without departing from the described method or are substituted or substituted by other components or equivalents, appropriate results may be achieved. Therefore, other implementations, other embodiments, and scope of the disclosure as defined by the appended claims and their equivalents.

What is claimed is:

1. A wearable device comprising:
at least one display, when the wearable device is worn by a user, positioned toward an eye of the user;
at least one camera;
at least one processor comprising processing circuitry; and
memory, comprising one or more storage mediums, storing instructions,
wherein the instructions, when executed by the at least one processor individually or collectively, cause the wearable device to:
display a first screen using images representing a field of view (FOV) of the at least one camera;
identify a defined object using the images representing the FOV of the at least one camera;
based on the defined object identified in the FOV;
obtain information indicating movement of the defined object;
identify a software application which is associated with the defined object; and
based on the software application identified as associated with the defined object, display, within the first screen, an executable object indicating the software application; and
in response to a user input on the executable object, display a second screen by executing the software application using the information.

2. The wearable device of claim 1, wherein the instructions, when executed by the at least one processor individually or collectively, cause the wearable device to:
based on the defined object being in contact with a plane, obtain the information indicating a movement path of an end of the defined object being in contact with the plane.

3. The wearable device of claim 2, wherein the instructions, when executed by the at least one processor individually or collectively, cause the wearable device to:
while obtaining the information, display one or more lines having a shape of the movement path superimposed on the first screen.

4. The wearable device of claim 1,
wherein the at least one camera include a first camera and a second camera, and
wherein the instructions, when executed by the at least one processor individually or collectively, cause the wearable device to:
based on the information indicating the movement of the defined object in the FOV of the first camera, identify whether the defined object is moved outside of the first camera:
based on the defined object identified as being moved outside of the FOV of the first camera, identify the defined object in another FOV of the second camera; and
based on the defined object identified in the other FOV, obtain the information indicating the movement of the defined object within the other FOV.

5. The wearable device of claim 4, wherein the instructions, when executed by the at least one processor individually or collectively, cause the wearable device to:
based on the defined object identified as being moved outside of the FOV of the first camera, display a third screen including at least portion of images representing the other FOV of the second camera.

6. The wearable device of claim 5, wherein the instructions, when executed by the at least one processor individually or collectively, cause the wearable device to:
display the third screen including a first line indicating a trajectory of the defined object identified in the FOV, and a second line, which is connected to an end of the first line, indicating a trajectory of the defined object identified in the other FOV.

7. The wearable device of claim 4, wherein the instructions, when executed by the at least one processor individually or collectively, cause the wearable device to:
based on the defined object identified in the FOV, identify at least one stroke drawn by an ink extended from an end of the defined object using the images obtained via the first camera.

8. The wearable device of claim 4, wherein the instructions, when executed by the at least one processor individually or collectively, cause the wearable device to:
perform object recognition using the images;

based on the object recognition performed while displaying the first screen, identify an external object in the FOV of the first camera; and based on the external object identified in the FOV, determine whether the external object is the defined object using another information stored in the memory indicating a shape of the defined object, wherein the other information further indicate the software application that is set to be associated with the defined object.

9. The wearable device of claim 1, further comprising:
at least one communication circuitry,
wherein the instructions, when executed by the at least one processor individually or collectively, cause the wearable device to:
transmit, to an external electronic device indicated by the executable object through the at least one communication circuitry, a message including text indicated by the information using the software application executed by the user input.

10. The wearable device of claim 1, wherein the instructions, when executed by the at least one processor individually or collectively, cause the wearable device to:
obtain, by using the software application on executed by the user input, schedule data based on text indicated by the information.

11. A method of a wearable device, the method comprising:
displaying, in a display of the wearable device, list of a plurality of software applications stored in a memory of the wearable device;
obtaining, based on an input indicating overlapping a visual object representing a first software application included in the list on an external object included in a displaying area of the display, an attribute for executing the first software application by using the external object;
storing the attribute to be used to identify the external object as a defined object associated with the first software application; and
after storing the attribute, executing the first software application based on identifying the defined object using images obtained by at least one camera of the wearable device.

12. The method of claim 11, wherein the obtaining of the attribute comprises:
displaying, in response to the input, a screen for receiving one or more attributes associated with the first software application, in the displaying area.

13. The method of claim 11, wherein the obtaining of the attribute comprises:
identifying, among both ends of the external object extended along a length direction, an end adjacent to the visual object overlapped to the external object by the input.

14. The method of claim 11, wherein the executing of the first software application comprises:
executing the first software application based on information indicating a movement of the defined object using the images.

15. A non-transitory computer readable storage medium storing instructions, wherein the instructions, when executed by a wearable device comprising at least one display, when the wearable device is worn by a user, positioned toward an eye of the user, and at least one camera, cause the wearable device to:
display a first screen using images representing a field of view (FOV) of the at least one camera;
identify a defined object using the images representing the FOV of the at least one camera;
based on the defined object identified in the FOV:
obtain information indicating movement of the defined object;
identify a software application which is associated with the defined object; and
based on the software application identified as associated with the defined object, display, within the first screen, an executable object indicating the software application; and
in response to a user input on the executable object, display a second screen by executing the software application using the information.

16. The non-transitory computer readable storage medium of claim 15, wherein the instructions, when executed by the wearable device, cause the wearable device to:
based the defined object being in contact with a plane, obtain the information indicating a movement path of an end of the defined object being in contact with the plane.

17. The non-transitory computer readable storage medium of claim 16, wherein the instructions, when executed by the wearable device, cause the wearable device to:
while obtaining the information, display one or more lines having a shape of the movement path superimposed on the first screen.

18. The non-transitory computer readable storage medium of claim 15,
wherein the at least one camera include a first camera and a second camera, and
wherein the instructions, when executed by the wearable device, cause the wearable device to:
based on the information indicating the movement of the defined object in the FOV of the first camera, identify whether the defined object is moved outside of the first camera;
based on the defined object identified as being moved outside of the FOV of the first camera, identify the defined object in another FOV of the second camera; and
based on the defined object identified in the other FOV, obtain the information indicating the movement of the defined object within the other FOV.

19. The non-transitory computer readable storage medium of claim 18, wherein the instructions, when executed by the wearable device, cause the wearable device to:
based on the defined object identified as being moved outside of the FOV of the first camera, display a third screen including at least portion of image representing the other FOV of the second camera.

* * * * *